United States Patent
Wang et al.

(10) Patent No.: US 12,537,568 B2
(45) Date of Patent: Jan. 27, 2026

(54) TRANSMISSION SYSTEM AND TRANSMISSION METHOD

(71) Applicant: Huawei Technologies Co., Ltd., Shenzhen (CN)

(72) Inventors: Cuicui Wang, Beijing (CN); Dajun Zang, Shenzhen (CN); Yuchun Lu, Beijing (CN); Linchun Wang, Beijing (CN); Daochun Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 18/514,119

(22) Filed: Nov. 20, 2023

(65) Prior Publication Data

US 2024/0154656 A1 May 9, 2024

Related U.S. Application Data

(63) Continuation of application No. PCT/CN2022/074208, filed on Jan. 27, 2022.

(30) Foreign Application Priority Data

May 21, 2021 (CN) .......................... 202110559039.7

(51) Int. Cl.
*H04B 7/0456* (2017.01)
*H04B 7/0426* (2017.01)

(52) U.S. Cl.
CPC ......... *H04B 7/0456* (2013.01); *H04B 7/0439* (2013.01)

(58) Field of Classification Search
CPC .............. H04L 25/0272; H04L 1/0041; H04L 25/028; H04L 25/03343; H04L 27/2626; H04L 1/0625; G06F 13/20; G06F 13/4221; H04B 7/0456; H04B 7/0439
See application file for complete search history.

(56) References Cited

U.S. PATENT DOCUMENTS

| | | | |
|---|---|---|---|
| 9,258,154 B2 | 2/2016 | Hormati et al. | |
| 9,509,437 B2 | 11/2016 | Shokrollahi | |
| 9,667,379 B2* | 5/2017 | Cronie | H04L 1/0057 |
| 2012/0063291 A1* | 3/2012 | Hsueh | H04B 1/7103 |
| | | | 370/201 |

(Continued)

FOREIGN PATENT DOCUMENTS

CN 113890793 A 1/2022

*Primary Examiner* — Sophia Vlahos
(74) *Attorney, Agent, or Firm* — Conley Rose, P.C.

(57) ABSTRACT

A transmission system includes a sending apparatus and N signal channels, where N≥2, and N is an integer. The sending apparatus includes a first apparatus, and the first apparatus is configured to: obtain N to-be-transmitted signals and an encoding coefficient group, where the N to-be-transmitted signals are represented as an N×1 signal matrix X, and the encoding coefficient group is represented as an N×N orthogonal encoding matrix T; process the N to-be-transmitted signals based on the encoding coefficient group to generate N encoded first signals, where the N encoded first signals are represented as a signal matrix Y; and send the N encoded first signals to the N signal channels, where a signal on each signal channel corresponds to an element in a row of the signal matrix Y.

20 Claims, 37 Drawing Sheets

(56) References Cited

U.S. PATENT DOCUMENTS

| | | | |
|---|---|---|---|
| 2012/0306568 A1* | 12/2012 | Beyene | H05K 1/0243 |
| | | | 327/551 |
| 2016/0020824 A1* | 1/2016 | Ulrich | H04L 1/0668 |
| | | | 375/340 |
| 2016/0026597 A1* | 1/2016 | Leddige | G06F 13/4221 |
| | | | 710/105 |

* cited by examiner

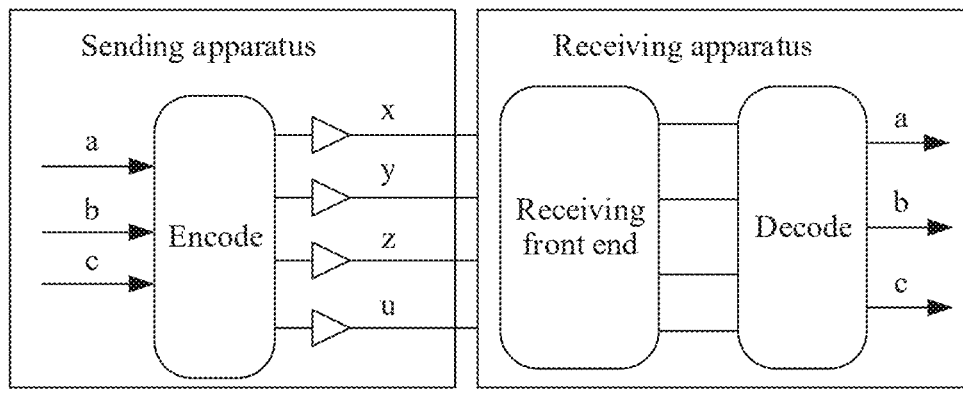
FIG. 1A
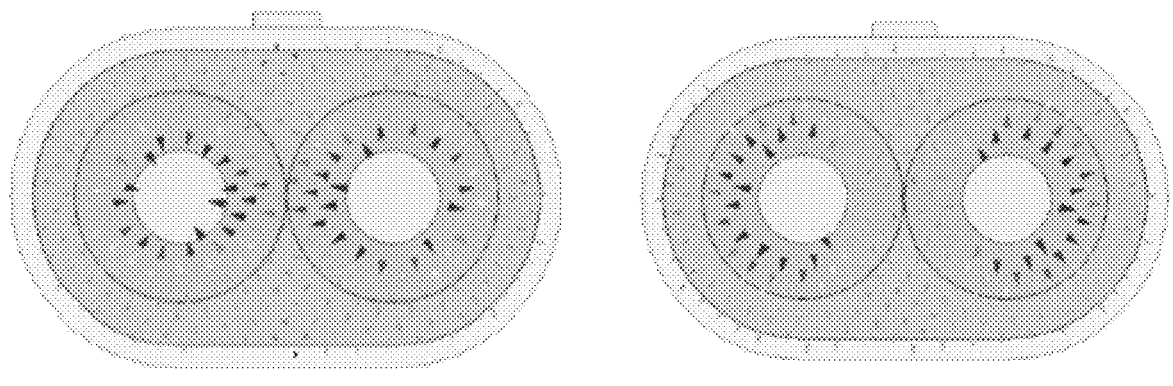
FIG. 1B
Transmission mode 1          Transmission mode 2
FIG. 2A 1901: A sending apparatus obtains N to-be-transmitted signals and an encoding coefficient group, where the N to-be-transmitted signals are represented as an N × 1 signal matrix X, the encoding coefficient group is represented as an N × N orthogonal encoding matrix T, positive/negative signs of elements in any column of the orthogonal encoding matrix T are the same, and positive/negative signs of elements in the remaining N − 1 columns satisfy the following relationship: when N is an even number, a quantity of elements whose positive/negative signs are positive signs in any column of the N − 1 columns is N/2, and a quantity of elements whose positive/negative signs are negative signs in any column of the N − 1 columns is N/2; or when N is an odd number, a quantity of elements whose positive/negative signs are positive signs in any column of the N − 1 columns is (N − 1)/2, and a quantity of elements whose positive/negative signs are negative signs in any column of the N − 1 columns is (N + 1)/2, or a quantity of elements whose positive/negative signs are positive signs in any column of the N − 1 columns is (N + 1)/2, and a quantity of elements whose positive/negative signs are negative signs in any column of the N − 1 columns is (N − 1)/2, N ≥ 2, and N is an integer 1902: The sending apparatus processes the N to-be-transmitted signals based on the encoding coefficient group to generate N encoded first signals, where the N encoded first signals are represented as a signal matrix Y, and signal matrix Y = orthogonal encoding matrix T × signal matrix X 1903: The sending apparatus sends the N encoded first signals to N signal channels, where a signal on each signal channel corresponds to an element in any row of the signal matrix Y 1904: A receiving apparatus receives N second signals, where the N second signals are signals obtained after the N encoded first signals pass through the N signal channels 1905: The receiving apparatus processes the N second signals

FIG. 19

TRANSMISSION SYSTEM AND TRANSMISSION METHOD

CROSS-REFERENCE TO RELATED APPLICATIONS

This is a continuation of International Patent Application No. PCT/CN2022/074208 filed on Jan. 27, 2022, which claims priority to Chinese Patent Application No. 202110559039.7 filed on May 21, 2021. The disclosures of the aforementioned applications are hereby incorporated by reference in their entireties.

TECHNICAL FIELD

Embodiments of this disclosure relate to the field of communication technologies, and in particular, to a transmission system and a transmission method.

BACKGROUND

In a current high-speed communication system, for example, a transmission device, such as a router, a switch, or an optical transport network (OTN), a communication apparatus, a chip, or an interface, such as a general-purpose computer interface, an OTN interface, a Peripheral Component Interconnect Express (PCIe) interface, an Ethernet interface, or a serializer/deserializer (SerDes) interface, uses a passive channel, such as a printed circuit board (PCB) trace, a cable, a package trace, or a connector to complete interconnection between a sending apparatus and a receiving apparatus or between chips.

In a process of transmitting data through a plurality of parallel passive channels, an encoding manner based on chord encoding (or chord signaling) and a transmission manner are proposed in a conventional related technology. To be specific, in a solution of the related technology, a sending apparatus jointly encodes N−1 to-be-transmitted signals into N signals by using an N×N Hadamard matrix, and transmits the N signals on N signal channels. A receiving apparatus decodes the N signals by using an (N−1)×N decoding matrix, to obtain the N−1 signals.

In other words, the chord encoding manner means that joint encoding is performed on the N−1 to-be-transmitted signals based on the N×N-dimensional matrix, and then the N signals are transmitted through the N signal channels. However, cross coupling exists between the N signal channels. In this encoding manner, the N−1 signals are encoded only based on a mathematical form, and actual crosstalk impact of the N signal channels on the N−1 to-be-transmitted signals is not considered. Consequently, a transmission pattern carried by each signal is changed. In addition, due to factors such as crosstalk between channels, high-density multi-channel interconnection cannot be implemented in the entire transmission system.

SUMMARY

Embodiments of this disclosure provide a transmission system and a transmission method, to reduce or eliminate energy crosstalk between N signals transmitted on N coupled signal channels, so that the N signals can be transmitted on the N signal channels, and equalization difficulty and complexity are further reduced.

According to a first aspect, an embodiment of this disclosure provides a transmission system. The transmission system may include a sending apparatus and N signal channels, where $N \geq 2$, and N is an integer. The sending apparatus may include a first apparatus, and the first apparatus is configured to obtain N to-be-transmitted signals and an encoding coefficient group, where the N to-be-transmitted signals are represented as an N×1 signal matrix X, the encoding coefficient group is represented as an N×N orthogonal encoding matrix T, positive/negative signs of elements in any column of the orthogonal encoding matrix T are the same, and positive/negative signs of elements in remaining N−1 columns satisfy the following relationship: when N is an even number, a quantity of elements whose positive/negative signs are positive signs in any column of the N−1 columns is N/2, and a quantity of elements whose positive/negative signs are negative signs in any column of the N−1 columns is N/2, or when N is an odd number, a quantity of elements whose positive/negative signs are positive signs in any column of the N−1 columns is (N−1)/2, and a quantity of elements whose positive/negative signs are negative signs in any column of the N−1 columns is (N+1)/2, or a quantity of elements whose positive/negative signs are positive signs in any column of the N−1 columns is (N+1)/2, and a quantity of elements whose positive/negative signs are negative signs in any column of the N−1 columns is (N−1)/2, process the N to-be-transmitted signals based on the encoding coefficient group to generate N encoded first signals, where the N encoded first signals are represented as a signal matrix Y, and signal matrix Y=orthogonal encoding matrix T×signal matrix X, and send the N encoded first signals to the N signal channels, where a signal on each signal channel corresponds to an element in any row of the signal matrix Y.

It should be understood that the foregoing encoding coefficient group may be generated by the first apparatus, or may be provided by an external device to the first apparatus, or may be provided by a look up table (LUT) in the first apparatus, or may be obtained by the first apparatus from another device such as a server. This is not limited herein. In addition, the encoding coefficient group may be represented by using a matrix in a mathematical form, namely, the N×N orthogonal encoding matrix T. The orthogonal encoding matrix T is an orthogonal matrix, and elements in any two columns are orthogonal to each other. In addition, when N is set to different values, quantities of elements whose positive/negative signs are positive signs or quantities of elements whose positive/negative signs are negative signs in the orthogonal encoding matrix T are different. For details, reference may be made to the foregoing relationship.

In addition, the described positive/negative sign may be understood as an electric field direction of the to-be-transmitted signal when being transmitted on each signal channel. Same positive/negative signs indicate same electric field directions, and opposite positive/negative signs indicate opposite electric field directions. If the positive/negative sign is the positive sign, the electric field direction is from a signal line to a return reference ground (GND) or from the return reference ground to the signal line. If the positive/negative sign is the negative sign, the electric field direction is opposite to the electric field direction indicated when the positive/negative sign is the positive sign. Details are not described herein. The described return reference ground may be understood as a GND, which may be on a same plane or may not be on a same plane as N conductors in the N signal channels. Each conductor of the N conductors may match one return reference ground. Alternatively, the N conductors may jointly match one return reference ground. This is not limited.

In addition, in the orthogonal encoding matrix T, a value of each of elements in each column is in direct proportion to intensity of the foregoing electric field corresponding to the element, and N electric fields on the N signal channels form one transmission pattern. In other words, elements in each column correspond to one transmission pattern. In this case, at each moment, when the N encoded first signals sent by the sending apparatus are transmitted on the N signal channels, the N encoded first signals correspond to N transmission patterns that are orthogonal to each other.

In the foregoing manner, the orthogonal encoding matrix T represented by the encoding coefficient group is an N×N orthogonal matrix. Therefore, after obtaining the N to-be-transmitted signals, the first apparatus processes the N to-be-transmitted signals based on the encoding coefficient group, so that each of the generated N encoded first signals includes a proportion of the N to-be-transmitted signals. In addition, on a basis that elements in each column of the orthogonal encoding matrix T are orthogonal to each other, proportions of the N to-be-transmitted signals included in the N encoded first signals are independent of each other, do not cause crosstalk to another to-be-transmitted signal, and do not cause interference to another encoded first signal. In this way, after generating the N encoded first signals, the first apparatus may send each of the N encoded first signals to each signal channel. This reduces or eliminates energy crosstalk between the N signals transmitted on the N coupled signal channels, so that the N signals can be transmitted on the N signal channels, and equalization difficulty and complexity are further reduced.

Optionally, in some embodiments, when N=2, the orthogonal encoding matrix T is $$\begin{bmatrix} a & b \\ c & d \end{bmatrix},$$

where a positive/negative sign of any element of a, b, c, and d is opposite to positive/negative signs of the remaining elements, and the positive/negative signs of all the remaining elements are the same.

In the foregoing manner, when N=2, the two used signal channels are similar to a differential channel. When the encoding coefficient group may be represented by $$\begin{bmatrix} a & b \\ c & d \end{bmatrix},$$

the first apparatus processes two to-be-transmitted signals according to the encoding coefficient group to obtain two encoded first signals, so that each encoded first signal includes a proportion of the two to-be-transmitted signals. In addition, elements in a first column (a column in which a and c are located) and elements in a second column (a column in which b and d are located) are orthogonal to each other. In this case, proportions of the two to-be-transmitted signals included in the encoded first signals are independent of each other, does not cause crosstalk to another to-be-transmitted signal, and does not cause interference to another encoded first signal. This reduces or eliminates energy crosstalk between two signals transmitted on two coupled signal channels, and greatly enriches a scenario in which two to-be-transmitted signals are transmitted on a differential channel.

Optionally, in some other embodiments, |a|=|b|=|c|=|d|≠0, a and c correspond to a first transverse electromagnetic (TEM) mode of two TEM modes that are orthogonal to each other, b and d correspond to a second TEM mode of the two TEM modes that are orthogonal to each other, and the first TEM mode is different from the second TEM mode. It should be noted that two TEM modes that are orthogonal to each other, namely, an odd mode and an even mode, exist in the differential channel. The described odd mode may be understood as two signals whose electric field directions are opposite, and the described even mode may be understood as two signals whose electric field directions are the same. In the orthogonal encoding matrix T $$\begin{bmatrix} a & b \\ c & d \end{bmatrix}$$

described above, a and c may correspond to the first TEM mode, and b and d may correspond to the second TEM mode. When the described first TEM mode is the odd mode, the second TEM mode is the even mode. When the described first TEM mode is the even mode, the second TEM mode is the odd mode. The first TEM mode and the second TEM mode are not limited in this embodiment of this disclosure. In this way, when the two encoded first signals are transmitted on the two signal channels, the two encoded first signals can be transmitted to a receiving apparatus at an odd-mode velocity and an even-mode velocity, respectively. In this way, moments when the receiving apparatus receives the two signals is no longer changed with a code pattern, and no or less crosstalk exists between the two coupled signal channels.

Optionally, in some other embodiments, when N=4, elements in the orthogonal encoding matrix T satisfy the following relationship: positive/negative signs of elements in a first candidate column are the same, and the first candidate column is any column in the orthogonal encoding matrix T, positive/negative signs of elements that are in a first row and a second row and that are in a second candidate column are the same, positive/negative signs of elements that are in a third row and a fourth row and that are in the second candidate column are the same, the positive/negative signs of the elements in the first row and the second row are opposite to the positive/negative signs of the elements in the third row and the fourth row, and the second candidate column is any column in the orthogonal encoding matrix T other than the first candidate column, positive/negative signs of elements that are in a first row and a third row and that are in a third candidate column are the same, positive/negative signs of elements that are in a second row and a fourth row and that are in the third candidate column are the same, the positive/negative signs of the elements in the first row and the third row are opposite to the positive/negative signs of the elements in the second row and the fourth row, and the third candidate column is any column in the orthogonal encoding matrix T other than the first candidate column and the second candidate column, and positive/negative signs of elements that are in a first row and a fourth row and that are in a fourth candidate column are the same, positive/negative signs of elements that are in a second row and a third row and that are in the fourth candidate column are the same, the positive/negative signs of the elements in the first row and the fourth row are opposite to the positive/negative signs of the elements in the second row and the third row, and the fourth candidate column is a column in the orthogonal encoding matrix T other than the first candidate column, the second candidate column, and the third candidate column.

It should be noted that elements in each column of the orthogonal encoding matrix T correspond to one of N transmission modes that are orthogonal to each other. In this way, the first apparatus obtains the encoding coefficient group and four to-be-transmitted signals, and uses the orthogonal encoding matrix T (including elements in the first candidate column, elements in the second candidate column, elements in the third candidate column, and elements in the fourth candidate column) to represent the encoding coefficient group. In this case, the first apparatus may process the four to-be-transmitted signals based on the encoding coefficient group to obtain four encoded first signals, so that each encoded first signal includes a proportion of the four to-be-transmitted signals. In addition, the elements in the first candidate column, the elements in the second candidate column, the elements in the third candidate column, and the elements in the fourth candidate column are orthogonal to each other. In this case, proportions of the four to-be-transmitted signals included in the encoded first signals are independent of each other, do not cause crosstalk to another to-be-transmitted signal, and do not cause interference to another encoded first signal. This reduces or eliminates energy crosstalk between four signals transmitted on four coupled signal channels, and greatly enriches a scenario in which four to-be-transmitted signals are transmitted on four signal channels.

Optionally, in some other embodiments, the orthogonal encoding matrix T is a 4×4 Hadamard matrix.

Optionally, in some other embodiments, the N signal channels include N conductors and a first return reference ground. Each conductor of the N conductors has a matched first return reference ground, and/or the N conductors match the first return reference ground. Elements in each column of the orthogonal encoding matrix T correspond to any TEM mode of N TEM modes that are orthogonal to each other and that are transmitted on the N signal channels, and the positive/negative sign of each of elements in any column of the orthogonal encoding matrix T is the same as or opposite to an electric field direction from each conductor in the corresponding TEM mode to the matched first return reference ground.

It should be noted that the first return reference ground described above may be understood as a ground (GND), and each conductor may match one first return reference ground, or the N conductors may jointly match one first return reference ground. This is not limited herein. The N signal channels may transmit the N TEM modes that are orthogonal to each other. In each TEM mode, an electric field direction from each conductor of the N conductors to the matched first return reference ground may reflect a transmission pattern of a to-be-transmitted signal when being transmitted on a signal channel.

Optionally, in some other embodiments, a matrix D obtained by multiplying the orthogonal encoding matrix T, an inverse matrix $T^{-1}$ of the orthogonal encoding matrix T, and a signal channel matrix C satisfies the following condition: $D=T^{-1} \times C \times T$. Elements on a diagonal in the matrix D are all non-zero values, and a value of an element not on the diagonal is less than a preset threshold. The N signal channels are represented as the N×N signal channel matrix C. $S_{(N+i)(i)}$ is an element in an $i^{th}$ row and an $i^{th}$ column in the signal channel matrix C, and represents a pass-through characteristic of an $i^{th}$ signal channel in the N signal channels, $i \in [1, N]$, and i is an integer. $S_{(N+i)(j)}$ is an element in the $i^{th}$ row and a $j^{th}$ column in the signal channel matrix C, and represents a crosstalk characteristic of a $j^{th}$ channel in the N signal channels on the $i^{th}$ channel, $j \in [1, N]$, j is an integer, and $i \neq j$. It should be noted that a value of an element not on the diagonal is less than a preset threshold described above may be understood as that the value of the element not on the diagonal is as close as possible to 0. The described preset threshold is not limited in this embodiment.

In the foregoing manner, the matrix D obtained by multiplying the orthogonal encoding matrix T, the inverse matrix $T^{-1}$ of the orthogonal encoding matrix T, and the signal channel matrix C satisfies the following condition: $D=T^{-1} \times C \times T$. In this way, when the signal channels have insertion loss, the N signal channels are coupled, and the like, impact of the corresponding pass-through characteristic and corresponding crosstalk characteristic on the N signals transmitted on the N signal channels is eliminated, thereby greatly improving transmission effect of the N signals on the N signal channels.

Optionally, in some other embodiments, the N signal channels further include a second return reference ground. The second return reference ground is at a same layer as the N conductors, and the second return reference ground is a part of the first return reference ground. An element in the orthogonal encoding matrix T is obtained according to a first formula, and the first formula is:

$$T_{ij} = cons \times \sin\left(\frac{\sum_{u=1}^{j} S_u}{\sum_{u=1}^{N+1} S_u} \times i \times \pi\right),$$

$T_{ij}$ represents an element in an $i^{th}$ row and a $j^{th}$ column in the orthogonal encoding matrix T. cons is a constant not equal to zero. u, i, and $j \in [1, N]$, and u, i, and j are integers. $s_1$ is a distance from a first conductor of the N conductors to the second return reference ground. $S_{N+1}$ is a distance from an $N^{th}$ conductor of the N conductors to the second return reference ground. $S_u$ is a distance between centers of an $u^{th}$ conductor and a $(u-1)^{th}$ conductor in the N conductors.

The corresponding encoding coefficient group is obtained according to the foregoing first formula. The encoding coefficient group is applicable to a situation in which spacings between the N conductors included in the N signal channels may be equal or unequal, or distances from the conductors to corresponding return reference grounds at the same layer may be equal or unequal, thereby enriching scenarios.

Optionally, in some other embodiments, an element in the orthogonal encoding matrix T is obtained according to a second formula, and the second formula is:

$$T_{ij} = cons \times \sin\left(\frac{\sum_{u=1}^{j} u}{N+1} \times i \times \pi\right),$$

$T_{ij}$ represents an element in an $i^{th}$ row and a $j^{th}$ column in the orthogonal encoding matrix T. cons is a constant not equal to 0. u, i, and $j \in [1, N]$, and u, i, and j are integers.

The corresponding encoding coefficient group is obtained according to the foregoing second formula. The encoding coefficient group is applicable to a situation in which spacings between the N conductors included in the N signal channels are equal, thereby enriching scenarios.

Optionally, in some other embodiments, the orthogonal encoding matrix T is a feature matrix of a matrix E, and the matrix E is:

$$cons \times \begin{bmatrix} 1 & i/a & 0 & 0 \\ i/a & 1 & i/a & 0 \\ 0 & i/a & 1 & i/a \\ 0 & 0 & i/a & 1 \end{bmatrix},$$

i is an imaginary unit, a is a constant not equal to 0, and cons is a constant not equal to 0.

The feature matrix of the matrix E is used as the orthogonal encoding matrix T, so that the encoding coefficient group is represented. The encoding coefficient group can be applicable to a situation in which cross coupling exists between adjacent signal channels, thereby enriching use scenarios.

Optionally, in some other embodiments, the orthogonal encoding matrix T is a feature matrix of a matrix F, and the matrix F is:

$$cons \times \begin{bmatrix} 1 & i/a & i/b & 0 \\ i/a & 1 & i/a & i/b \\ i/b & i/a & 1 & i/a \\ 0 & i/b & i/a & 1 \end{bmatrix},$$

i is an imaginary unit, a and b both are constants not equal to 0, and cons is a constant not equal to 0.

The feature matrix of the matrix F is used as the orthogonal encoding matrix T, so that the encoding coefficient group is represented. The encoding coefficient group can be applicable to a situation in which cross coupling exists between adjacent signal channels and also between signal channels that are separated, thereby enriching use scenarios.

Optionally, in some other embodiments, the orthogonal encoding matrix T is a feature matrix of a matrix G, and the matrix G is:

$$cons \times \begin{bmatrix} 1 & i/a & i/b & i/c \\ i/a & 1 & i/a & i/b \\ i/b & i/a & 1 & i/a \\ i/c & i/b & i/a & 1 \end{bmatrix},$$

i is an imaginary unit, a, b, and c all are constants not equal to 0, and cons is a constant not equal to 0.

The feature matrix of the matrix G is used as the orthogonal encoding matrix T, so that the encoding coefficient group is represented. The encoding coefficient group can be applicable to a situation in which cross coupling exists between all adjacent signal channels, thereby enriching use scenarios.

Optionally, in some other embodiments, the sending apparatus may further include one or more devices of a transceiver module, a first modulator, a pre-emphasis device, and a digital-to-analog converter. The first apparatus includes a first encoder. The transceiver module is configured to obtain N binary data streams. One or more devices of the first modulator, the pre-emphasis device, and the digital-to-analog converter are configured to sequentially process the N binary data streams to obtain the N to-be-transmitted signals. The first encoder is configured to process the N to-be-transmitted signals based on the encoding coefficient group, to generate the N encoded first signals.

In the foregoing manner, the first apparatus in this embodiment may be an independent first encoder having an encoding function. In addition, the N to-be-transmitted signals may be digital domain signals or analog domain signals. Therefore, before the first encoder processes the N to-be-transmitted signals based on the encoding coefficient group, to generate the N encoded first signals, one or more devices of the first modulator, the pre-emphasis device, and the digital-to-analog converter may be configured to sequentially process the N binary data streams to obtain the N to-be-transmitted signals. In this way, the first encoder may encode the N to-be-transmitted signals based on the encoding coefficient group, to generate the N encoded first signals.

Optionally, in some other embodiments, the sending apparatus may further include one or more devices of a transceiver module, a first modulator, and a digital-to-analog converter. The first apparatus includes a second encoder. The transceiver module is configured to obtain N binary data streams. The first modulator is configured to process the N binary data streams to obtain the N to-be-transmitted signals. The second encoder is configured to perform pre-emphasis on and encode the N to-be-transmitted signals based on the encoding coefficient group, to generate the N encoded first signals. The digital-to-analog converter is configured to process the N encoded first signals, to generate N analog first signals.

It should be noted that the described second encoder is an encoding device including a first encoder and a pre-emphasis device. In other words, in addition to an encoding function, the second encoder further has a pre-emphasis function, and the N encoded first signals obtained after final processing by the second encoder are signals on which encoding and pre-emphasis are performed. In the foregoing manner, the second encoder is configured to perform pre-emphasis on and encode the N to-be-transmitted signals. Compared with encoding by using only the first encoder having an encoding function, the N encoded first signals generated by the second encoder do not need pre-emphasis by another pre-emphasis device. This reduces equalization difficulty and complexity and reduces costs.

Optionally, in some other embodiments, the sending apparatus may further include one or more devices of a transceiver module, a first modulator, and a pre-emphasis device. The first apparatus includes a third encoder. The transceiver module is configured to obtain N binary data streams. One or more devices of the first modulator and the pre-emphasis device are configured to sequentially process the N binary data streams to obtain the N to-be-transmitted signals. The third encoder is configured to encode and perform digital-to-analog conversion on the N to-be-transmitted signals based on the encoding coefficient group, to generate the N encoded first signals.

It should be noted that the described third encoder is an encoding device including a first encoder and a digital-to-analog converter. In other words, in addition to an encoding function, the third encoder further has a digital-to-analog conversion function. The N encoded first signals obtained after final processing by the third encoder are encoded analog signals. In the foregoing manner, the third encoder is configured to perform digital-to-analog conversion on and encode the N to-be-transmitted signals. Compared with encoding by using only the first encoder having an encoding function, the N encoded first signals generated by the third encoder do not need digital-to-analog conversion by another digital-to-analog converter. This reduces encoding process difficulty and complexity and reduces costs.

Optionally, in some other embodiments, the sending apparatus may further include a distributor. The distributor is configured to, before the transceiver module obtains the N binary data streams, obtain at least one to-be-transmitted binary data stream, and distribute the at least one to-be-transmitted binary data stream as the N binary data streams.

Optionally, in some other embodiments, the N signal channels include one or more of a PCB trace, a cable, a connector, a via, an edge connector, a package trace, and a package ball. It should be noted that the N signal channels may be connected in a serial connection or cascading manner.

Optionally, in some other embodiments, the transmission system may further include a receiving apparatus. The receiving apparatus is configured to receive N second signals, and process the N second signals. The N second signals are signals obtained after the N encoded first signals pass through the N signal channels.

In the foregoing manner, in a process of transmitting the N encoded first signals on the N signal channels, because the signal channels have insertion loss and the N signal channels are coupled with each other, the N encoded first signals may be affected by the crosstalk characteristic and the pass-through characteristic between the N signal channels during transmission on the N signal channels. Therefore, the crosstalk characteristic and the pass-through characteristic between the N signal channels may further be considered. In this way, the receiving apparatus may receive the signals obtained after the N encoded first signals pass through the N signal channels, namely, the N second signals, and then decode the N second signals by using a decoding coefficient group, or process the N second signals by using de-interleaving, a butterfly operation, or the like to obtain N processed third signals corresponding to the N to-be-transmitted signals.

Optionally, in some other embodiments, the receiving apparatus may include a second apparatus. The second apparatus is configured to obtain the decoding coefficient group, where the decoding coefficient group is represented as an N×N decoding matrix R, a product of the decoding matrix R and the orthogonal encoding matrix T is a diagonal matrix, and elements on a diagonal in the diagonal matrix are all non-zero values, and process the N second signals based on the decoding coefficient group to obtain N third signals, where any one of the N third signals corresponds to one of the N to-be-transmitted signals. It should be noted that values of the elements on the diagonal of the diagonal matrix may be equal or unequal. When the values of the elements on the diagonal are unequal, amplification or reduction multiples of third signals to to-be-transmitted signals corresponding to the third signals are different.

In the foregoing manner, for the N different signal channels, encoding coefficient groups used by the first apparatus to process the N to-be-transmitted signals are different. Therefore, it only needs to ensure that an association relationship exists between the decoding coefficient group and the encoding coefficient group, that is, only a product of the orthogonal encoding matrix T and the decoding matrix R is required to be a diagonal matrix, so that in a process of decoding the N second signals by the second apparatus, each signal may be accurately decoded.

Optionally, in some other embodiments, the diagonal matrix is an M-fold unit matrix, M is a constant, and M≠0.

Optionally, in some other embodiments, the second apparatus may include a first decoder, and the receiving apparatus further includes one or more devices of an analog equalizer, an analog-to-digital converter, and a digital signal processing (DSP) equalizer. The first decoder is configured to decode the N second signals based on the decoding coefficient group to obtain the N third signals. The N third signals are sequentially processed by one or more devices of the analog equalizer, the analog-to-digital converter, and the DSP equalizer, to obtain the N processed third signals. It should be noted that the described second apparatus may be an independent first decoder having a decoding function.

In the foregoing manner, after receiving the N second signals, the first decoder can directly decode the N second signals based on the foregoing decoding coefficient group, to obtain the N third signals. After decoding is completed, equalization and the like may further be considered for insertion loss of a channel link. Therefore, the N third signals may further be sequentially processed by one or more devices of the analog equalizer, the analog-to-digital converter, and the DSP equalizer, to obtain the N processed third signals. In this way, impact of insertion loss of the channel link may be eliminated, thereby obtaining a signal with better quality.

Optionally, in some other embodiments, the receiving apparatus may further include one or more devices of an analog-to-digital converter and a DSP equalizer, and the second apparatus includes a second decoder. The second decoder is configured to obtain the decoding coefficient group, and equalize insertion loss of and decode the N second signals based on the decoding coefficient group to obtain the N third signals. The N third signals are sequentially processed by one or more devices of the analog-to-digital converter and the DSP equalizer, to obtain the N processed third signals.

It should be noted that the described second decoder is a decoding device including an analog equalizer and a first decoder. In other words, in addition to a decoding function, the second decoder further has a function of insertion loss equalization. The N third signals obtained after final processing by the second decoder are signals that have undergone link insertion loss equalization and that have impact of link insertion loss eliminated or partially eliminated. In the foregoing manner, after decoding and insertion loss equalization by the second decoder, the N third signals may further be sequentially processed by one or more devices of a data slicer, the analog-to-digital converter, and the DSP equalizer, to obtain the N processed third signals. In this way, impact of insertion loss of a channel link may be eliminated, thereby obtaining a signal with better quality. In addition, compared with decoding the N second signals by using the foregoing first decoder having an independent decoding function, the N third signals obtained by the second decoder do not need insertion loss equalization by using another analog equalizer, thereby reducing decoding process difficulty and complexity.

Optionally, in some other embodiments, the receiving apparatus may further include one or more devices of an analog equalizer, a data slicer, and an analog-to-digital converter, and the second apparatus includes a third decoder. The N second signals are sequentially processed by one or more devices of the analog equalizer, the data slicer, and the analog-to-digital converter, to obtain N fourth signals. The third decoder is configured to obtain the decoding coefficient group, and equalize and decode the N fourth signals based on the decoding coefficient group, to obtain the N third signals.

It should be noted that the described third decoder is a decoding device including a DSP equalizer and a first decoder. In other words, in addition to a decoding function, the third decoder further has a DSP equalization function.

Therefore, before the third decoder decodes a signal, the received N second signals may be first sequentially processed by one or more of the analog equalizer, the data slicer, and the analog-to-digital converter, to obtain the N fourth signals. Then, the third decoder performs equalization on and decodes the N fourth signals based on the decoding coefficient group, to obtain the N third signals. In addition, compared with decoding the N second signals by using the foregoing first decoder having an independent decoding function, the N third signals obtained by the third decoder do not need equalization by using another DSP equalizer, thereby reducing decoding process difficulty and complexity.

Optionally, in some other embodiments, the receiving apparatus may further include one or more devices of an analog equalizer, an analog-to-digital converter, and a DSP equalizer. One or more devices of the analog equalizer, the analog-to-digital converter, and the DSP equalizer are configured to sequentially process the N second signals to obtain the N processed third signals.

Optionally, in some other embodiments, the receiving apparatus may further include a first demodulator and a first combiner. The first demodulator is configured to demodulate the N third signals to obtain N demodulated signals. The first combiner is configured to combine at least two demodulated signals of the N demodulated signals to obtain one binary data stream.

Optionally, in some other embodiments, the receiving apparatus may further include a second demodulator and a second combiner. The second demodulator is configured to demodulate the N processed third signals to obtain N demodulated signals. The second combiner is configured to combine at least two demodulated signals of the N demodulated signals to obtain one binary data stream.

According to a second aspect, an embodiment of this disclosure provides a transmission method. The transmission method may be used in a sending apparatus. The transmission method may include obtaining N to-be-transmitted signals and an encoding coefficient group, where the N to-be-transmitted signals are represented as an N×1 signal matrix X, the encoding coefficient group is represented as an N×N orthogonal encoding matrix T, positive/negative signs of elements in any column of the orthogonal encoding matrix T are the same, and positive/negative signs of elements in remaining N−1 columns satisfy the following relationship: when N is an even number, a quantity of elements whose positive/negative signs are positive signs in any column of the N−1 columns is N/2, and a quantity of elements whose positive/negative signs are negative signs in any column of the N−1 columns is N/2, or when N is an odd number, a quantity of elements whose positive/negative signs are positive signs in any column of the N−1 columns is (N−1)/2, and a quantity of elements whose positive/negative signs are negative signs in any column of the N−1 columns is (N+1)/2, or a quantity of elements whose positive/negative signs are positive signs in any column of the N−1 columns is (N+1)/2, and a quantity of elements whose positive/negative signs are negative signs in any column of the N−1 columns is (N−1)/2, N≥2, and N is an integer, processing the N to-be-transmitted signals based on the encoding coefficient group to generate N encoded first signals, where the N encoded first signals are represented as a signal matrix Y, and signal matrix Y=orthogonal encoding matrix T×signal matrix X, and sending the N encoded first signals to N signal channels, where a signal on each signal channel corresponds to an element in any row of the signal matrix Y.

Optionally, in some other embodiments, the transmission method may further include the following. When N=2, the orthogonal encoding matrix T is $$\begin{bmatrix} a & b \\ c & d \end{bmatrix},$$

a positive/negative sign of any element of a, b, c, and d is opposite to positive/negative signs of the remaining elements, and positive/negative signs of all the remaining elements are the same.

Optionally, in some other embodiments, $|a|=|b|=|c|=|d|\neq 0$, a and c correspond to a first TEM mode of two TEM modes that are orthogonal to each other, b and d correspond to a second TEM mode of the two TEM modes that are orthogonal to each other, and the first TEM mode is different from the second TEM mode.

Optionally, in some other embodiments, the transmission method further includes, when N=4, elements in the orthogonal encoding matrix T satisfy the following relationship: positive/negative signs of elements in a first candidate column are the same, and the first candidate column is any column in the orthogonal encoding matrix T, positive/negative signs of elements that are in a first row and a second row and that are in a second candidate column are the same, positive/negative signs of elements that are in a third row and a fourth row and that are in the second candidate column are the same, the positive/negative signs of the elements in the first row and the second row are opposite to the positive/negative signs of the elements in the third row and the fourth row, and the second candidate column is any column in the orthogonal encoding matrix T other than the first candidate column, positive/negative signs of elements that are in a first row and a third row and that are in a third candidate column are the same, positive/negative signs of elements that are in a second row and a fourth row and that are in the third candidate column are the same, the positive/negative signs of the elements in the first row and the third row are opposite to the positive/negative signs of the elements in the second row and the fourth row, and the third candidate column is any column in the orthogonal encoding matrix T other than the first candidate column and the second candidate column, and positive/negative signs of elements that are in a first row and a fourth row and that are in a fourth candidate column are the same, positive/negative signs of elements that are in a second row and a third row and that are in the fourth candidate column are the same, the positive/negative signs of the elements in the first row and the fourth row are opposite to the positive/negative signs of the elements in the second row and the third row, and the fourth candidate column is a column in the orthogonal encoding matrix T other than the first candidate column, the second candidate column, and the third candidate column.

Optionally, in some other embodiments, the orthogonal encoding matrix T is a 4×4 Hadamard matrix.

Optionally, in some other embodiments, the N signal channels include N conductors and a first return reference ground. The first return reference ground matches each conductor of the N conductors, and/or the first return reference ground matches the N conductors. Elements in each column of the orthogonal encoding matrix T correspond to any TEM mode of N TEM modes that are orthogonal to each other and that are transmitted on the N signal channels, and the positive/negative sign of each of elements in any column of the orthogonal encoding matrix T is the same as or opposite to an electric field direction from each conductor in the corresponding TEM mode to the matched first return reference ground.

Optionally, in some other embodiments, a matrix D obtained by multiplying the orthogonal encoding matrix T, an inverse matrix $T^{-1}$ of the orthogonal encoding matrix T, and a signal channel matrix C satisfies the following condition: $D=T^{-1} \times C \times T$. Elements on a diagonal in the matrix D are all non-zero values, and a value of an element not on the diagonal is less than a preset threshold. The N signal channels are represented as the N×N signal channel matrix C. $S_{(N+i)(i)}$ is an element in an $i^{th}$ row and an $i^{th}$ column in the signal channel matrix C, and represents a pass-through characteristic of an $i^{th}$ signal channel in the N signal channels, $i \in [1, N]$, and i is an integer. $S_{(N+i)(j)}$ is an element in the $i^{th}$ row and a $j^{th}$ column in the signal channel matrix C, and represents a crosstalk characteristic of a $j^{th}$ channel in the N signal channels on the $i^{th}$ channel, $j \in [1, N]$, j is an integer, and $i \neq j$.

Optionally, in some other embodiments, the N signal channels may further include a second return reference ground. The second return reference ground is at a same layer as the N conductors, and the second return reference ground is a part of the first return reference ground. An element in the orthogonal encoding matrix T is obtained according to a first formula, and the first formula is:

$$T_{ij} = cons \times \sin\left(\frac{\sum_{u=1}^{j} S_u}{\sum_{u=1}^{N+1} S_u} \times i \times \pi\right),$$

$T_{ij}$ represents an element in an $i^{th}$ row and a $j^{th}$ column in the orthogonal encoding matrix T. cons is a constant not equal to zero. u, i, and $j \in [1, N]$, and u, i, and j are integers. $s_1$ is a distance from a first conductor of the N conductors to the second return reference ground. $S_{N+1}$ is a distance from an $N^{th}$ conductor of the N conductors to the second return reference ground. $S_u$ is a distance between centers of an $u^{th}$ conductor and a $(u-1)^{th}$ conductor in the N conductors.

Optionally, in some other embodiments, an element in the orthogonal encoding matrix T is obtained according to a second formula, and the second formula is:

$$T_{ij} = cons \times \sin\left(\frac{\sum_{u=1}^{j} u}{N+1} \times i \times \pi\right),$$

$T_{ij}$ represents an element in an $i^{th}$ row and a $j^{th}$ column in the orthogonal encoding matrix T. cons is a constant not equal to 0. u, i, and $j \in [1, N]$, and u, i, and j are integers.

Optionally, in some other embodiments, the orthogonal encoding matrix T is a feature matrix of a matrix E, and the matrix E is:

$$cons \times \begin{bmatrix} 1 & i/a & 0 & 0 \\ i/a & 1 & i/a & 0 \\ 0 & i/a & 1 & i/a \\ 0 & 0 & i/a & 1 \end{bmatrix},$$

i is an imaginary unit, a is a constant not equal to 0, and cons is a constant not equal to 0.

Optionally, in some other embodiments, the orthogonal encoding matrix T is a feature matrix of a matrix F, and the matrix F is:

$$cons \times \begin{bmatrix} 1 & i/a & i/b & 0 \\ i/a & 1 & i/a & i/b \\ i/b & i/a & 1 & i/a \\ 0 & i/b & i/a & 1 \end{bmatrix},$$

i is an imaginary unit, a and b both are constants not equal to 0, and cons is a constant not equal to 0.

Optionally, in some other embodiments, the orthogonal encoding matrix T is a feature matrix of a matrix G, and the matrix G is:

$$cons \times \begin{bmatrix} 1 & i/a & i/b & i/c \\ i/a & 1 & i/a & i/b \\ i/b & i/a & 1 & i/a \\ i/c & i/b & i/a & 1 \end{bmatrix},$$

i is an imaginary unit, a, b, and c all are constants not equal to 0, and cons is a constant not equal to 0.

Optionally, in some other embodiments, obtaining N to-be-transmitted signals may include obtaining N binary data streams, and processing the N binary data streams to obtain the N to-be-transmitted signals. Correspondingly, generating N encoded first signals includes encoding the N to-be-transmitted signals based on the encoding coefficient group, to obtain the N encoded first signals.

Optionally, in some other embodiments, obtaining N to-be-transmitted signals may include obtaining N binary data streams, and processing the N binary data streams to obtain the N to-be-transmitted signals. Correspondingly, generating N encoded first signals includes performing pre-emphasis on and encoding the N to-be-transmitted signals based on the encoding coefficient group, to generate the N encoded first signals. The transmission method further includes performing digital-to-analog conversion on the N encoded first signals, to generate N analog first signals.

Optionally, in some other embodiments, obtaining N to-be-transmitted signals may include obtaining N binary data streams, and processing the N binary data streams to obtain the N to-be-transmitted signals. Correspondingly, generating N encoded first signals includes performing digital-to-analog conversion on and encoding the N to-be-transmitted signals based on the encoding coefficient group, to generate the N encoded first signals.

Optionally, in some other embodiments, the transmission method may further include, before obtaining N binary data streams, obtaining at least one to-be-transmitted binary data stream, and distributing the at least one to-be-transmitted binary data stream as the N binary data streams.

Optionally, in some other embodiments, the N signal channels include one or more of a PCB trace, a cable, a connector, a via, an edge connector, a package trace, and a package ball.

According to a third aspect, an embodiment of this disclosure provides a transmission method. The transmission method is used in a receiving apparatus. The transmission method includes receiving N second signals, where the N second signals are signals obtained after N encoded first signals pass through N signal channels, the N encoded first signals are obtained after a sending apparatus processes N to-be-transmitted signals based on an encoding coefficient group, the encoding coefficient group is represented as an N×N orthogonal encoding matrix T, positive/negative signs of elements in any column of the orthogonal encoding matrix T are the same, and positive/negative signs of elements in remaining N−1 columns satisfy the following relationship: when N is an even number, a quantity of elements whose positive/negative signs are positive signs in any column of the N−1 columns is N/2, and a quantity of elements whose positive/negative signs are negative signs in any column of the N−1 columns is N/2, or when N is an odd number, a quantity of elements whose positive/negative signs are positive signs in any column of the N−1 columns is (N−1)/2, and a quantity of elements whose positive/negative signs are negative signs in any column of the N−1 columns is (N+1)/2, or a quantity of elements whose positive/negative signs are positive signs in any column of the N−1 columns is (N+1)/2, and a quantity of elements whose positive/negative signs are negative signs in any column of the N−1 columns is (N−1)/2, and processing the N second signals.

Optionally, in some other embodiments, processing the N second signals may include obtaining a decoding coefficient group, where the decoding coefficient group is represented as an N×N decoding matrix R, a product of the decoding matrix R and the orthogonal encoding matrix T is a diagonal matrix, and elements on a diagonal in the diagonal matrix are all non-zero values, and processing the N second signals based on the decoding coefficient group to obtain N third signals, where any one of the N third signals corresponds to one of the N to-be-transmitted signals.

Optionally, in some other embodiments, the diagonal matrix is an M-fold unit matrix, M is a constant, and M≠0.

Optionally, in some other embodiments, processing the N second signals based on the decoding coefficient group to obtain N third signals may include decoding the N second signals based on the decoding coefficient group to obtain the N third signals. The transmission method further includes sequentially performing analog equalization, analog-to-digital conversion, and/or DSP equalization on the N third signals to obtain N processed third signals.

Optionally, in some other embodiments, processing the N second signals based on the decoding coefficient group to obtain N third signals may include obtaining the decoding coefficient group, and performing equalization on and decoding the N second signals based on the decoding coefficient group to obtain the N third signals. The transmission method may further include sequentially performing analog-to-digital conversion and/or DSP equalization on the N third signals to obtain N processed third signals.

Optionally, in some other embodiments, the transmission method may further include performing analog equalization and/or analog-to-digital conversion on the N second signals to obtain N fourth signals. Correspondingly, the processing the N second signals based on the decoding coefficient group to obtain N third signals may include obtaining the decoding coefficient group, and performing DSP equalization on and decoding the N fourth signals based on the decoding coefficient group, to obtain the N third signals.

Optionally, in some other embodiments, the processing the N second signals may include sequentially performing analog equalization, analog-to-digital conversion, and/or DSP equalization on the N second signals.

Optionally, in some other embodiments, the transmission method may further include demodulating the N third signals to obtain N demodulated signals, and combining, by a combiner in the receiving apparatus, at least two demodulated signals of the N demodulated signals to obtain one binary data stream.

Optionally, in some other embodiments, the transmission method may further include demodulating the N processed third signals to obtain N demodulated signals, and combining, by a combiner in the receiving apparatus, at least two demodulated signals of the N demodulated signals to obtain one binary data stream.

According to a fourth aspect, an embodiment of this disclosure provides a transmission system. The transmission system may include N signal channels, a sending apparatus that performs the second aspect or any transmission method in the second aspect, and a receiving apparatus that performs the third aspect or any transmission method in the third aspect.

According to a fifth aspect, an embodiment of this disclosure provides a sending apparatus. The sending apparatus may include a memory configured to store computer-readable instructions. The sending apparatus may further include a processor coupled to the memory, and configured to execute the computer-readable instructions in the memory, so that the sending apparatus is enabled to perform the method described in any one of the second aspect or the possible implementations of the second aspect.

According to a sixth aspect, an embodiment of this disclosure provides a receiving apparatus. The receiving apparatus may include a memory configured to store computer-readable instructions. The receiving apparatus may further include a processor coupled to the memory, and configured to execute the computer-readable instructions in the memory, so that the receiving apparatus is enabled to perform the method described in any one of the third aspect or the possible implementations of the third aspect.

According to a seventh aspect, an embodiment of this disclosure provides a computer-readable storage medium, including instructions. When the instructions are run on a computer, the computer is enabled to perform the method according to any one of the second aspect, the possible implementations of the second aspect, the third aspect, or the possible implementations of the third aspect.

According to an eighth aspect, an embodiment of this disclosure provides a computer program product including instructions. When the computer program product runs on a computer, the computer is enabled to perform the method according to any one of the second aspect, the possible implementations of the second aspect, the third aspect, or the possible implementations of the third aspect.

A ninth aspect of this disclosure provides a chip system. The chip system may include a processor configured to support a sending apparatus in implementing a function involved in the method described in any one of the second aspect or the possible implementations of the second aspect, or support a receiving apparatus in implementing a function involved in the method described in any one of the third aspect or the possible implementations of the third aspect.

Optionally, with reference to the ninth aspect, in a first possible implementation, the chip system may further include a memory. The memory is configured to store program instructions and data that are necessary for the sending apparatus and receiving apparatus. The chip system may include a chip, or may include a chip and another discrete device. The chip system may include an application-specific integrated circuit (ASIC), a field-programmable gate array (FPGA), another programmable logic device, or the like. Further, the chip system may further include an interface circuit and the like.

Technical effects obtained in the second aspect to the ninth aspect are similar to technical effects obtained by using corresponding technical means in the first aspect. Details are not described herein again.

It can be learned from the foregoing technical solutions that embodiments of this disclosure have the following advantages.

In embodiments of this disclosure, an N×N orthogonal encoding matrix T may represent an encoding coefficient group. Therefore, after obtaining N to-be-transmitted signals, a first apparatus processes the N to-be-transmitted signals based on the encoding coefficient group, so that each of generated N encoded first signals includes a proportion of the N to-be-transmitted signals. In addition, on a basis that elements in each column of the orthogonal encoding matrix T are orthogonal to each other, so that the elements in each column correspond to one of N transmission modes of N signal channels, proportions of the N to-be-transmitted signals included in the encoded first signals are independent of each other, do not cause crosstalk to another to-be-transmitted signal, and do not cause interference to another encoded first signal. In this way, after generating the N encoded first signals, the first apparatus may send each of the N encoded first signals to each signal channel. This reduces or eliminates energy crosstalk between the N signals transmitted on the N coupled signal channels, so that the N signals can be transmitted on the N signal channels, and equalization difficulty and complexity are further reduced.

BRIEF DESCRIPTION OF DRAWINGS

To describe the technical solutions in some embodiments of this disclosure more clearly, the following briefly describes the accompanying drawings for describing embodiments. It is clear that the accompanying drawings in the following description show merely some embodiments of this disclosure.

FIG. 1A is a schematic diagram of a transmission apparatus based on chord encoding according to an existing solution;

FIG. 1B is a schematic diagram of an encoding matrix and a decoding matrix according to an existing solution;

FIG. 2A is a schematic diagram of a transmission pattern of a transmission mode in a differential channel according to an embodiment of this disclosure;

FIG. 19 is a schematic diagram of a flowchart of a transmission method according to an embodiment of this disclosure.

DESCRIPTION OF EMBODIMENTS

Figure 2B:
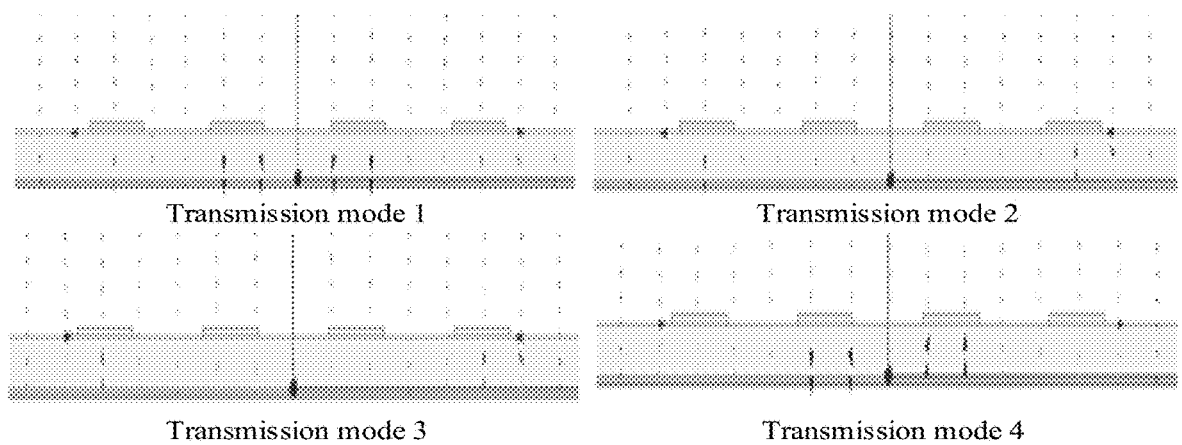
FIG. 2B is a schematic diagram of a transmission pattern of a transmission mode in a four-channel PCB trace according to an embodiment of this disclosure.

Embodiments of this disclosure disclose a transmission system and a transmission method, to reduce or eliminate energy crosstalk between N signals transmitted on N coupled signal channels, so that the N signals can be transmitted on the N signal channels, and equalization difficulty and complexity are further reduced.

The following clearly and describes the technical solutions in embodiments of this disclosure with reference to the accompanying drawings in embodiments of this disclosure. The described embodiments are merely a part of embodiments instead of all embodiments of this disclosure. All other embodiments obtained by a person of ordinary skill in the art based on embodiments of this disclosure without creative efforts shall fall within the protection scope of this disclosure.

In the specification, claims, and accompanying drawings of this disclosure, terms "first", "second", "third", "fourth", and the like (if existent) are intended to distinguish between similar objects but do not necessarily indicate a specific order or sequence. It should be understood that data termed in such a way is interchangeable in proper circumstances, so that embodiments of this disclosure described herein can be implemented in an order other than the order illustrated or described herein. In addition, terms "include", "have", and any other variant thereof are intended to cover a non-exclusive inclusion. In this disclosure, "at least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" generally indicates an "or" relationship between the associated objects. "At least one of the following items (pieces)" or a similar expression thereof is any combination of these items, including any combination of singular items (pieces) or plural items (pieces). For example, at least one item (piece) of a, b, or c may represent a, b, c, a and b, a and c, b and c, or a, b, and c, where a, b, and c may be singular or plural. It should be noted that "at least one item (piece)" may also be explained as "one item (piece) or more items (pieces)".

In a current high-speed communication system, for example, a transmission device such as a router, a switch, or an optical transport network, a communication apparatus, a chip, or the like, a passive channel such as a PCB trace, a cable, a package trace, or a connector is used to complete interconnection between a sending apparatus and a receiving apparatus, or between chips. In a process of sending data through the passive channel, reference may be made to FIG. 1A. FIG. 1A is a schematic diagram of a transmission apparatus based on chord encoding according to an existing solution. As shown in FIG. 1A, after jointly encoding three signals a, b, and c by using an encoding matrix, the sending apparatus sends encoded signals a, b, and c to the receiving apparatus through four channels x, y, z, and u. In this way, to restore data corresponding to the three signals a, b, and c, after receiving the three encoded signals a, b, and c, the receiving apparatus performs addition and subtraction on every two signals of the three encoded signals a, b, and c by using a corresponding decoding matrix, so that the three signals a, b, and c are restored. In addition, the encoding matrix and the decoding matrix described above may be understood based on the schematic diagram shown in FIG. 1B. Apparently, as shown in FIG. 1B, the encoding matrix is a 4×4 integer coefficient matrix (i.e., Hadamard matrix). Therefore, when a sum of elements in a row is not zero, it may be considered that there is a large direct-current component, which causes a poor common mode characteristic. Therefore, the decoding matrix shown in FIG. 1B is a 3×4 matrix.

That is, in a related technology, joint encoding is performed on N−1 to-be-encoded signals only by using an N×N Hadamard matrix, to generate N signals, and the N signals are transmitted through N signal channels. The receiving apparatus decodes the N signals by using an (N−1)×N decoding matrix to obtain N−1 signals. In other words, in the chord encoding manner, after joint encoding is performed on the N−1 signals based on only the N×N Hadamard matrix, the N signals are transmitted through the N signal channels. However, cross coupling exists between the N signal channels, and channel-level impact always exists on the N signals. As a result, the N signals encoded by using the N×N-dimensional Hadamard matrix do not match transmission modes on the N signal channels. Consequently, a transmission pattern carried by each signal is changed, and a signal transmission rate at unit density cannot be increased.

The described transmission mode may be understood as a transmission pattern. In a transmission system with N cross-coupled signal channels, although cross coupling exits between the N signal channels, if the N signal channels can transmit transmission patterns corresponding to N transmission modes that are orthogonal to each other and that match the N signal channels, the transmission pattern corresponding to each transmission mode is not changed in a transmission process even after each transmission mode undergoes crosstalk of the N cross-coupled signal channels. FIG. 2A is a schematic diagram of a transmission pattern of a transmission mode in a differential channel according to this embodiment. As shown in FIG. 2A, in the differential channel, signals of mode 1 may be transmitted, and signals of another mode 2 may also be synchronously transmitted. The signals of the two modes may carry different information. In addition, as shown in FIG. 2A, electric field directions of the signals of the transmission mode 1 are opposite, and the transmission mode 1 in FIG. 2A may be referred to as an odd mode, and electric field directions of the signals of the transmission mode 2 are the same, and the transmission mode 2 in FIG. 2A may be referred to as an even mode. Similarly, reference may alternatively be made to FIG. 2B. FIG. 2B is a schematic diagram of a transmission pattern of a transmission mode in a four-channel PCB trace according to this embodiment. As shown in FIG. 2B, in the four-channel PCB trace, signals of a transmission mode 1 may be transmitted, and signals of another transmission mode 2, signals of a transmission mode 3, and signals of a transmission mode 4 may also be synchronously transmitted. The signals of the four transmission modes may carry different information.

Therefore, to resolve problems described in FIG. 1A and FIG. 1B, if it can be ensured that the N signal channels can transmit the transmission patterns corresponding to the N transmission modes that are orthogonal to each other, the corresponding transmission patterns may not be changed in the transmission process. Based on this, an embodiment of this disclosure provides a transmission system, applied to a high-speed interconnection scenario in which a wired connection is used, for example, a high-speed interconnection scenario between chips, between cards (line cards), between a chip and a module, between modules, between systems, or between a chip and an "optical module". The transmission system is intended to encode N to-be-transmitted signals by using an obtained encoding coefficient group, so that generated N encoded first signals can correspond to N transmission modes. This reduces or eliminates channel crosstalk and the like caused by the N signal channels to the N signals, so that the N encoded first signals can be independently transmitted through the N signal channels without changing a transmission pattern carried by each encoded first signal. In addition, based on multi-channel data transmission, the signal transmission rate at unit density can be increased, and transmission with low power consumption can be implemented.

The described chip may further include but is not limited to a switch chip or an interface chip used in a router, a switch, or an OTN transmission device, or may be a mobile phone chip, a central processing unit (CPU) chip, an interface chip that requires high-speed communication, or the like. This is not limited herein.

Figure 3:
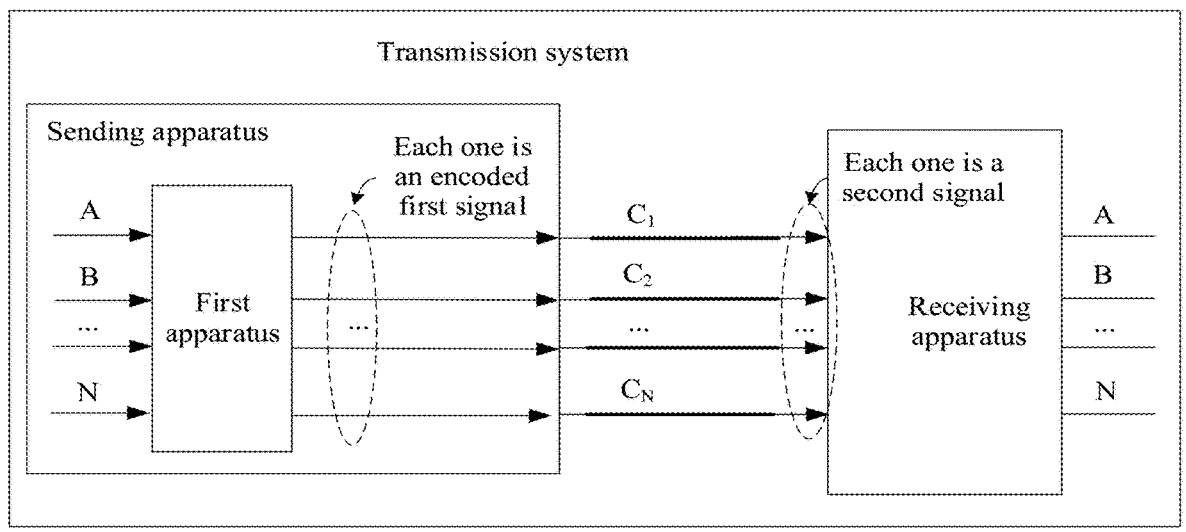
FIG. 3 is a schematic diagram of a framework of a transmission system according to an embodiment of this disclosure.

FIG. 3 is a schematic diagram of a framework of a transmission system according to an embodiment of this disclosure. As shown in FIG. 3, the transmission system may include a sending apparatus, a receiving apparatus, and N signal channels, where N≥2, and N is an integer. The sending apparatus may include a first apparatus, and the sending apparatus is connected to the receiving apparatus through the N signal channels. After a to-be-sent binary data stream is distributed as N to-be-transmitted signals (for example, A, B, ..., and N) through processing by the sending apparatus and encoding by the first apparatus, N encoded first signals are transmitted to the receiving apparatus through the N signal channels (for example, $C_1$, $C_2$, ..., and $C_N$). In this way, after being transmitted through the N signal channels, the N encoded first signals are converted into N second signals. After receiving the N second signals, the receiving apparatus processes the N second signals to obtain data related to the N to-be-transmitted signals.

To eliminate channel crosstalk and the like generated by the N signal channels to the N to-be-transmitted signals and enable the N to-be-transmitted signals to be independently transmitted through the N signal channels, the first apparatus shown in FIG. 3 may process such as encode the obtained N to-be-transmitted signals. In this way, each encoded first signal includes a part of to-be-transmitted signals corresponding to one transmission mode, and each signal channel may independently transmit one encoded first signal. There is almost no crosstalk between signals. Further, the first apparatus shown in FIG. 3 may perform the following functions: obtaining the N to-be-transmitted signals and an encoding coefficient group, processing the N to-be-transmitted signals based on the encoding coefficient group, to generate the N encoded first signals, and sending the N encoded first signals to the N signal channels.

For ease of subsequent description of an encoding process, the N to-be-transmitted signals described above may be represented by using a matrix in a mathematical form, that is, the N to-be-transmitted signals may be represented by an N×1 signal matrix X, for example, $$\begin{bmatrix} A \\ B \\ \ldots \\ N \end{bmatrix}.$$

Each of A, B, ..., and N represents one to-be-transmitted signal. The described encoding coefficient group may also be represented by a matrix in a mathematical form, that is, the encoding coefficient group may be represented as an N×N orthogonal encoding matrix T, for example, $$\begin{bmatrix} T_{11} & T_{12} & \ldots & T_{1N} \\ T_{21} & T_{22} & \ldots & T_{2N} \\ \ldots & \ldots & \ldots & \ldots \\ T_{N1} & T_{N2} & \ldots & T_{NN} \end{bmatrix}.$$

It should be noted that the orthogonal encoding matrix T is an orthogonal matrix, and elements in any two columns are orthogonal to each other. In addition, when N is set to different values, quantities of elements whose positive/negative signs are positive signs or quantities of elements whose positive/negative signs are negative signs in the orthogonal encoding matrix T are different. Further, positive/negative signs of elements in any column of the orthogonal encoding matrix T are the same, and positive/negative signs of elements in remaining N−1 columns satisfy the following relationship: when N is an even number, a quantity of elements whose positive/negative signs are positive signs in any column of the N−1 columns is N/2, and a quantity of elements whose positive/negative signs are negative signs in any column of the N−1 columns is N/2, or when N is an odd number, a quantity of elements whose positive/negative signs are positive signs in any column of the N−1 columns is (N−1)/2, and a quantity of elements whose positive/negative signs are negative signs in any column of the N−1 columns is (N+1)/2, or a quantity of elements whose positive/negative signs are positive signs in any column of the N−1 columns is (N+1)/2, and a quantity of elements whose positive/negative signs are negative signs in any column of the N−1 columns is (N−1)/2.

It should be understood that, for positive/negative signs of elements in the remaining N−1 columns, a sum of a quantity of elements whose positive/negative signs are the positive signs and a quantity of elements whose positive/negative signs are the negative signs in each column is equal to N. In addition, the described positive/negative sign may be understood as an electric field direction of the to-be-transmitted signal when being transmitted on each signal channel. Same positive/negative signs indicate same electric field directions, and opposite positive/negative signs indicate opposite electric field directions. If the positive/negative sign is the positive sign, the electric field direction is from a signal line to a return reference ground (GND) or from the return reference ground to the signal line. If the positive/negative sign is the negative sign, the electric field direction is opposite to the electric field direction indicated when the positive/negative sign is the positive sign. Details are not described herein. The described return reference ground may be understood by referring to content described in FIG. 4. Details are not described herein. In addition, a value of each of elements in each column is in direct proportion to intensity of the foregoing electric field corresponding to the element, and N electric fields on the N signal channels form one transmission pattern. In other words, elements in each column correspond to one transmission pattern. In this case, at each moment, when the N encoded first signals sent by the sending apparatus are transmitted on the N signal channels, the N encoded first signals correspond to N transmission patterns that are orthogonal to each other.

$$\begin{bmatrix} -1 & 1 & 1 \\ 1 & 1 & -1 \\ 1 & 1 & 1 \end{bmatrix}.$$

For example, when N is 3, the orthogonal encoding matrix T may be Elements $$\begin{bmatrix} -1 \\ 1 \\ 1 \end{bmatrix}$$

in a first column indicate electric field directions of a to-be-transmitted signal when the to-be-transmitted signal is transmitted on three signal channels. The electric field directions in two signal channels are the same, and the electric field direction in one signal channel is opposite to those in the two signal channels. Another column may be understood by referring to the elements in the first column, and details are not described herein again. In an actual application, the orthogonal encoding matrix T may alternatively be $$\begin{bmatrix} -1 & 1 & 1 \\ -1 & 1 & -1 \\ 1 & 1 & -1 \end{bmatrix}, \begin{bmatrix} 1 & -1 & 1 \\ 1 & 1 & 1 \\ 1 & 1 & -1 \end{bmatrix},$$

or the like. This is not limited herein.

In this way, the N encoded first signals generated after the N to-be-transmitted signals are processed by using the encoding coefficient group may also be represented by using a matrix in a mathematical form, that is, the N encoded first signals may be represented as a signal matrix Y. Further, signal matrix Y=orthogonal encoding matrix T×signal matrix X, namely, $$\begin{bmatrix} T_{11} \times A + T_{12} \times B + \ldots + T_{1N} \times N \\ T_{21} \times A + T_{22} \times B + \ldots + T_{2N} \times N \\ \ldots \\ T_{N1} \times A + T_{N2} \times B + \ldots + T_{NN} \times N \end{bmatrix} = \begin{bmatrix} T_{11} & T_{12} & \ldots & T_{1N} \\ T_{21} & T_{22} & \ldots & T_{2N} \\ \ldots & \ldots & \ldots & \ldots \\ T_{N1} & T_{N2} & \ldots & T_{NN} \end{bmatrix} \times \begin{bmatrix} A \\ B \\ \ldots \\ N \end{bmatrix}.$$

Elements in each row of the signal matrix Y may represent one encoded first signal, that is, $T_{11} \times A + T_{12} \times B + \ldots + T_{1N} \times N$, $T_{21} \times A + T_{22} \times B + \ldots + T_{2N} \times N$, ..., and $T_{N1} \times A + T_{N2} \times B + \ldots + T_{NN} \times N$ each represent one encoded first signal.

In addition, it can further be learned from the foregoing matrix Y that each encoded first signal includes a proportion of each of the N to-be-transmitted signals, and the proportion mainly depends on the foregoing orthogonal encoding matrix T. For example, the encoded first signal represented by $T_{11} \times A + T_{12} \times B + \ldots + T_{1N} \times N$ is used as an example. The encoded first signal includes a $T_{11}$-fold to-be-transmitted signal A, a $T_{12}$-fold to-be-transmitted signal B, ..., and a $T_{1N}$-fold to-be-transmitted signal N.

In addition, the orthogonal encoding matrix T is an orthogonal matrix. Therefore, in the signal matrix Y obtained by multiplying the orthogonal encoding matrix T by the signal matrix X, elements in each column of the signal matrix Y are also orthogonal to each other, so that the N encoded first signals are independent of each other. In other words, the encoded first signal represented by $T_{11} \times A + T_{12} \times B + \ldots + T_{1N} \times N$, the encoded first signal represented by $T_{21} \times A + T_{22} \times B + \ldots + T_{2N} \times N$, ..., and the encoded first signal represented by $T_{N1} \times A + T_{N2} \times B + \ldots + T_{NN} \times N$ are all independent. Therefore, when one encoded first signal is transmitted through each of the N signal channels, the encoded first signal transmitted is not affected by crosstalk and the like of another signal channel.

In this way, the first apparatus may send the N encoded first signals to the N signal channels. A signal on each signal channel corresponds to an element in a row of the signal matrix Y. In other words, after generating the N encoded first signals, the first apparatus may transmit one encoded first signal through each signal channel.

For example, if N=2, the orthogonal encoding matrix T is $$\frac{1}{2}\begin{bmatrix} 1 & 1 \\ 1 & -1 \end{bmatrix},$$

the signal matrix X is $$\begin{bmatrix} A \\ B \end{bmatrix},$$

and the signal channels are $C_1$ and $C_2$, the corresponding signal matrix Y=

$$\frac{1}{2}\begin{bmatrix} 1 & 1 \\ 1 & -1 \end{bmatrix} \times \begin{bmatrix} A \\ B \end{bmatrix} = \begin{bmatrix} \frac{A}{2} + \frac{B}{2} \\ \frac{A}{2} - \frac{B}{2} \end{bmatrix}.$$

Elements $$\begin{bmatrix} \frac{1}{2} \\ \frac{1}{2} \end{bmatrix}$$

in a first column of the orthogonal encoding matrix T are orthogonal to elements $$\begin{bmatrix} \frac{1}{2} \\ -\frac{1}{2} \end{bmatrix}$$

in a second column of the orthogonal encoding matrix T. Therefore, in a process of transmitting an encoded first signal represented by $$\frac{A}{2} + \frac{B}{2}$$

through the signal channel $C_1$ and transmitting an encoded first signal represented by $$\frac{A}{2} - \frac{B}{2}$$

through the signal channel $C_2$, a proportion of a to-be-transmitted signal A (for example, A/2) transmitted in the signal channel $C_1$ and a proportion of the to-be-transmitted signal A (for example, A/2) transmitted in the signal channel $C_2$ correspond to the transmission mode 2 in the differential channel, and a proportion of a to-be-transmitted signal B (for example, B/2) transmitted in the signal channel $C_1$ and a proportion of the to-be-transmitted signal B (for example, −B/2) transmitted in the signal channel $C_2$ correspond to the transmission mode 1 in the differential channel. The transmission mode 1 and the transmission mode 2 are orthogonal to each other. Therefore A/2 transmitted in the signal channel $C_1$ does not cause interference to transmitted B/2. In addition, transmitted $$\frac{A}{2} + \frac{B}{2}$$

is not affected by the signal channel $C_2$. This gradually eliminates channel-level impact of signal channels to a to-be-transmitted signal. Correspondingly, A/2 transmitted in the signal channel $C_2$ does not cause interference to transmitted −B/2. In addition, transmitted $$\frac{A}{2} - \frac{B}{2}$$

is not affected by the signal channel $C_1$.

It should be understood that the foregoing encoding coefficient group may be generated by the first apparatus, or may be provided by an external device to the first apparatus, or may be provided by an LUT in the first apparatus, or may be obtained by the first apparatus from another device such as a server. This is not limited herein.

The foregoing N signal channels may be connected in a serial connection or cascading manner. The N signal channels may be one or more of a PCB trace, a cable, a connector, a via, an edge connector, a package trace, and a package ball. This is not limited herein.

In addition, the foregoing transmission system may include but is not limited to a terminal device such as a general-purpose computer, a router, a switch, a smart wearable device, and a mobile terminal. This is not limited herein. The described sending apparatus and receiving apparatus may be configured on the chip, the card (line card), the module, or the like described above. This is not limited herein.

In this embodiment of this disclosure, the orthogonal encoding matrix T represented by the encoding coefficient group is an N×N orthogonal matrix. Therefore, after obtaining the N to-be-transmitted signals, the first apparatus processes the N to-be-transmitted signals based on the encoding coefficient group, so that each of the generated N encoded first signals includes a proportion of the N to-be-transmitted signals. In addition, on a basis that elements in each column of the orthogonal encoding matrix T are orthogonal to each other, proportions of the N to-be-transmitted signals included in the encoded first signals are independent of each other, do not cause crosstalk to another to-be-transmitted signal, and do not cause interference to another encoded first signal. Therefore, after generating the N encoded first signals, the first apparatus may send each encoded first signal to each signal channel.

Optionally, in some other examples, the N signal channels described above may include N conductors and a first return reference ground. Each conductor of the N conductors has a matched first return reference ground, and/or the N conductors have a same first return reference ground.

Elements in each column of the orthogonal encoding matrix T correspond to any TEM mode of N TEM modes that are orthogonal to each other and that are transmitted on the N signal channels, and the positive/negative sign of each of elements in any column of the orthogonal encoding matrix T is the same as or opposite to an electric field direction from each conductor in the corresponding TEM mode to the matched first return reference ground.

The first return reference ground described above may be understood as a ground (GND), and each conductor may match one first return reference ground, or the N conductors may jointly match one first return reference ground. This is not limited herein.

The N signal channels may transmit the N TEM modes that are orthogonal to each other. In each TEM mode, an electric field direction from each conductor of the N conductors to the matched first return reference ground may reflect a transmission pattern of a to-be-transmitted signal when being transmitted on a signal channel. Therefore, elements in each column of the orthogonal encoding matrix T may correspond to any TEM mode of the N TEM modes. In this way, the positive/negative sign of each of elements in any column is the same as an electric field direction from each conductor in the corresponding TEM mode to the matched first return reference ground, or the positive/negative sign of each of elements in any column is opposite to an electric field direction from each conductor in the corresponding TEM mode to the matched first return reference ground.

Figure 4:
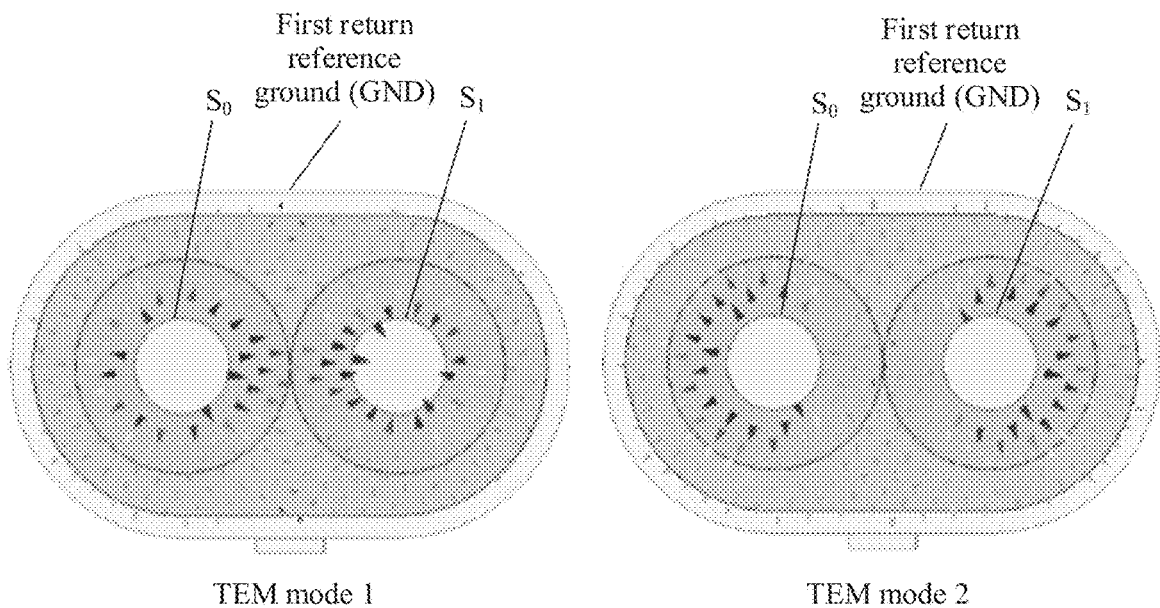
FIG. 4 is a schematic diagram of a transmission pattern in a differential channel.

For example, FIG. 4 is a schematic diagram of a transmission pattern in a differential channel. As shown in FIG. 4, each TEM mode includes two conductors (for example, $S_0$ and $S_1$), and each conductor matches a corresponding first return reference ground (for example, GND). In addition, in a TEM mode 1, electric field directions from $S_0$ and $S_1$ to the matched first return reference ground GND are opposite, so that directions of the transmitted signals are opposite. ±1 represents signal directions. In this case, the two transmitted signals may be 1 and −1, or −1 and 1. In other words, regardless of whether the transmitted signals are 1 and −1 or −1 and 1, the transmitted TEM modes are considered as the same TEM mode, namely, the TEM mode 1.

Similarly, in a TEM mode 2, electric field directions from $S_0$ and $S_1$ to a first return reference ground G are the same, so that directions of the transmitted signals are the same, and may be 1 and 1, or may be −1 and −1. In other words, regardless of whether the transmitted signals are 1 and 1 or −1 and −1, the transmitted TEM modes are considered as the same, namely, the TEM mode 2.

In this case, in the corresponding orthogonal encoding matrix T, the positive/negative sign of each of elements in the first column may be set to "−" or "+", or may be set to "+" or "−", and the positive/negative sign of each of elements in the second column may be "+" or "+", or may be "−" or "−". This is not limited herein. In addition, the transmitted signal may be an analog signal, a binary signal, or the like. ±1 described above merely indicates the direction of the transmitted signal, and should not be considered as a binary digital signal.

In this way, when the first apparatus processes the N to-be-transmitted signals based on the corresponding encoding coefficient group, in the obtained N encoded first signals, a proportion of any to-be-transmitted signal in each of the N encoded first signals corresponds to elements in a column of the orthogonal encoding matrix T.

When N is set to different values, the binary data stream is usually distributed and modulated to generate N to-be-transmitted signals in different forms, namely, N pulse-amplitude modulation (PAM)-m signals. In this case, the first apparatus needs to obtain different encoding coefficient groups, to encode the N to-be-transmitted signals in different forms and then transmit N encoded first signals on the corresponding N signal channels. For example, when N=2, the two signal channels are similar to a differential channel, and corresponding to-be-transmitted signals may be non-return-to-zero (NRZ) signals (namely, PAM-2), or may be other PAM-m signals, and m may be set to 4, 6, 8, 16, or the like. This is not limited herein. When N=4, the four signal channels may be similar to a four-core cable, a PCB trace with a group of four channels, or the like. A modulated and generated to-be-transmitted signal may be an NRZ signal, a PAM-4 signal, a PAM-16 signal, or the like. This is not limited herein. The corresponding encoding coefficient group varies depending on a quantity of signal channels. The following uses N=2 and N=4 as examples to describe the encoding coefficient group in different situations.

(1) Describe a corresponding encoding coefficient group when N=2.

Further, when N=2, the orthogonal encoding matrix T represented by the encoding coefficient group may be $$\begin{bmatrix} a & b \\ c & d \end{bmatrix}.$$

The positive/negative sign of any element in a, b, c, and d is opposite to positive/negative signs of the remaining elements, and the positive/negative signs of all the remaining elements are the same.

It should be noted that when N=2, the two used signal channels are similar to the differential channel, that is, two signal channels are used to transmit two signals, and the two signals carry different data information. In addition, specific values of the elements a, b, c, and d are not limited in this embodiment, provided that the positive/negative sign of any one of the elements a, b, c, and d is opposite to the positive/negative signs of the remaining elements, and the positive/negative signs of all the remaining elements are the same.

For example, the orthogonal encoding matrix T may include but is not limited to $$\frac{1}{2}\begin{bmatrix} 1 & 1 \\ 1 & -1 \end{bmatrix}, \frac{1}{2}\begin{bmatrix} 1 & -1 \\ 1 & 1 \end{bmatrix}, \frac{1}{2}\begin{bmatrix} 1 & 1 \\ -1 & 1 \end{bmatrix}, \text{ and } \frac{1}{2}\begin{bmatrix} -1 & 1 \\ 1 & 1 \end{bmatrix}.$$

This is not limited in this embodiment.

In some examples, the specific values of the elements a, b, c, and d described above may satisfy the following condition: $|a|=|b|=|c|=|d|\neq 0$. a and c correspond to a first TEM mode of two TEM modes that are orthogonal to each other, b and d correspond to a second TEM mode of the two TEM modes that are orthogonal to each other, and the first TEM mode is different from the second TEM mode.

It should be noted that two TEM modes that are orthogonal to each other, namely, an odd mode and an even mode, exist in the differential channel. The described odd mode may be understood as two signals whose electric field directions are opposite, and the described even mode may be understood as two signals whose electric field directions are the same. For example, as shown in FIG. 4, the TEM mode 1 may be considered as the odd mode, and the TEM mode 2 may be considered as the even mode. In the orthogonal encoding matrix T $$\begin{bmatrix} a & b \\ c & d \end{bmatrix}$$

described above, a and c may correspond to the first TEM mode, and b and d may correspond to the second TEM mode. When the described first TEM mode is the odd mode, the second TEM mode is the even mode. When the described first TEM mode is the even mode, the second TEM mode is the odd mode. The first TEM mode and the second TEM mode are not limited in this embodiment of this disclosure.

(2) The foregoing mainly describes the corresponding encoding coefficient group when N=2, and the following describes a corresponding encoding coefficient group when N=4.

To transmit four to-be-transmitted signals through four signal channels and ensure that transmission patterns of the four to-be-transmitted signals are not changed, it needs to be ensured that elements in each column of a 4×4 orthogonal encoding matrix T represented by the encoding coefficient group can reflect the transmission pattern of one to-be-transmitted signal, that is, elements in each column need to correspond to one TEM mode. Further, when N=4, elements in the orthogonal encoding matrix T should satisfy the following relationship: positive/negative signs of elements in a first candidate column are the same, and the first candidate column is any column in the orthogonal encoding matrix T, positive/negative signs of elements that are in a first row and a second row and that are in a second candidate column are the same, positive/negative signs of elements that are in a third row and a fourth row and that are in the second candidate column are the same, the positive/negative signs of the elements in the first row and the second row are opposite to the positive/negative signs of the elements in the third row and the fourth row, and the second candidate column is any column in the orthogonal encoding matrix T other than the first candidate column, positive/negative signs of elements that are in a first row and a third row and that are in a third candidate column are the same, positive/negative signs of elements that are in a second row and a fourth row and that are in the third candidate column are the same, the positive/negative signs of the elements in the first row and the third row are opposite to the positive/negative signs of the elements in the second row and the fourth row, and the third candidate column is any column in the orthogonal encoding matrix T other than the first candidate column and the second candidate column, and positive/negative signs of elements that are in a first row and a fourth row and that are in a fourth candidate column are the same, positive/negative signs of elements that are in a second row and a third row and that are in the fourth candidate column are the same, the positive/negative signs of the elements in the first row and the fourth row are opposite to the positive/negative signs of the elements in the second row and the third row, and the fourth candidate column is a column in the orthogonal encoding matrix T other than the first candidate column, the second candidate column, and the third candidate column.

It should be noted that the first candidate column described above is only any column in the orthogonal encoding matrix T, and is not limited to the first column of the four columns. Similarly, the second candidate column is any column in the orthogonal encoding matrix T except the first candidate column, that is, any column in the remaining three columns other than the first candidate column. The described third candidate column is any column except the first candidate column and the second candidate column in the orthogonal encoding matrix T, that is, any column of the two remaining columns other than the first candidate column and the second candidate column. The described fourth candidate column is any column except the first candidate column, the second candidate column, and the third candidate column in the orthogonal encoding matrix T, that is, the remaining column other than the first candidate column, the second candidate column, and the third candidate column.

For example, as shown in FIG. 2B, the first candidate column may correspond to the transmission mode 1, the second candidate column may correspond to the transmission mode 2, the third candidate column may correspond to a transmission mode 3, and the fourth candidate column may correspond to a transmission mode 4. In an actual application, the described first candidate column, second candidate column, third candidate column, and fourth candidate column are not limited to correspond to the transmission modes shown in FIG. 2B. This is not limited herein.

In some examples, the orthogonal encoding matrix T described above may be a 4×4 Hadamard matrix. The described Hadamard matrix may be $$\frac{1}{4}\begin{bmatrix} 1 & 1 & 1 & 1 \\ 1 & 1 & -1 & -1 \\ -1 & 1 & 1 & -1 \\ -1 & 1 & -1 & 1 \end{bmatrix}.$$

It should be understood that, in addition to using, for example, an integer coefficient matrix shown by the Hadamard matrix to describe the orthogonal encoding matrix T, in some PCB traces, cables, and the like of N signal channels, an obtained encoding coefficient group may appear in a decimal form due to spacings between the N signal channels, that is, the elements in the orthogonal encoding matrix T are presented in a decimal form. The following describes, by using a sine function, the encoding coefficient groups obtained by using N signal channels whose spacings may not be equal and N signal channels whose spacings are equal, respectively.

1. For the N signal channels whose spacings may not be equal:

In some other examples, in a situation in which spacings between the N conductors included in the N signal channels may be equal or may be unequal, or distances from the conductors to corresponding return reference grounds at a same layer may be equal or may be unequal, the corresponding encoding coefficient group may be obtained in the following manner, that is, an element in the orthogonal encoding matrix T is obtained according to a first formula. The described first formula is:

$$T_{ij} = cons \times \sin(\frac{\sum_{u=1}^{j} S_u}{\sum_{u=1}^{N+1} S_u} \times i \times \pi),$$

$T_{ij}$ represents an element in an $i^{th}$ row and a $j^{th}$ column in the orthogonal encoding matrix T. cons is a constant not equal to zero. u, i, and j∈[1, N], and u, i, and j are integers. $s_1$ is a distance from a first conductor of the N conductors to a second return reference ground. $S_{N+1}$ is a distance from an $N^{th}$ conductor of the N conductors to the second return reference ground. $S_u$ is a distance between centers of an $u^{th}$ conductor and a $(u-1)^{th}$ conductor in the N conductors. The second return reference ground described above is further included in the N signal channels, the second return reference ground is at the same layer as the N conductors, and the second return reference ground is a part of the first return reference ground.

Figure 5A:
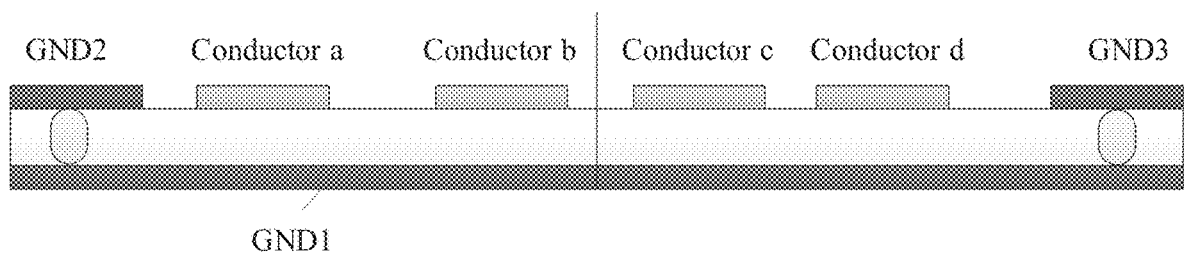
FIG. 5A is a schematic diagram of a PCB trace with four signal channels.

For example, a PCB trace with four signal channels is used as an example. For details, reference may be made to FIG. 5A. FIG. 5A is a schematic diagram of a PCB trace with four signal channels. As shown in FIG. 5A, the PCB trace with four signal channels includes four conductors (for example, a conductor a, a conductor b, a conductor c, and a conductor d), and include a first return reference ground (for example, GND1) and a second return reference ground (for example, GND2 or GND3). The described GND2 or GND3 is located on a same plane as the four conductors a, b, c, and d. In addition, GND2 or GND3 may be connected to GND1 through a via. For ease of clear description, in this embodiment, the four conductors a, b, c, and d may be referred to as a first conductor, a second conductor, a third conductor, and a fourth conductor sequentially from left to right. In this way, after a distance from the conductor a to the GND2 and a distance from the conductor d to the GND3 are calculated, and a spacing between centers of every two conductors is calculated, a value of each element in the orthogonal encoding matrix T may be calculated according to the foregoing first formula.

Figure 5B:
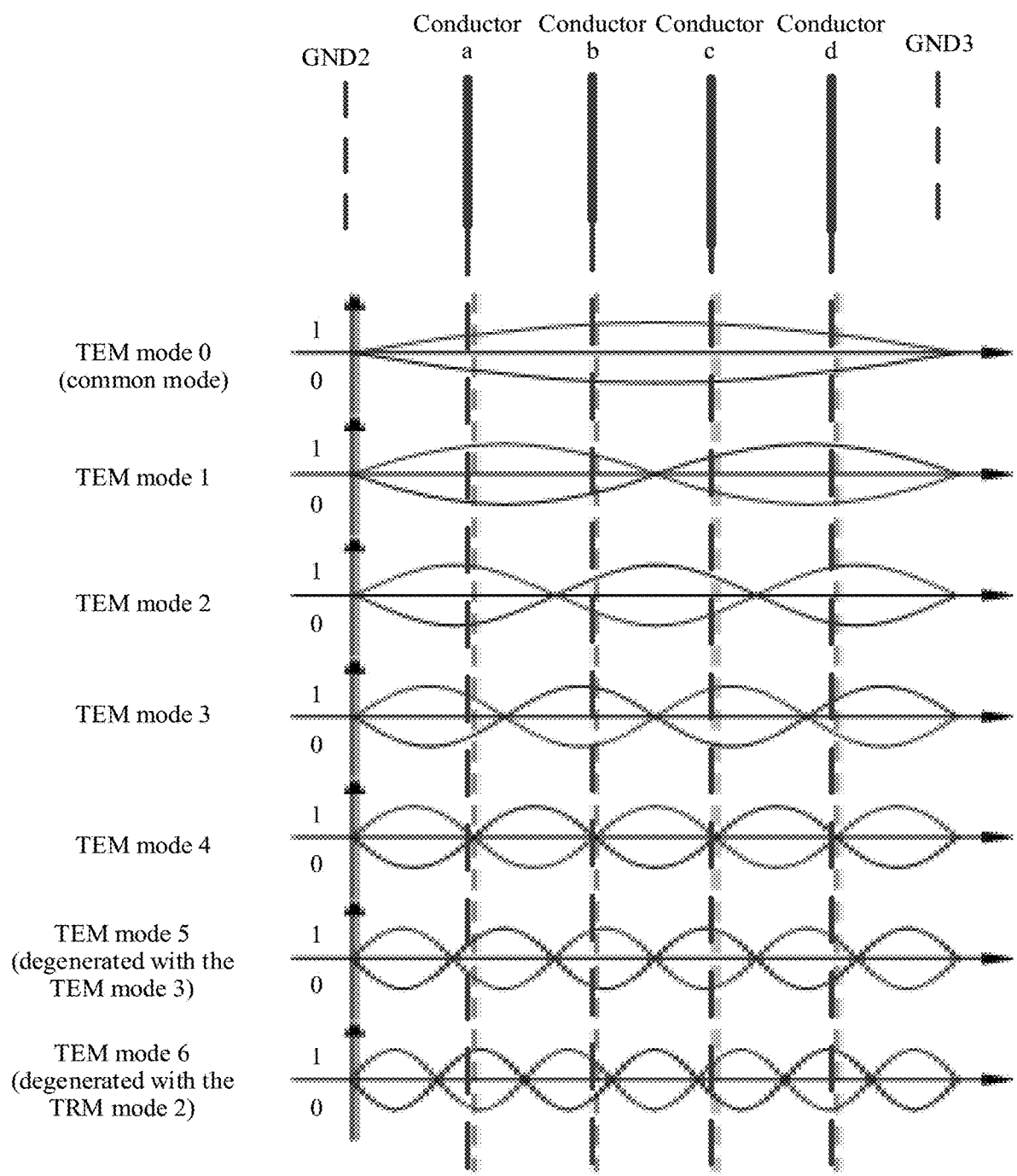
FIG. 5B is a schematic diagram of obtaining an orthogonal encoding matrix T by using a sine function.

Further, calculating the value of each element in the orthogonal encoding matrix T according to the foregoing first formula may also be understood by referring to a schematic diagram of a sine function shown in FIG. 5B. Corresponding coefficients are calculated based on intercepts of the sine function on different conductors, and different sine periods correspond to different TEM modes. The coefficients obtained through solving form an encoding coefficient group, and then the foregoing orthogonal encoding matrix T is obtained.

2. For the N signal channels whose spacings are equal:

In some other examples, if the spacings between the N conductors included in the N signal channels are equal and the spacings between the conductors and the corresponding second return reference grounds at the same layer are equal (for example, if the distance from the conductor a to the GND2, the distance from the conductor d to the GND3, and the distances between the four conductors a, b, c, and d shown in FIG. 5A are equal), the corresponding encoding coefficient group may be obtained in the following manner, that is, the orthogonal encoding matrix T may be obtained according to a second formula, and the described second formula is:

$$T_{ij} = cons \times \sin(\frac{\sum_{u=1}^{j} u}{N = 1} \times i \times \pi),$$

$T_{ij}$ represents an element in an $i^{th}$ row and a $j^{th}$ column in the orthogonal encoding matrix T. cons is a constant not equal to 0. u, i, and j∈[1, N], and u, i, and j are integers. In addition, in some specific embodiments, the N signal channels may not include the second return reference ground that is at the same layer as the conductor, and only include N equally spaced conductors and the first return reference ground that matches the N equally spaced conductors. In this case, the orthogonal encoding matrix T may also be obtained according to the second formula.

The foregoing mainly uses a sine function and the spacings between the N signal channels to consider the encoding coefficient group. In an actual application, the obtained encoding coefficient groups may also be different due to cross coupling between the N signal channels. The following describes how to obtain the encoding coefficient group from a perspective of a transmission line theory.

Figure 6A:
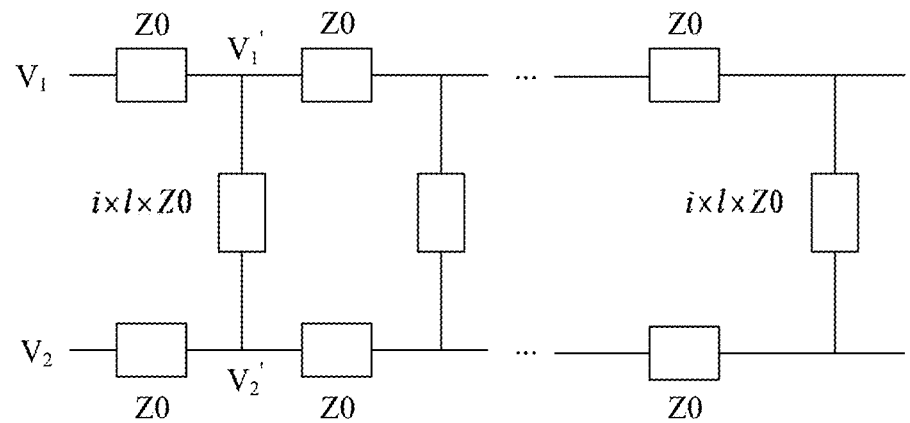
FIG. 6A is a schematic diagram of a differential circuit of two lossless coupled transmission lines of unit lengths.

A principle is first described from a perspective of a differential line coupled by using two signal channels. FIG. 6A is a schematic diagram of a differential circuit of two lossless coupled transmission lines of unit lengths. As shown in FIG. 6A, the two signal channels are respectively $C_1$ and $C_2$, Z0 may be understood as characteristic impedance of the signal channel, and / is used to describe a distance between the two signal channels. A longer distance indicates a larger value of /. i×l×Z0 may be understood as coupling impedance between the signal channels, and i is an imaginary unit. If there is no coupling relationship between the two signal channels, a value of / is close to ∞, and voltages at input ends $V'_1=V_1$ and $V'_2=V_2$. If coupling between C1 and C2 is considered, $V'_1$ and $V'_2$ may be approximately equal to:

$$V'_1 = V_1 + \frac{\frac{Z0}{2}}{\frac{Z0}{2} + i \times l \times Z0} \times V_2,$$

$$\text{and } V'_2 = \frac{\frac{Z0}{2}}{\frac{Z0}{2} + i \times l \times Z0} \times V_1 + V_2.$$

Through simplification, $V'_1$ and $V'_2$ may be represented as the following matrix:

$$\begin{bmatrix} V'_1 \\ V'_2 \end{bmatrix} = \begin{bmatrix} 1 & 1/(1+i\times 2l) \\ 1/(1+i\times 2l) & 1 \end{bmatrix} \begin{bmatrix} V_1 \\ V_2 \end{bmatrix}.$$

For ease of expression, the matrix may further be simplified into the following matrix:

$$\begin{bmatrix} V'_1 \\ V'_2 \end{bmatrix} = \begin{bmatrix} 1 & i/a \\ i/a & 1 \end{bmatrix} \begin{bmatrix} V_1 \\ V_2 \end{bmatrix} \quad (1)$$

$$a = i \times (1 + i \times 2l).$$

In this case, an orthogonal encoding matrix of the two signal channels is a feature matrix of the matrix $$\begin{bmatrix} 1 & i/a \\ i/a & 1 \end{bmatrix}.$$

For any value a, a solved feature matrix is $$\begin{bmatrix} \frac{\sqrt{2}}{2} & \frac{\sqrt{2}}{2} \\ \frac{\sqrt{2}}{2} & -\frac{\sqrt{2}}{2} \end{bmatrix}, \begin{bmatrix} -\frac{\sqrt{2}}{2} & \frac{\sqrt{2}}{2} \\ \frac{\sqrt{2}}{2} & \frac{\sqrt{2}}{2} \end{bmatrix}, \begin{bmatrix} \frac{\sqrt{2}}{2} & \frac{\sqrt{2}}{2} \\ -\frac{\sqrt{2}}{2} & \frac{\sqrt{2}}{2} \end{bmatrix}, \text{ or } \begin{bmatrix} \frac{\sqrt{2}}{2} & -\frac{\sqrt{2}}{2} \\ \frac{\sqrt{2}}{2} & \frac{\sqrt{2}}{2} \end{bmatrix}.$$

In this case, $$\frac{\sqrt{2}}{2}$$

may be extracted, and a corresponding feature matrix is changed into $$\frac{\sqrt{2}}{2}\begin{bmatrix} 1 & 1 \\ 1 & -1 \end{bmatrix}, \frac{\sqrt{2}}{2}\begin{bmatrix} -1 & 1 \\ 1 & 1 \end{bmatrix}, \frac{\sqrt{2}}{2}\begin{bmatrix} 1 & 1 \\ -1 & 1 \end{bmatrix}, \text{ or } \frac{\sqrt{2}}{2}\begin{bmatrix} 1 & -1 \\ 1 & 1 \end{bmatrix}.$$

In this way, the foregoing feature matrix may be used as the corresponding orthogonal encoding matrix T when N=2.

Figure 6B:
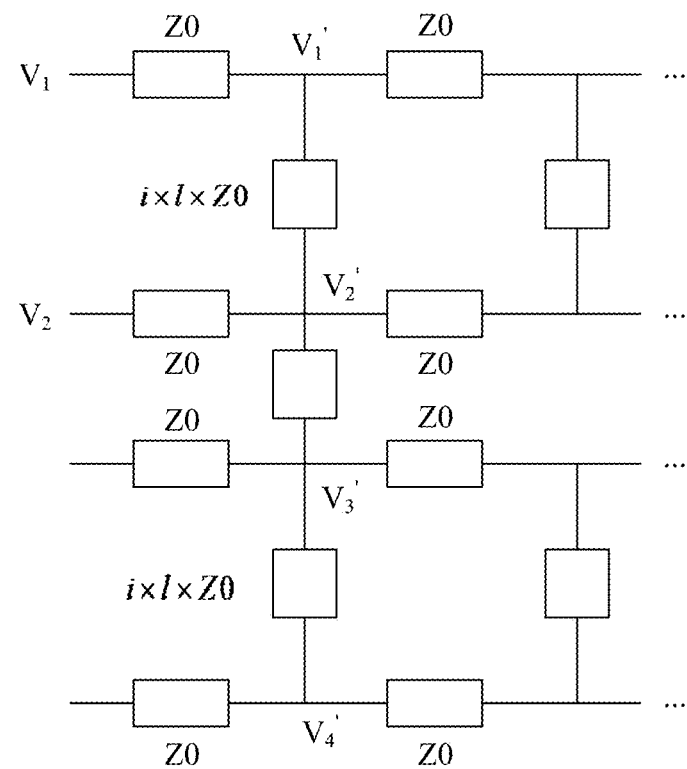
FIG. 6B is a schematic diagram of a differential circuit of four lossless coupled transmission lines of unit lengths.

Based on a same principle, four signal channels are used as an example. Reference may be made to a schematic diagram of a differential circuit of four lossless coupled transmission lines of unit lengths shown in FIG. 6B. As shown in FIG. 6B, the four signal channels are $C_1$, $C_2$, $C_3$, and $C_4$. If there is no coupling relationship between the four signal channels, the value of $l$ is close to $\infty$, and $V'_1=V_1$, $V'_2=V_2$, $V'_3=V_3$, and $V'_4=V_4$. If coupling exists between $C_1$, $C_2$, $C_3$, and $C_4$, the following three cases may further be classified:

① Coupling between adjacent signal channels is considered.
② Coupling between adjacent signal channels and coupling between signal channels that are separated are considered.
③ Coupling between all signal channels is considered.

1. For a coupling situation in ①, coupling exists between $C_1$ and $C_2$, coupling exists between $C_2$ and $C_1$ and $C_3$, coupling exists between $C_3$ and $C_2$ and $C_4$, and coupling exists between $C_4$ and $C_3$. In this case, $V'_1$, $V'_2$, $V'_3$, and $V'_4$ may be approximately equal to:

$$V'_1 = V_1 + \frac{\frac{Z0}{2}}{\frac{Z0}{2} + i \times l \times Z0} \times V_2.$$

$$V'_2 = \frac{\frac{Z0}{2}}{\frac{Z0}{2} + i \times l \times Z0} \times V_1 + V_2 + \frac{\frac{Z0}{2}}{\frac{Z0}{2} + i \times l \times Z0} \times V_3.$$

$$V'_3 = \frac{\frac{Z0}{2}}{\frac{Z0}{2} + i \times l \times Z0} \times V_2 + V_3 + \frac{\frac{Z0}{2}}{\frac{Z0}{2} + i \times l \times Z0} \times V_4.$$

$$V'_4 = \frac{\frac{Z0}{2}}{\frac{Z0}{2} + i \times l \times Z0} \times V_3 + V_4.$$

Through simplification, $V'_1$, $V'_2$, $V'_3$, and $V'_4$ may be represented as the following matrix:

$$\begin{bmatrix} V'_1 \\ V'_2 \\ V'_3 \\ V'_4 \end{bmatrix} = \begin{bmatrix} 1 & 1/(1+i\times 2l) & 0 & 0 \\ 1/(1+i\times 2l) & 1 & 1/(1+i\times 2l) & 0 \\ 0 & 1/(1+i\times 2l) & 1 & 1/(1+i\times 2l) \\ 0 & 0 & 1/(1+i\times 2l) & 1 \end{bmatrix} \begin{bmatrix} V_1 \\ V_2 \\ V_3 \\ V_4 \end{bmatrix}.$$

For ease of expression, the matrix may further be simplified into the following matrix:

$$\begin{bmatrix} V'_1 \\ V'_2 \\ V'_3 \\ V'_4 \end{bmatrix} = \begin{bmatrix} 1 & i/a & 0 & 0 \\ i/a & 1 & i/a & 0 \\ 0 & i/a & 1 & i/a \\ 0 & 0 & i/a & 1 \end{bmatrix} \begin{bmatrix} V_1 \\ V_2 \\ V_3 \\ V_4 \end{bmatrix} \quad (2)$$

$$a = i \times (1 + i \times 2l).$$

$$\begin{bmatrix} 1 & i/a & 0 & 0 \\ i/a & 1 & i/a & 0 \\ 0 & i/a & 1 & i/a \\ 0 & 0 & i/a & 1 \end{bmatrix}$$

is referred to as a matrix E1. Therefore, for any value a, the feature matrix may be solved for the matrix E1, and the feature matrix corresponding to the matrix E1 may be used as the orthogonal encoding matrix T when N=4. Certainly, in an actual application, the orthogonal encoding matrix T may be a constant multiple of the feature matrix of the matrix E1, that is, matrix T=cons×feature matrix of matrix E1. cons is a constant not equal to 0.

It should be noted that, when only the coupling situation of ① is considered, the orthogonal encoding matrix T obtained through solving by using the transmission line theory is actually consistent with the corresponding orthogonal encoding matrix T obtained through solving by using the sine function. For example, when an idea of the sine function is used, the orthogonal encoding matrix T obtained through solving the second formula may be:

$$\begin{bmatrix} 0.5878 & 0.9511 & 0.9511 & 0.5878 \\ 0.9511 & 0.5878 & -0.5878 & -0.9511 \\ 0.9511 & -0.5878 & -0.5878 & 0.9511 \\ 0.5878 & -0.9511 & 0.9511 & -0.5878 \end{bmatrix} \quad (3)$$

When a value of a in the matrix E is 100, the solved feature matrix is:

$$\begin{bmatrix} 0.3717 & 0.6015 & 0.3717 & 0.6015 \\ 0.6015 & 0.3717 & -0.6015 & -0.3717 \\ 0.6015 & -0.3717 & 0.6015 & -0.3717 \\ 0.3717 & -0.6015 & -0.3717 & 0.6015 \end{bmatrix} \quad (4)$$

By comparing the foregoing two matrices (3) and (4), it may be obviously seen that a column corresponding to any column in the matrix (3) may be found in the matrix (4), and there is only a constant multiple between element values in the corresponding two columns. For example, element values in a first column of the matrix (3) is 1.58 times of element values in a first column of the matrix (4). In addition, changing the value and the positive/negative sign of a only changes positions and a positive/negative proportion of the corresponding columns. Therefore, when only the coupling situation of ① is considered, the orthogonal encoding matrix T obtained by using the transmission line theory is actually consistent with the corresponding orthogonal encoding matrix T obtained by using the sine function.

2. For a coupling situation in ②, coupling exists between $C_1$ and $C_2$ and $C_3$, coupling exists between $C_2$ and $C_1$ and $C_3$, coupling exists between $C_3$ and $C_2$ and $C_4$, and coupling exists between $C_4$ and $C_2$ and $C_3$. Therefore, with reference to the content described in (1) or (2) for understanding, $V'_1$, $V'_2$, $V'_3$, and $V'_4$ may be represented as the following matrix:

$$\begin{bmatrix} V'_1 \\ V'_2 \\ V'_3 \\ V'_4 \end{bmatrix} = \begin{bmatrix} 1 & i/a & i/b & 0 \\ i/a & 1 & i/a & i/b \\ i/b & i/a & 1 & i/a \\ 0 & i/b & i/a & 1 \end{bmatrix} \begin{bmatrix} V_1 \\ V_2 \\ V_3 \\ V_4 \end{bmatrix}.$$

b=i×(1+i×2k), k is used to describe a distance and coupling between two separated signal channels.

$$\begin{bmatrix} 1 & i/a & i/b & 0 \\ i/a & 1 & i/a & i/b \\ i/b & i/a & 1 & i/a \\ 0 & i/b & i/a & 1 \end{bmatrix}$$

is referred to as a matrix F1. Therefore, for any value a or b, a feature matrix may be solved for the matrix F1, and a feature matrix corresponding to the matrix F1 may be used as another orthogonal encoding matrix T when N=4. Certainly, in an actual application, the orthogonal encoding matrix T may be a constant multiple of the feature matrix of the matrix F1, that is, matrix T=cons×feature matrix of matrix F1. cons is a constant not equal to 0.

3. For a coupling situation in ③, coupling exists between $C_1$, $C_2$, $C_3$, and $C_4$. Therefore, with reference to the content described in (1) or (2) for understanding, $V'_1$, $V'_2$, $V'_3$, and $V'_4$ may be represented as the following matrix:

$$\begin{bmatrix} V'_1 \\ V'_2 \\ V'_3 \\ V'_4 \end{bmatrix} = \begin{bmatrix} 1 & i/a & i/b & i/c \\ i/a & 1 & i/a & i/b \\ i/b & i/a & 1 & i/a \\ i/c & i/b & i/a & 1 \end{bmatrix} \begin{bmatrix} V_1 \\ V_2 \\ V_3 \\ V_4 \end{bmatrix}.$$

c=i×(1+i×2q), and q is used to describe a distance and coupling between two separated signal channels.

$$\begin{bmatrix} 1 & i/a & i/b & i/c \\ i/a & 1 & i/a & i/b \\ i/b & i/a & 1 & i/a \\ i/c & i/b & i/a & 1 \end{bmatrix}$$

is referred to as a matrix G1. Therefore, for any value a, b, or c, a feature matrix may be solved for the matrix G1, and the feature matrix corresponding to the matrix G1 may be used as another orthogonal encoding matrix T when N=4. Certainly, in an actual application, the orthogonal encoding matrix T may be a constant multiple of the feature matrix of the matrix G1, that is, matrix T=cons×feature matrix of matrix G1. cons is a constant not equal to 0.

It should be noted that the foregoing describes how to obtain the encoding coefficient group when N=2 and N=4 from the perspective of the transmission line theory. A quantity of signal channels may be actually extended to N signal channels and is not limited to N=2 and N=4 described above.

In some other examples, because the signal channels have insertion loss, the N signal channels are coupled to each other, and the like, the corresponding pass-through characteristic and crosstalk characteristic exist between the N signal channels. Considering that the pass-through characteristic and the crosstalk characteristic between the N signal channels affect transmission effect of signals on the N signal channels, to eliminate impact of the pass-through characteristic and the crosstalk characteristic on the signals, a matrix D obtained by multiplying the orthogonal encoding matrix T described above, an inverse matrix $T^{-1}$ of the orthogonal encoding matrix T, and a matrix C corresponding to an S parameter of the signal channels satisfies the following condition:

$D=T^{-1} \times C \times T$, where elements on a diagonal in the matrix D are all non-zero values, and a value of an element not on the diagonal is less than a preset threshold.

It should be noted that the N signal channels may also be represented by using a matrix in a mathematical form, that is, the N signal channels may be represented as the N×N signal channel matrix C. $S_{(N+i)(i)}$ is an element in an $i^{th}$ row and an $i^{th}$ column in the signal channel matrix C, and represents a pass-through characteristic of an $i^{th}$ signal channel in the N signal channels, $i \in [1, N]$, and i is an integer. $S_{(N+i)(j)}$ is an element in the $i^{th}$ row and a $j^{th}$ column in the signal channel matrix C, and represents a crosstalk characteristic of a $j^{th}$ channel in the N signal channels on the $i^{th}$ channel, $j \in [1, N]$, j is an integer, and $i \neq j$.

In addition, that a value of an element not on the diagonal is less than a preset threshold described above may be understood as that the value of the element not on the diagonal is as close as possible to 0. The described preset threshold is not limited in this embodiment.

In this way, after processing the N to-be-transmitted signals by using the obtained encoding coefficient group, the first apparatus may send the N encoded first signals to the N signal channels. Further, after generating the N encoded first signals, the first apparatus may transmit one encoded first signal through each signal channel.

In addition to obtaining the encoding coefficient group in the foregoing manner, in some specific embodiments, the encoding coefficient group may alternatively be adaptively generated by the sending apparatus based on a characteristic of a signal channel. For a given signal channel, the sending apparatus adaptively generates an encoding coefficient group. Elements in each column of the orthogonal encoding matrix T represented by the encoding coefficient group corresponds to a TEM mode, and N signals may be independently transmitted on N signal channels, and crosstalk is very small, and no or little crosstalk cancellation is required.

FIG. 4 to FIG. 6B mainly describe how the first apparatus in FIG. 3 obtains the encoding coefficient group. The first apparatus may obtain the foregoing encoding coefficient group in different forms. For example, the first apparatus may be an independent encoding device, may be an encoding device having a pre-emphasis function, may be an encoding device having a digital-to-analog conversion function, or the like. The following describes encoding performed by different first apparatuses in detail by using different embodiments.

(1) The first apparatus may be an independent encoding device.

Figure 7A:
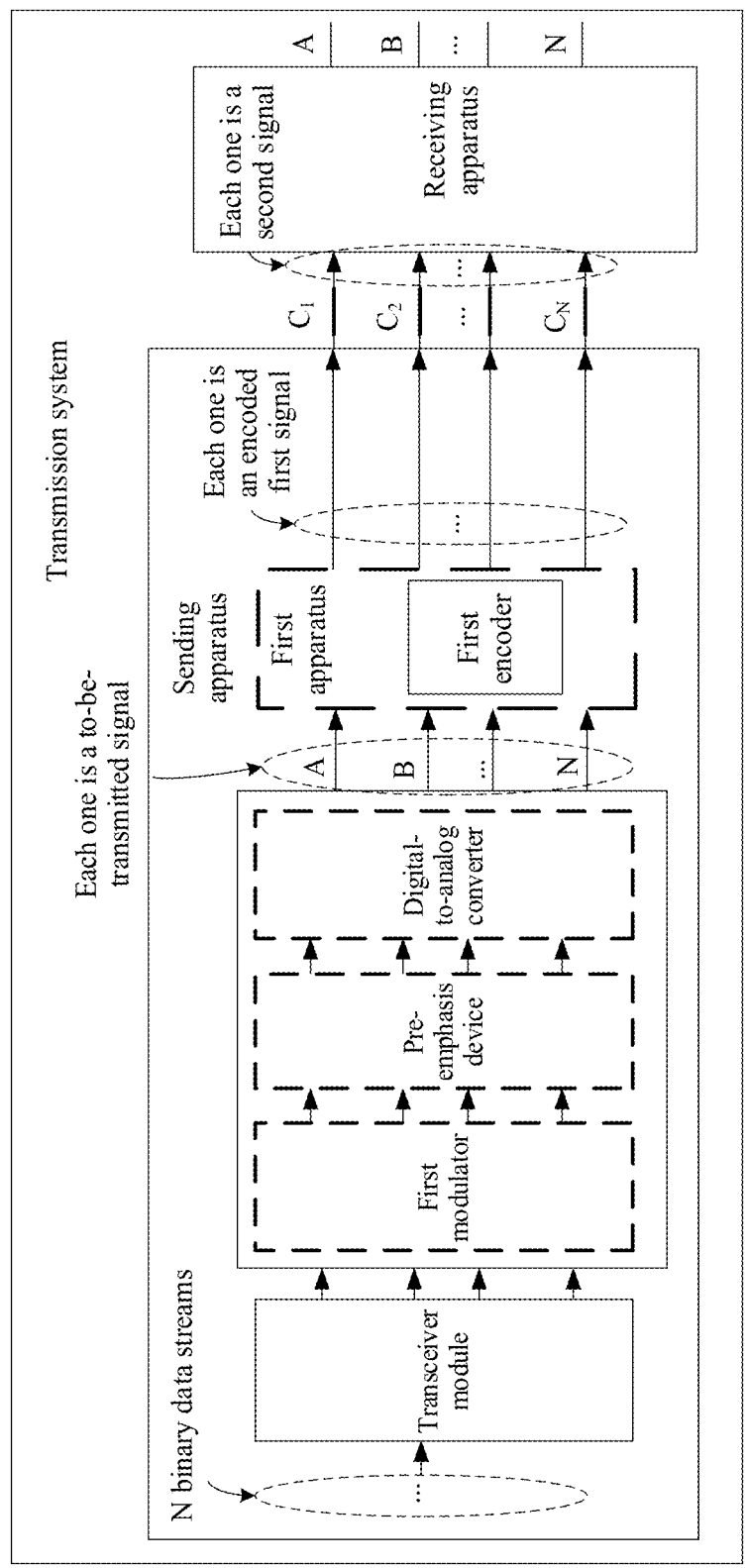
FIG. 7A, FIG. 7B, FIG. 7C, FIG. 7D, and FIG. 7E are schematic diagrams of structures of another transmission system according to an embodiment of this disclosure.

In some other examples, based on the transmission system shown in FIG. 3, reference may further be made to FIG. 7A. FIG. 7A is a schematic diagram of a structure of another transmission system according to an embodiment of this disclosure. As shown in FIG. 7A, the sending apparatus may further include one or more devices of a transceiver module, a first modulator, a pre-emphasis device, and a digital-to-analog converter, and the first apparatus includes a first encoder.

The transceiver module is configured to obtain N binary data streams.

One or more devices of the first modulator, the pre-emphasis device, and the digital-to-analog converter are configured to sequentially process the N binary data streams to obtain the N to-be-transmitted signals.

The first encoder is configured to process the N to-be-transmitted signals based on the encoding coefficient group, to generate the N encoded first signals.

The first apparatus in this embodiment may be an independent first encoder having an encoding function. In addition, the N to-be-transmitted signals may be digital domain signals or analog domain signals. Therefore, before the first encoder processes the N to-be-transmitted signals based on the encoding coefficient group, to generate the N encoded first signals, one or more devices of the first modulator, the pre-emphasis device, and the digital-to-analog converter may be configured to sequentially process the N binary data streams to obtain the N to-be-transmitted signals.

It should be noted that the first encoder in this embodiment processes the N to-be-transmitted signals based on the encoding coefficient group to generate the N encoded first signals. For details about how to obtain the encoding coefficient group, reference may be made to the content described in FIG. 3 to FIG. 6B, or it may be understood that the encoding coefficient group is adaptively generated. This is not limited herein.

Figure 7B:
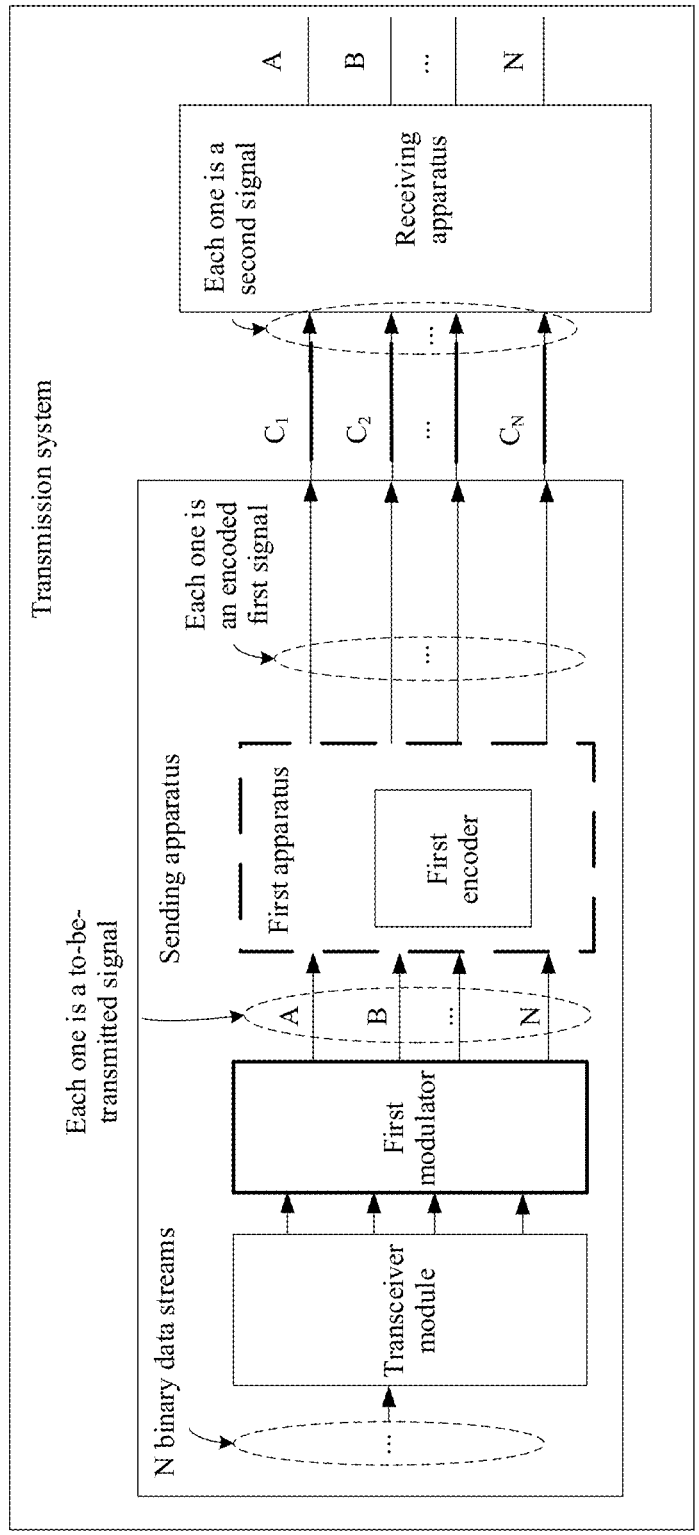

In addition, that one or more devices of the first modulator, the pre-emphasis device, and the digital-to-analog converter are configured to sequentially process the N binary data streams may be understood in the following cases:

Case 1: Only the first modulator processes the N binary data streams (for details, reference may be made to FIG. 7B).

Case 2: The first modulator may first modulate the N binary data streams, and then the pre-emphasis device processes modulated signals (for details, reference may be made to FIG. 7C).

Case 3: The first modulator may first modulate the N binary data streams, then the pre-emphasis device performs pre-emphasis on modulated signals, and then the digital-to-analog converter performs digital-to-analog conversion on signals obtained after pre-emphasis (for details, reference may be made to FIG. 7D).

Case 4: The first modulator may first modulate the N binary data streams, and then the digital-to-analog converter performs digital-to-analog conversion on modulated signals (for details, reference may be made to FIG. 7E).

Figure 7C:
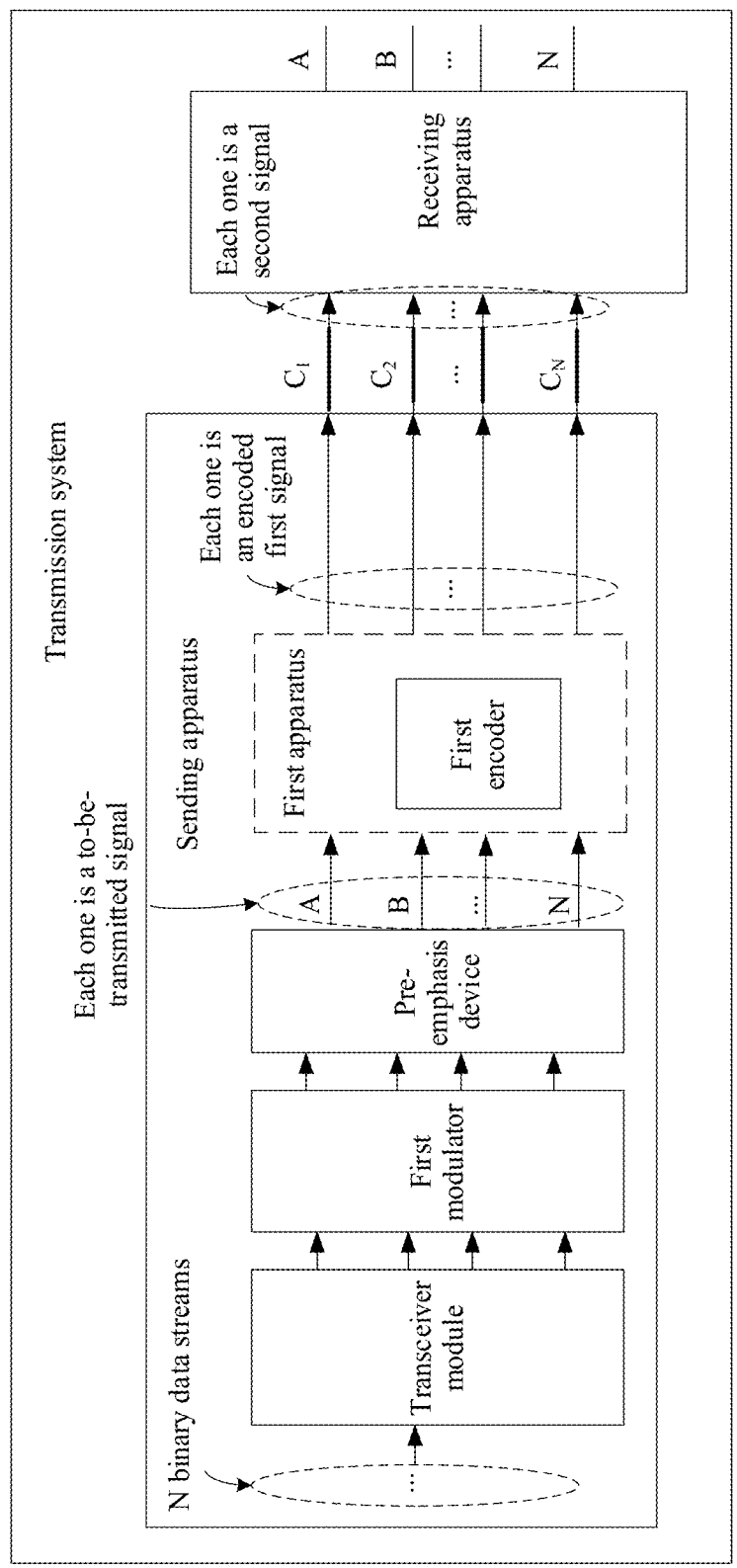
Figure 7D:
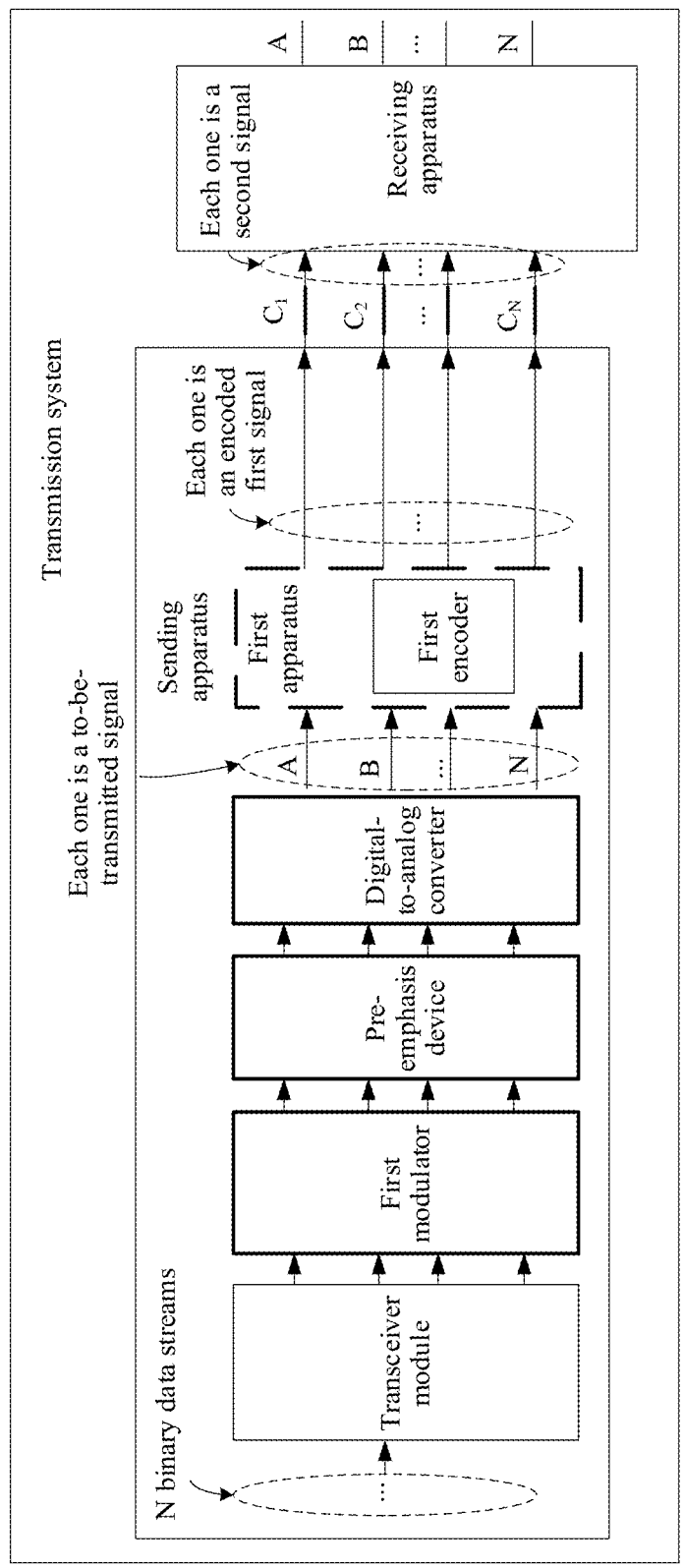

It should be noted that there are a total of N pre-emphasis devices inside the pre-emphasis device shown in FIG. 7A, FIG. 7C, or FIG. 7D, for example, pre-emphasis devices 1 to N (for details, reference may be made to FIG. 7F), and each pre-emphasis device may be understood as a common feed-forward equalizer (FFE) or a "butterfly" FFE equalizer. When the "butterfly" FFE equalizer is used, the N pre-emphasis devices may be considered as one pre-emphasis device as a whole.

Figure 7E:
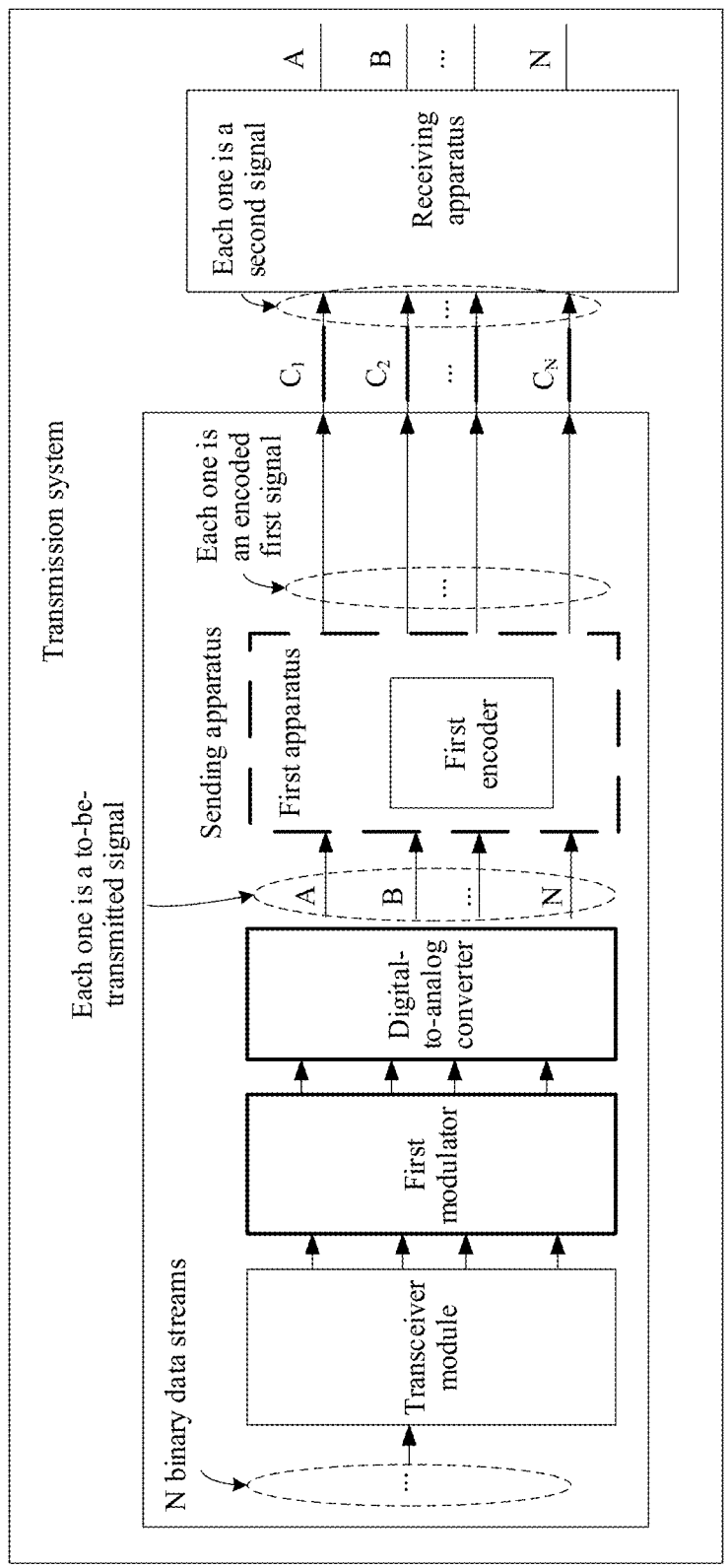
Figure 7F:
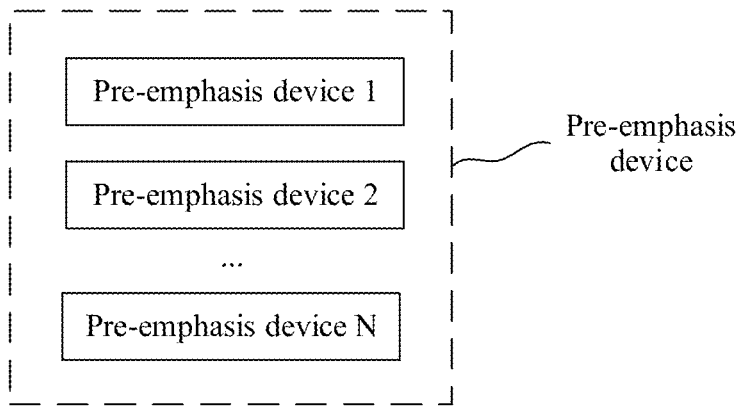
FIG. 7F is a schematic diagram of a structure of a pre-emphasis device according to an embodiment of this disclosure.
Figure 7G:
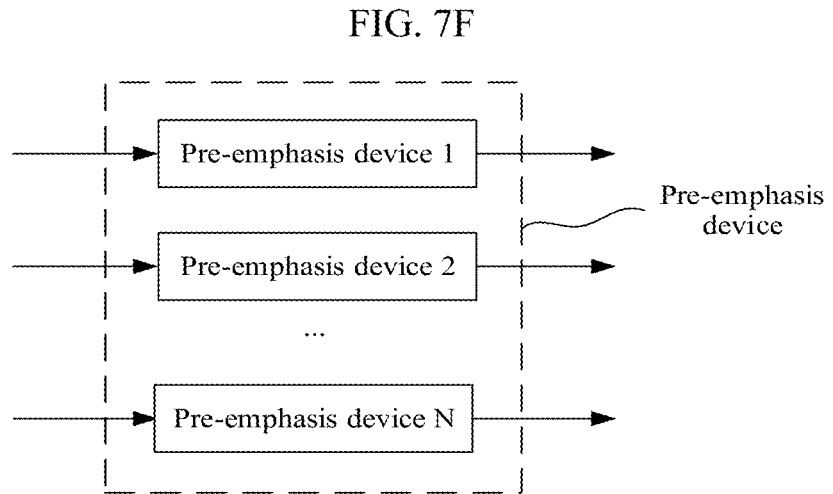
FIG. 7G and FIG. 7H are schematic diagrams of structures of another pre-emphasis device according to an embodiment of this disclosure.
Figure 7H:
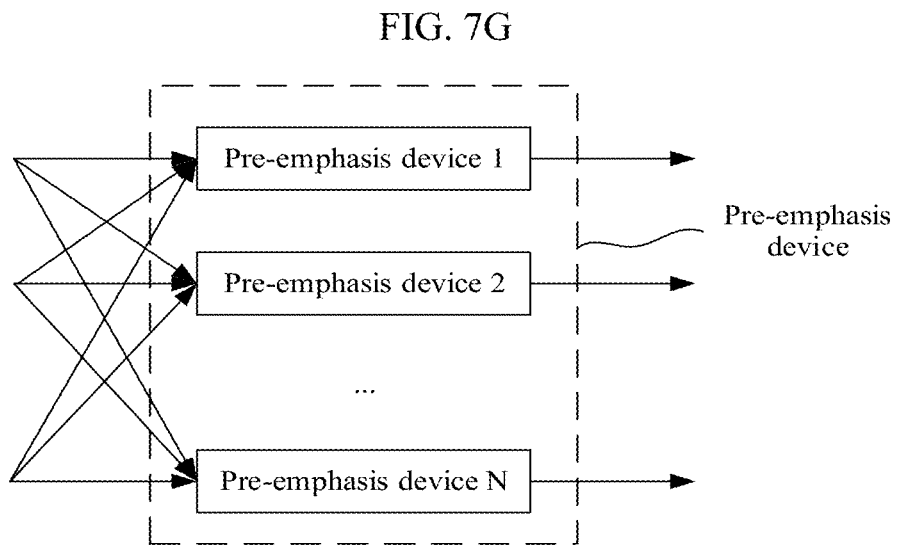

Each common FFE equalizer may independently perform pre-emphasis on one signal (reference may be made to FIG. 7G). Each "butterfly" FFE equalizer can perform joint equalization on at least two signals (reference may be made to FIG. 7H). A form of the pre-emphasis device is not limited in this embodiment of this disclosure.

In addition, there are a total of N digital-to-analog converters inside the digital-to-analog converter shown in FIG. 7A, FIG. 7D, or FIG. 7E, and each digital-to-analog converter is configured to perform digital-to-analog conversion on one signal. The described digital-to-analog converter may be a digital-to-analog converter (DAC), a voltage driver (DRV), or the like. This is not limited herein.

(2) The first apparatus may be an encoding device with a pre-emphasis function.

Figure 8:
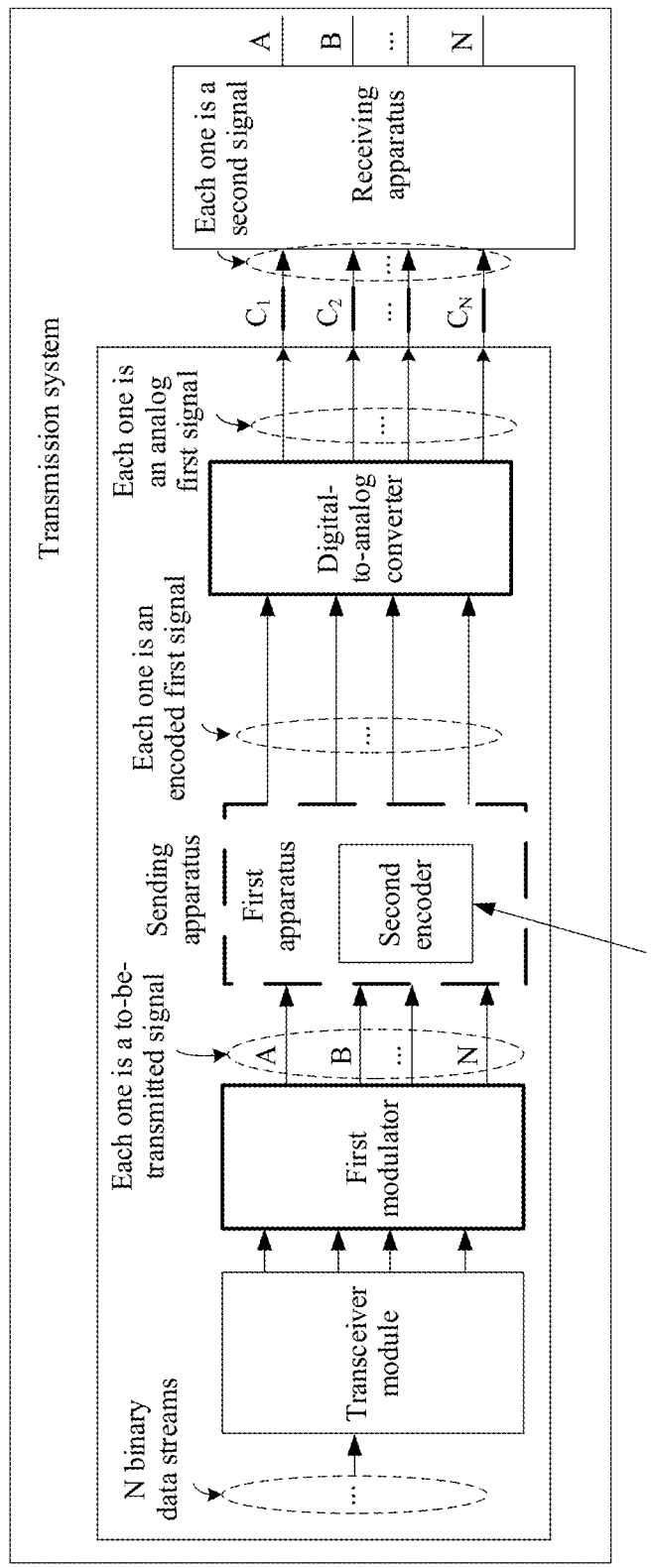
FIG. 8 is a schematic diagram of a structure of another transmission system according to an embodiment of this disclosure.

In some other examples, based on the transmission system shown in FIG. 3, reference may further be made to FIG. 8. FIG. 8 is a schematic diagram of a structure of another transmission system according to an embodiment of this disclosure. As shown in FIG. 8, the sending apparatus may further include one or more devices of a transceiver module, a first modulator, and a digital-to-analog converter, and the first apparatus includes a second encoder.

The transceiver module is configured to obtain N binary data streams.

The first modulator is configured to process the N binary data streams to obtain the N to-be-transmitted signals.

The second encoder is configured to perform pre-emphasis on and encode the N to-be-transmitted signals based on the encoding coefficient group, to generate the N encoded first signals.

The digital-to-analog converter is configured to process the N encoded first signals, to generate N analog first signals.

In this example, the described second encoder is an encoding device including a first encoder and a pre-emphasis device. In other words, in addition to an encoding function, the second encoder further has a pre-emphasis function. The N encoded first signals obtained after final processing by the second encoder are signals on which encoding and pre-emphasis are performed. In addition, the described first encoder and digital-to-analog converter may be understood with reference to FIG. 7A to FIG. 7E. Details are not described herein again. The described pre-emphasis device may be understood with reference to FIG. 7A to FIG. 7H. Details are not described herein again.

In addition, the second encoder in this embodiment performs pre-emphasis on and encodes the N to-be-transmitted signals based on the encoding coefficient group, to generate the N encoded first signals. For details, reference may also be made to the content described in FIG. 3 to FIG. 6B. This is not limited herein.

Figure 9A:
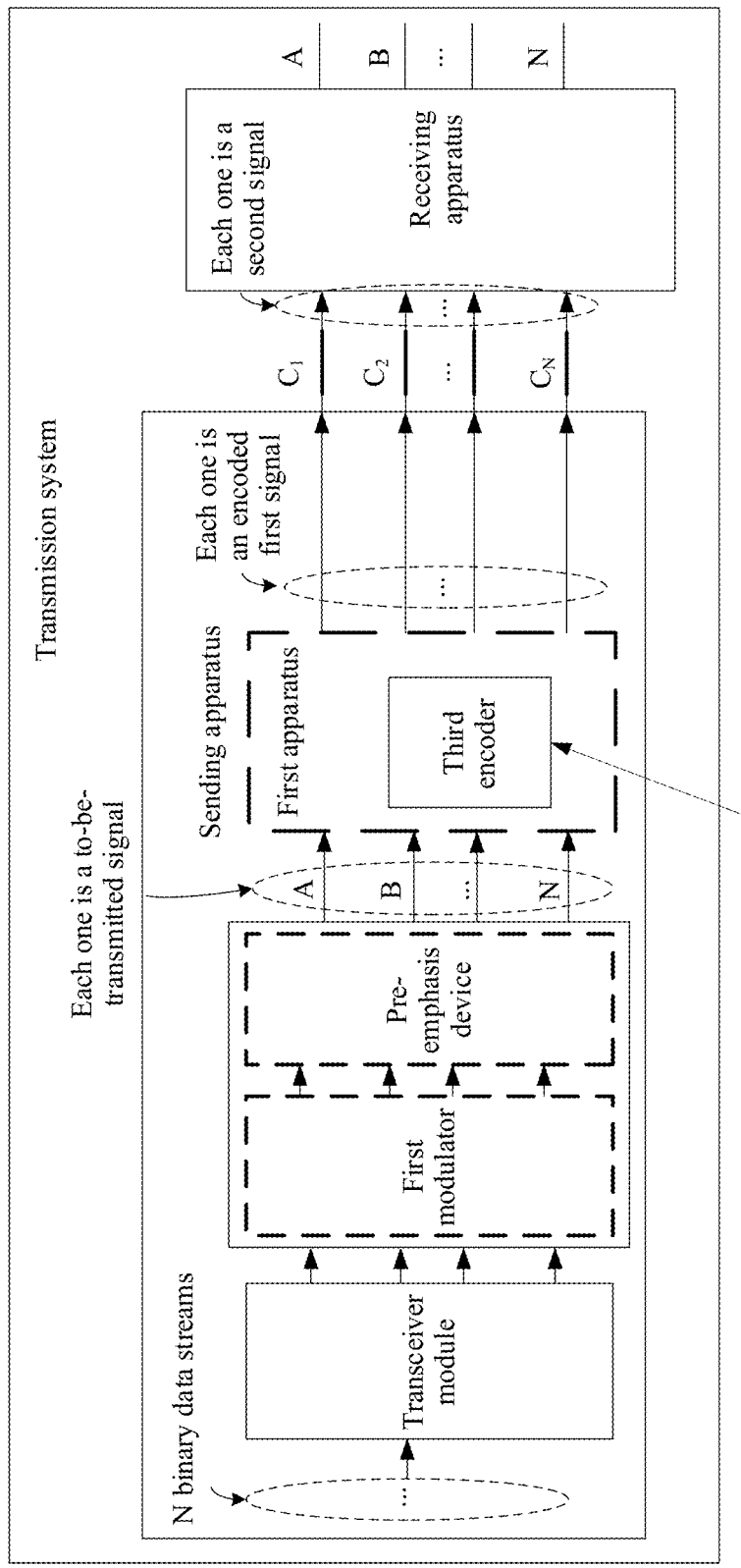
FIG. 9A, FIG. 9B, and FIG. 9C are schematic diagrams of structures of another transmission system according to an embodiment of this disclosure.

Optionally, in some other examples, based on the transmission system shown in FIG. 3, reference may further be made to FIG. 9A. FIG. 9A is a schematic diagram of a structure of another transmission system according to an embodiment of this disclosure. As shown in FIG. 9A, the sending apparatus may further include one or more devices of a transceiver module, a first modulator, and a pre-emphasis device, and the first apparatus includes a third encoder.

The transceiver module is configured to obtain N binary data streams.

One or more devices of the first modulator and the pre-emphasis device are configured to sequentially process the N binary data streams to obtain the N to-be-transmitted signals.

The third encoder is configured to encode and perform digital-to-analog conversion on the N to-be-transmitted signals based on the encoding coefficient group, to generate the N encoded first signals.

In this example, the described third encoder is an encoding device including a first encoder and a digital-to-analog converter. In other words, in addition to an encoding function, the third encoder further has a digital-to-analog conversion function. The N encoded first signals obtained after final processing by the third encoder are encoded analog signals. In addition, the described first encoder and digital-to-analog converter may be understood with reference to FIG. 7A to FIG. 7E. Details are not described herein again. The described pre-emphasis device may be understood with reference to FIG. 7A to FIG. 7H. Details are not described herein again.

Figure 9B:
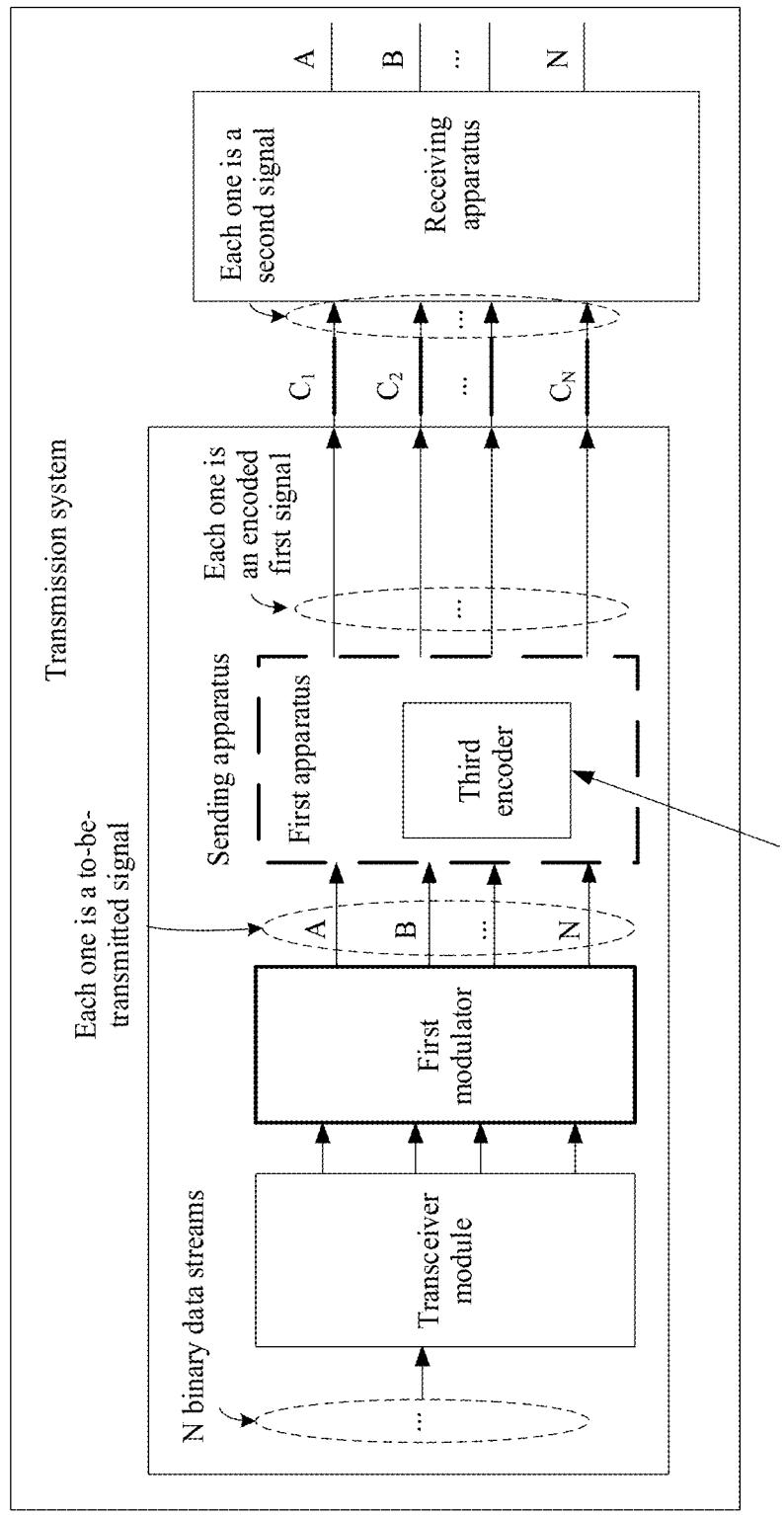

It should be noted that one or more devices of the first modulator and the pre-emphasis device are configured to sequentially process the N binary data streams to obtain the N to-be-transmitted signals may be understood with reference to the following cases:

Case 1: Only the first modulator processes the N binary data streams (for details, reference may be made to FIG. 9B).

Figure 9C:
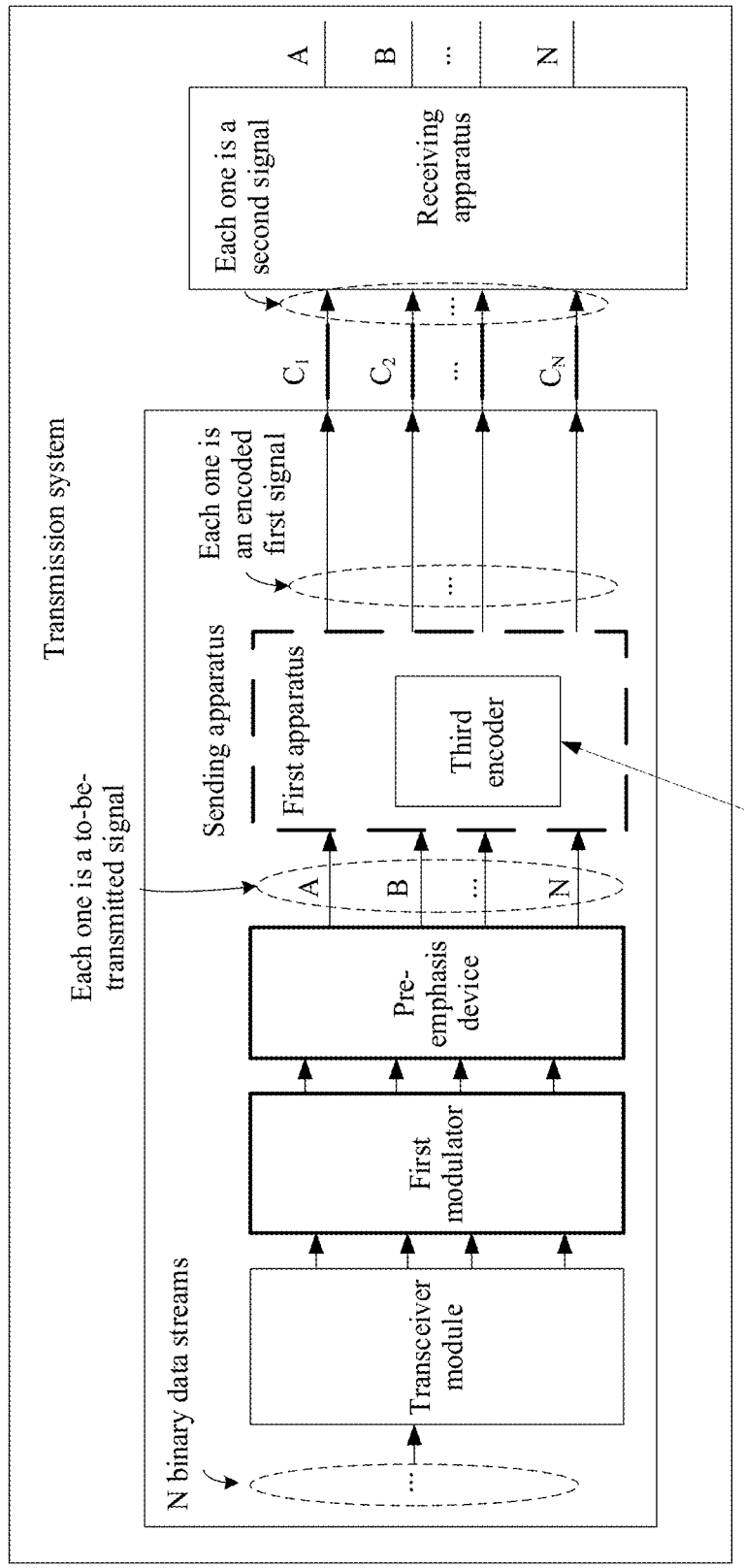

Case 2: The first modulator may first modulate the N binary data streams, and then the pre-emphasis device processes modulated signals (for details, reference may be made to FIG. 9C).

In addition, the third encoder in this embodiment performs digital-to-analog conversion on and encodes the N to-be-transmitted signals based on the encoding coefficient group, to generate the N encoded first signals. For details, reference may be made to the content described in FIG. 3 to FIG. 6B. This is not limited herein.

Figure 10:
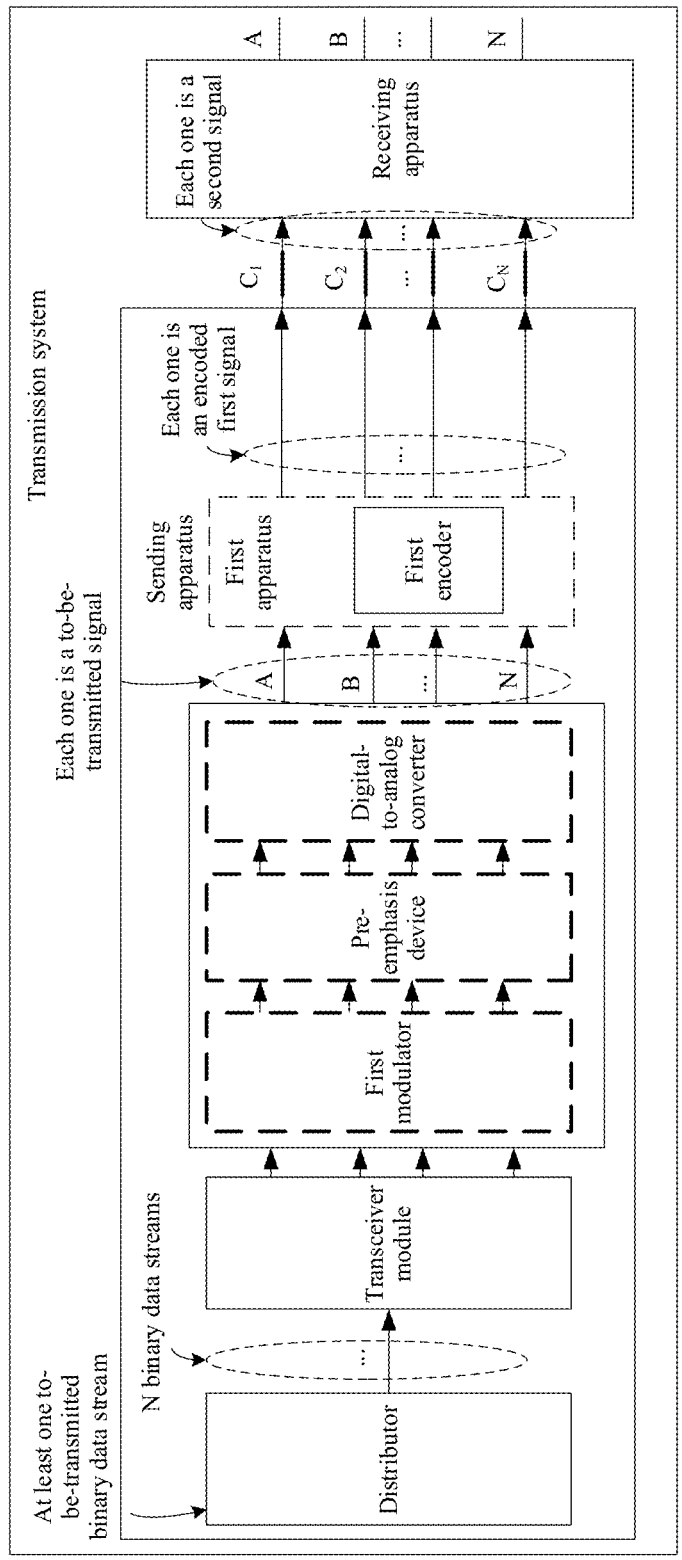
FIG. 10 is a schematic diagram of a structure of another transmission system according to an embodiment of this disclosure.

Optionally, in some other embodiments, in any transmission system described in FIG. 7A to FIG. 9B, the transmission system may further include a distributor. For details, reference may be made to FIG. 10. FIG. 10 is a schematic diagram of a structure of another transmission system according to an embodiment of this disclosure. As shown in FIG. 10, the sending apparatus further includes a distributor.

The distributor is configured to, before the transceiver module obtains the N binary data streams, obtain at least one to-be-transmitted binary data stream, and distribute the at least one to-be-transmitted binary data stream as the N binary data streams.

FIG. 4 to FIG. 10 mainly describe the sending apparatus in the transmission system shown in FIG. 3. The following describes the receiving apparatus in the transmission system shown in FIG. 3. The transmission system further includes the receiving apparatus. The receiving apparatus may be configured to receive N second signals, and process the N second signals. The N second signals are signals obtained after the N encoded first signals pass through the N signal channels.

In this example, the first apparatus processes such as encodes the N to-be-transmitted signals based on the encoding coefficient group, to generate the N encoded first signals, and sends the N encoded first signals to the N signal channels. In this case, in a process of transmitting the N encoded first signals on the N signal channels, because the signal channels have insertion loss (presented by the pass-through characteristic) and the N signal channels are coupled with each other, the N encoded first signals may be affected by the crosstalk characteristic and the pass-through characteristic between the N signal channels during transmission on the N signal channels. Therefore, the crosstalk characteristic and the pass-through characteristic between the N signal channels may further be considered. In this way, the receiving apparatus may receive the N second signals, namely, the signals obtained after the N encoded first signals pass through the N signal channels.

It should be noted that the S parameter may represent a characteristic of the N signal channels, such as the crosstalk characteristic and the pass-through characteristic.

For example, N=2 is used as an example. Two single-ended channels in the differential channel are $C_1$ and $C_2$. An input port of $C_1$ may be represented as 1, and an output port of $C_1$ may be represented as 3, and an input port of $C_2$ may be represented as 2, and an output port of $C_2$ may be represented as 4. Therefore, an S parameter of a 4-port network may represent the crosstalk characteristic and the pass-through characteristic between the two single-ended channels. For example, $S_{31}$ represents the pass-through characteristic of the signal channel $C_1$, $S_{42}$ represents the pass-through characteristic of the signal channel $C_2$, $S_{41}$ represents the crosstalk characteristic of the signal channel $C_1$ to the signal channel $C_2$, and $S_{32}$ represents the crosstalk characteristic of the signal channel $C_2$ to the signal channel $C_1$.

That is, the corresponding S parameter may be represented as the following matrix:

$$\begin{bmatrix} S_{31} & S_{32} \\ S_{41} & S_{42} \end{bmatrix}.$$

Correspondingly, if the two encoded first signals are represented as $$\frac{1}{2}\begin{bmatrix} 1 & 1 \\ 1 & -1 \end{bmatrix} \times \begin{bmatrix} A \\ B \end{bmatrix} = \begin{bmatrix} \frac{A}{2} + \frac{B}{2} \\ \frac{A}{2} - \frac{B}{2} \end{bmatrix},$$

the two second signals received by the receiving apparatus may be represented as $$\begin{bmatrix} S_{31} & S_{32} \\ S_{41} & S_{42} \end{bmatrix} \times \begin{bmatrix} \dfrac{A}{2} + \dfrac{B}{2} \\ \dfrac{A}{2} - \dfrac{B}{2} \end{bmatrix}.$$

It should be further noted that, when a quantity of signal channels is extended to N signal channels, the N signal channels may be represented as an N×N signal channel matrix C. $S_{(N+i)(i)}$ is an element in an $i^{th}$ row and an $i^{th}$ column in the signal channel matrix C, and represents a pass-through characteristic of an $i^{th}$ signal channel in the N signal channels, $i \in [1, N]$, and i is an integer. $S_{(N+i)(j)}$ is an element in the $i^{th}$ row and a $j^{th}$ column in the signal channel matrix C, and represents a crosstalk characteristic of a $j^{th}$ channel in the N signal channels on the $i^{th}$ channel, $j \in [1, N]$, j is an integer, and $i \ne j$.

In some other examples, after receiving the N second signals, the receiving apparatus may process such as decode the N second signals in a decoding manner, or may directly perform no decoding. The following separately describes different cases.

(1) Decoding is performed.

Figure 11:
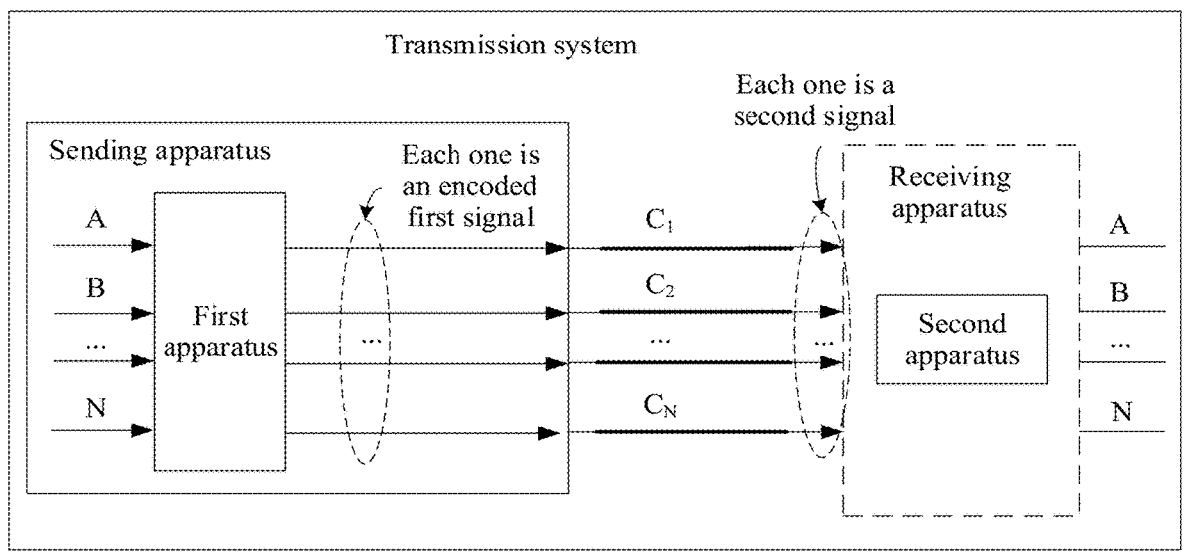
FIG. 11 is a schematic diagram of a structure of another transmission system according to an embodiment of this disclosure.

FIG. 11 is a schematic diagram of a structure of another transmission system according to an embodiment of this disclosure. As shown in FIG. 11, the receiving apparatus may include a second apparatus, and the second apparatus is configured to perform the following functions: obtaining a decoding coefficient group, where the decoding coefficient group is represented as an N×N decoding matrix R, a product of the decoding matrix R and the orthogonal encoding matrix T is a diagonal matrix, and elements on a diagonal in the diagonal matrix are all non-zero values, and processing the N second signals based on the decoding coefficient group to obtain N third signals, where any one of the N third signals corresponds to one of the N to-be-transmitted signals.

In this example, to accurately decode the N second signals, the decoding coefficient group obtained by the second apparatus should have an association relationship with the encoding coefficient group obtained by the first apparatus. Further, the described decoding coefficient group may also be represented by using a matrix in a mathematical form, that is, the described decoding coefficient group may be represented by the N×N decoding matrix R, a product of the decoding matrix R and the orthogonal encoding matrix T is a diagonal matrix, and elements on a diagonal in the described diagonal matrix are all non-zero values.

It should be noted that values of the elements on the diagonal may be equal or unequal. This is not limited herein. When the values of the elements on the diagonal are unequal, amplification or reduction multiples of third signals to to-be-transmitted signals corresponding to the third signals are different.

In some other examples, the foregoing diagonal matrix is an M-fold unit matrix, M is a constant, and $M \ne 0$. It is understood that the values of the elements on the diagonal of the diagonal matrix are equal, which may further reflect that each decoded third signal finally obtained has a same amplification or reduction multiple, that is, M-fold, to a to-be-transmitted signal corresponding to the third signal.

In this way, after obtaining the decoding coefficient group, the second apparatus may decode the received N second signals based on the decoding coefficient group, to obtain the N third signals. Any one of the described N third signals corresponds to one of the N to-be-transmitted signals.

For example, N=2 is used as an example. If the orthogonal encoding matrix T is represented as $$\frac{1}{2}\begin{bmatrix} 1 & 1 \\ 1 & -1 \end{bmatrix},$$

on a basis that the product of the orthogonal encoding matrix T and the decoding matrix R is a diagonal matrix, the decoding matrix R may be solved as $$\begin{bmatrix} 1 & 1 \\ 1 & -1 \end{bmatrix}.$$

If two second signals received by the second apparatus may be represented as $$\begin{bmatrix} S_{31} & S_{32} \\ S_{41} & S_{42} \end{bmatrix} \times \begin{bmatrix} \dfrac{A}{2} + \dfrac{B}{2} \\ \dfrac{A}{2} - \dfrac{B}{2} \end{bmatrix},$$

two decoded third signals may be represented as $$\begin{bmatrix} 1 & 1 \\ 1 & -1 \end{bmatrix} \times \begin{bmatrix} S_{31} & S_{32} \\ S_{41} & S_{42} \end{bmatrix} \times \begin{bmatrix} \dfrac{A}{2} + \dfrac{B}{2} \\ \dfrac{A}{2} - \dfrac{B}{2} \end{bmatrix} =$$

$$\begin{bmatrix} \dfrac{S_{31} + S_{41} + S_{32} + S_{42}}{2} & \dfrac{S_{31} + S_{41} - S_{32} - S_{42}}{2} \\ \dfrac{S_{31} - S_{41} + S_{32} - S_{42}}{2} & \dfrac{S_{31} - S_{41} - S_{32} + S_{42}}{2} \end{bmatrix} \begin{bmatrix} A \\ B \end{bmatrix}.$$

It can be learned from the foregoing matrix that $$\frac{S_{31} + S_{41} + S_{32} + S_{42}}{2} \text{ and } \frac{S_{31} - S_{41} - S_{32} + S_{42}}{2}$$

may represent the pass-through characteristic of channels after encoding and decoding are performed on two to-be-transmitted signals $$\begin{bmatrix} A \\ B \end{bmatrix}. \frac{S_{31} + S_{41} + S_{32} + S_{42}}{2}$$

represents an even mode of the channel, and $$\frac{S_{31} - S_{41} - S_{32} + S_{42}}{2}$$

represents an odd mode of the channel. Similarly, $$\frac{S_{31} + S_{41} - S_{32} - S_{42}}{2} \text{ and } \frac{S_{31} - S_{41} + S_{32} - S_{42}}{2}$$

may represent the crosstalk characteristic between channels after encoding and decoding are performed on the two to-be-transmitted signals $$\begin{bmatrix} A \\ B \end{bmatrix}.$$

It should be understood that, in addition to the orthogonal encoding matrix $$\frac{1}{2}\begin{bmatrix} 1 & 1 \\ 1 & -1 \end{bmatrix}$$

and the corresponding decoding matrix $$\begin{bmatrix} 1 & 1 \\ 1 & -1 \end{bmatrix}$$

shown above, in an actual application, encoding and decoding matrices in other forms may alternatively be used. For example, the orthogonal encoding matrix T may alternatively be $$\frac{1}{2}\begin{bmatrix} 1 & -1 \\ 1 & 1 \end{bmatrix}, \frac{1}{2}\begin{bmatrix} 1 & 1 \\ -1 & 1 \end{bmatrix}, \text{ or } \frac{1}{2}\begin{bmatrix} -1 & 1 \\ 1 & 1 \end{bmatrix},$$

and the corresponding decoding matrix R is $$\begin{bmatrix} 1 & 1 \\ -1 & 1 \end{bmatrix}, \begin{bmatrix} 1 & -1 \\ 1 & 1 \end{bmatrix}, \text{ or } \begin{bmatrix} -1 & 1 \\ 1 & 1 \end{bmatrix}$$

respectively. For implementation forms and operation processes of the orthogonal encoding matrix T and the decoding matrix R, reference may be made to the foregoing content. Details are not described herein again.

Similarly, when N=4, if the orthogonal encoding matrix T is a 4×4 Hadamard matrix, namely, $$\frac{1}{4}\begin{bmatrix} 1 & 1 & 1 & 1 \\ 1 & 1 & -1 & -1 \\ -1 & 1 & 1 & -1 \\ -1 & 1 & -1 & 1 \end{bmatrix},$$

the corresponding decoding matrix R may be $$\begin{bmatrix} 1 & 1 & -1 & -1 \\ 1 & 1 & 1 & 1 \\ 1 & -1 & 1 & -1 \\ 1 & -1 & -1 & 1 \end{bmatrix}.$$

This is not limited herein.

Figure 12A:
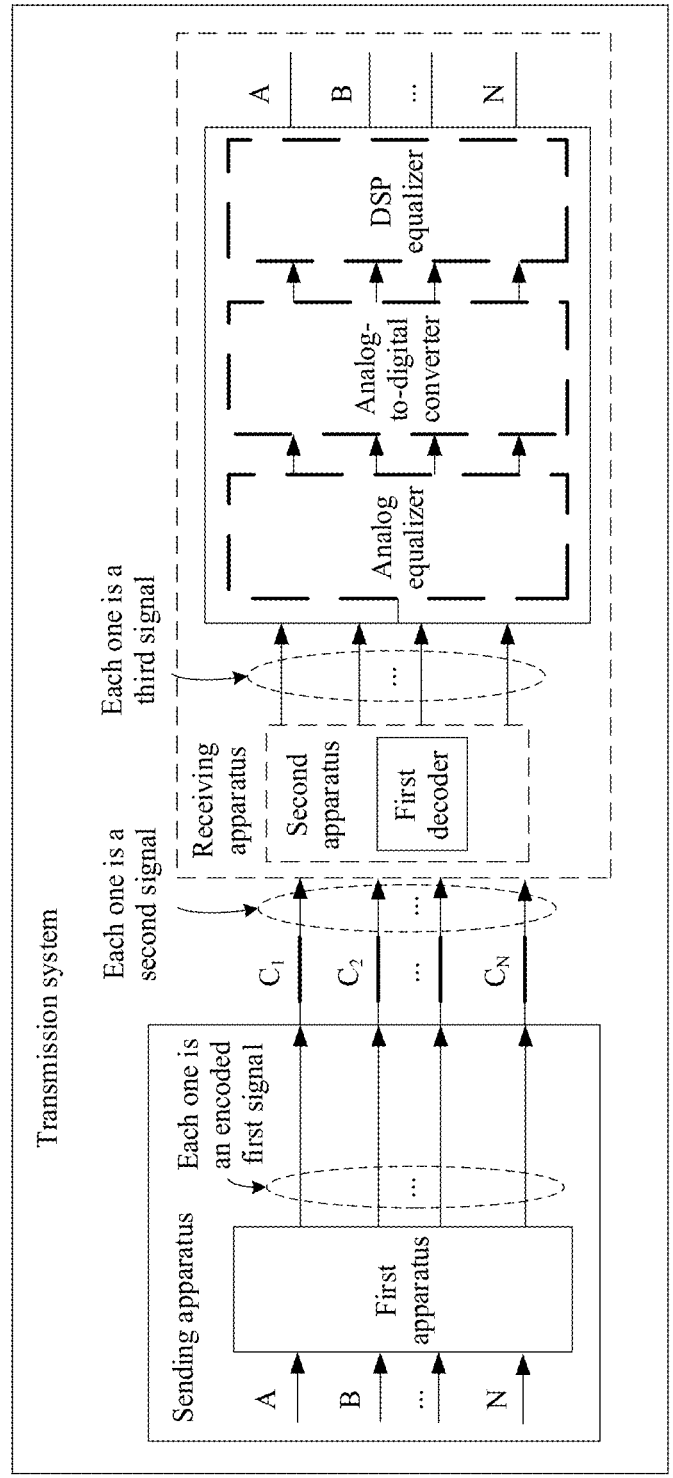
FIG. 12A, FIG. 12B, FIG. 12C, and FIG. 12D are schematic diagrams of structures of another transmission system according to an embodiment of this disclosure.

Optionally, based on the receiving apparatus shown in FIG. 11, reference may further be made to FIG. 12A. FIG. 12A is a schematic diagram of a structure of another receiving apparatus according to an embodiment of this disclosure. As shown in FIG. 12A, the receiving apparatus may further include one or more devices of an analog equalizer, an analog-to-digital converter, and a DSP equalizer. The second apparatus may include a first decoder.

The first decoder is configured to decode the N second signals based on the decoding coefficient group to obtain N third signals.

The N third signals are sequentially processed by one or more devices of the analog equalizer, the analog-to-digital converter, and the DSP equalizer, to obtain N processed third signals.

In this example, the described second apparatus may be an independent first decoder having a decoding function. In this case, after receiving the N second signals, the first decoder can directly decode the N second signals based on the decoding coefficient group described above, to obtain the N third signals. After decoding is completed, equalization and the like may further be considered for insertion loss of a channel link. Therefore, the N third signals may further be sequentially processed by one or more devices of the analog equalizer, the analog-to-digital converter, and the DSP equalizer, to obtain the N processed third signals. In this way, impact of insertion loss of the channel link may be eliminated, thereby obtaining a signal with better quality.

In addition, the N third signals may further be sequentially processed by one or more devices of the analog equalizer, the analog-to-digital converter, and the DSP equalizer, to obtain the N processed third signals. This may be understood in the following cases:

Case 1: When insertion loss of the link is small, only the analog equalizer may process the N third signals (for details, reference may be made to FIG. 12B).

Case 2: When insertion loss of the link is large, the analog equalizer first processes the N third signals, then the analog-to-digital converter performs analog-to-digital conversion on signals obtained after analog equalization, and then the DSP equalizer performs DSP equalization on signals obtained after analog-to-digital conversion (for details, reference may be made to FIG. 12C).

Figure 12B:
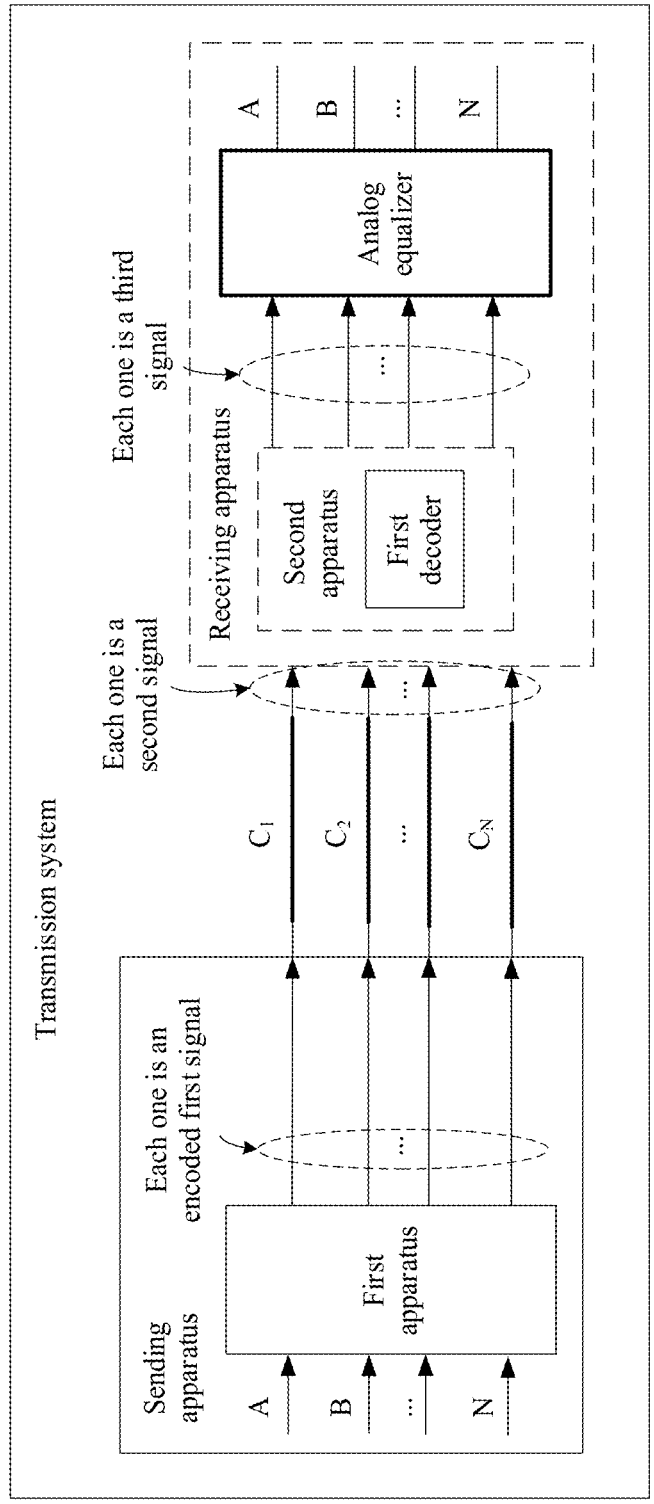
Figure 12C:
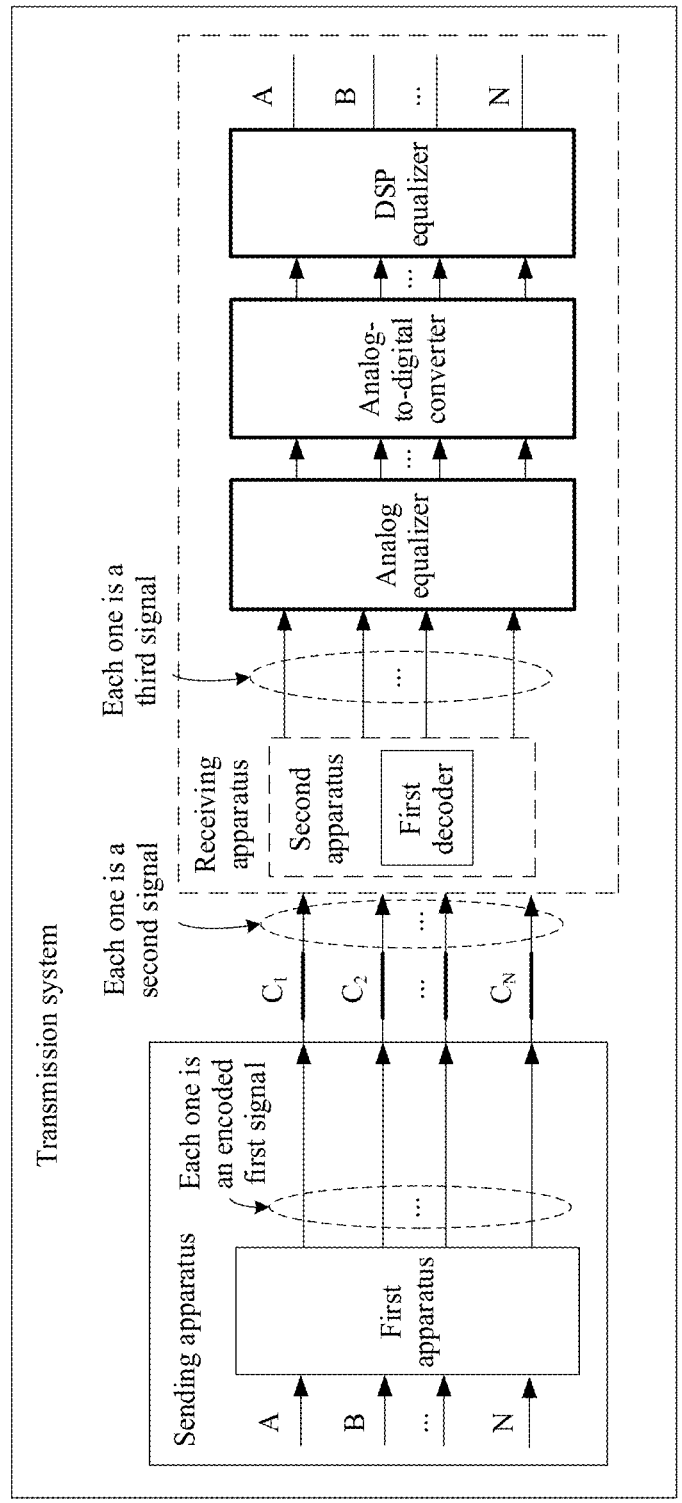

N analog equalizers may be included inside each of the analog equalizers shown in FIG. 12A to FIG. 12C. Each analog equalizer is configured to process one signal, and each described analog equalizer may include but is not limited to a continuous time linear equalizer (CTLE). Similarly, N analog-to-digital converters may be included inside each of the analog-to-digital converters shown in FIG. 12A to FIG. 12C, and each analog-to-digital converter is configured to perform analog-to-digital conversion on one signal. The described analog-to-digital converter includes but is not limited to an analog-to-digital converter (ADC). N DSP equalizers may be included in each of the DSP equalizers shown in FIG. 12A to FIG. 12C. Each DSP equalizer is configured to process one signal. The described DSP equalizer includes but is not limited to an FFE, a decision feedback equalizer (DFE), a maximum likelihood sequence estimation (MLSE) equalizer, and the like. This is not limited herein.

Figure 12D:
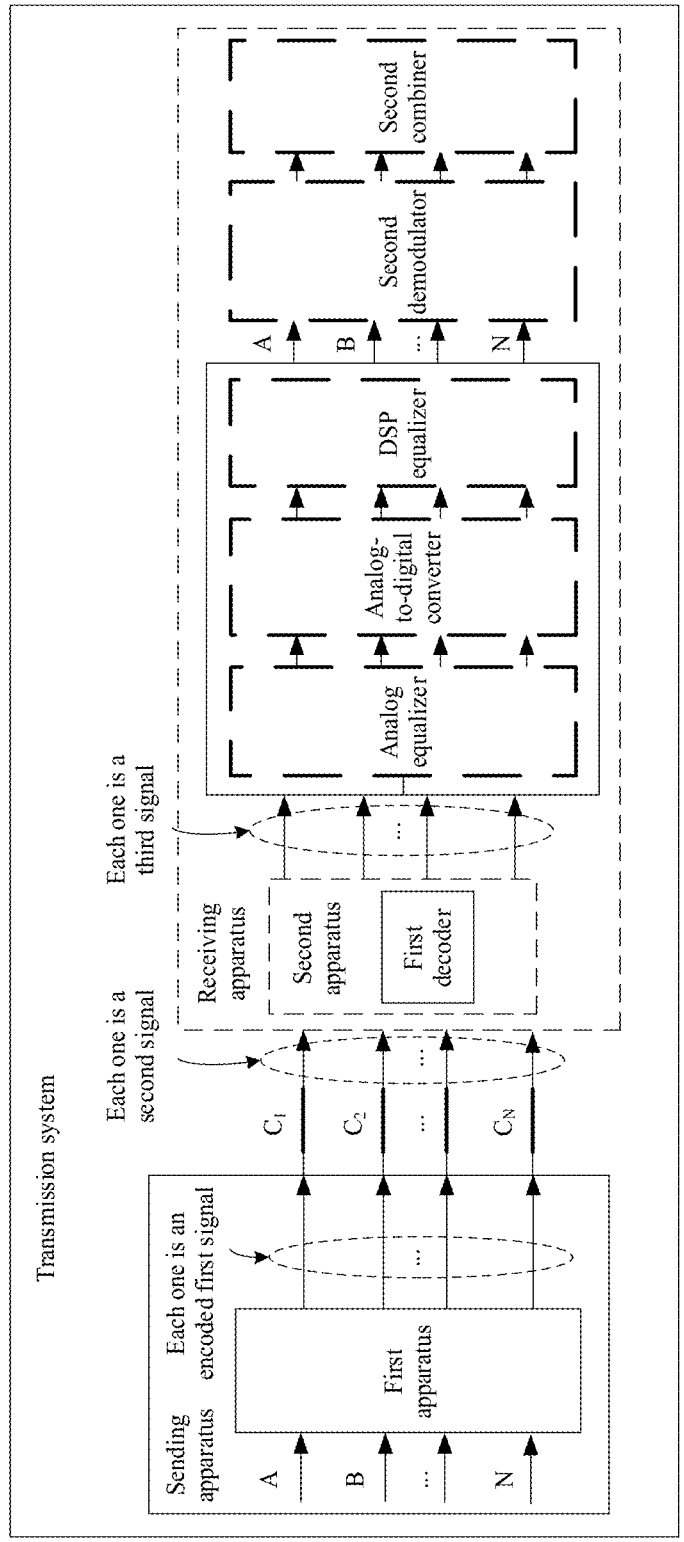

Optionally, based on the receiving apparatus shown in FIG. 12A to FIG. 12C, reference may further be made to FIG. 12D. FIG. 12D is a schematic diagram of a structure of another receiving apparatus according to an embodiment of this disclosure. As shown in FIG. 12D, the receiving apparatus may further include a second demodulator and a second combiner.

The second demodulator is configured to demodulate the N processed third signals to obtain N demodulated signals.

The second combiner is configured to combine at least two demodulated signals of the N demodulated signals to obtain one binary data stream.

Figure 13A:
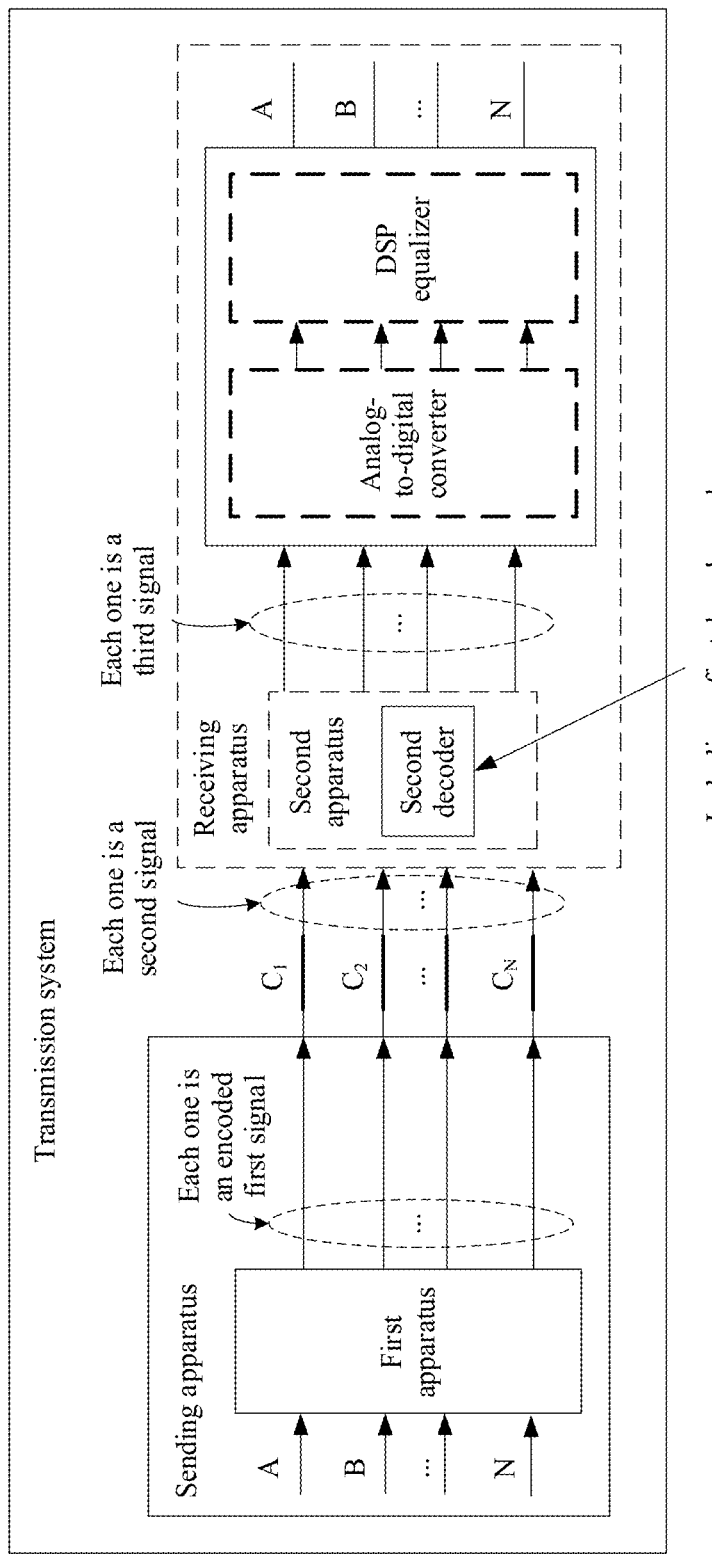
FIG. 13A and FIG. 13B are schematic diagrams of structures of another transmission system according to an embodiment of this disclosure.

Optionally, based on the receiving apparatus shown in FIG. 11, reference may further be made to FIG. 13A. FIG.

13A is a schematic diagram of a structure of another receiving apparatus according to an embodiment of this disclosure. As shown in FIG. 13A, the receiving apparatus may further include one or more devices of an analog-to-digital converter and a DSP equalizer. The second apparatus may include a second decoder. The second decoder is configured to obtain the decoding coefficient group, and equalize insertion loss of and decode the N second signals based on the decoding coefficient group to obtain the N third signals.

The N third signals are sequentially processed by one or more devices of the analog-to-digital converter and the DSP equalizer, to obtain N processed third signals.

In this example, the described second decoder is a decoding device including an analog equalizer and a first decoder. In other words, in addition to a decoding function, the second decoder further has a function of insertion loss equalization. The N third signals obtained after final processing by the second decoder are signals that have undergone link insertion loss equalization and that have impact of link insertion loss eliminated or partially eliminated. After decoding and insertion loss equalization are completed, the N third signals may further be sequentially processed by one or more devices of a data slicer, the analog-to-digital converter, and the DSP equalizer, to obtain the N processed third signals. In this way, impact of insertion loss of a channel link may be eliminated, thereby obtaining a signal with better quality.

It should be noted that, in this embodiment, the second decoder performs insertion loss equalization on and decodes the N second signals based on the decoding coefficient group, to obtain the N third signals. For details, reference may also be made to the content described in FIG. 11 for understanding. This is not limited herein.

In addition, the analog equalizer, the analog-to-digital converter, and the DSP equalizer in FIG. 13A may be understood with reference to the content described in FIG. 12A to FIG. 12C. Details are not described herein again. The described decoder may be understood with reference to the content described in FIG. 12A to FIG. 12C. Details are not described herein again.

Figure 13B:
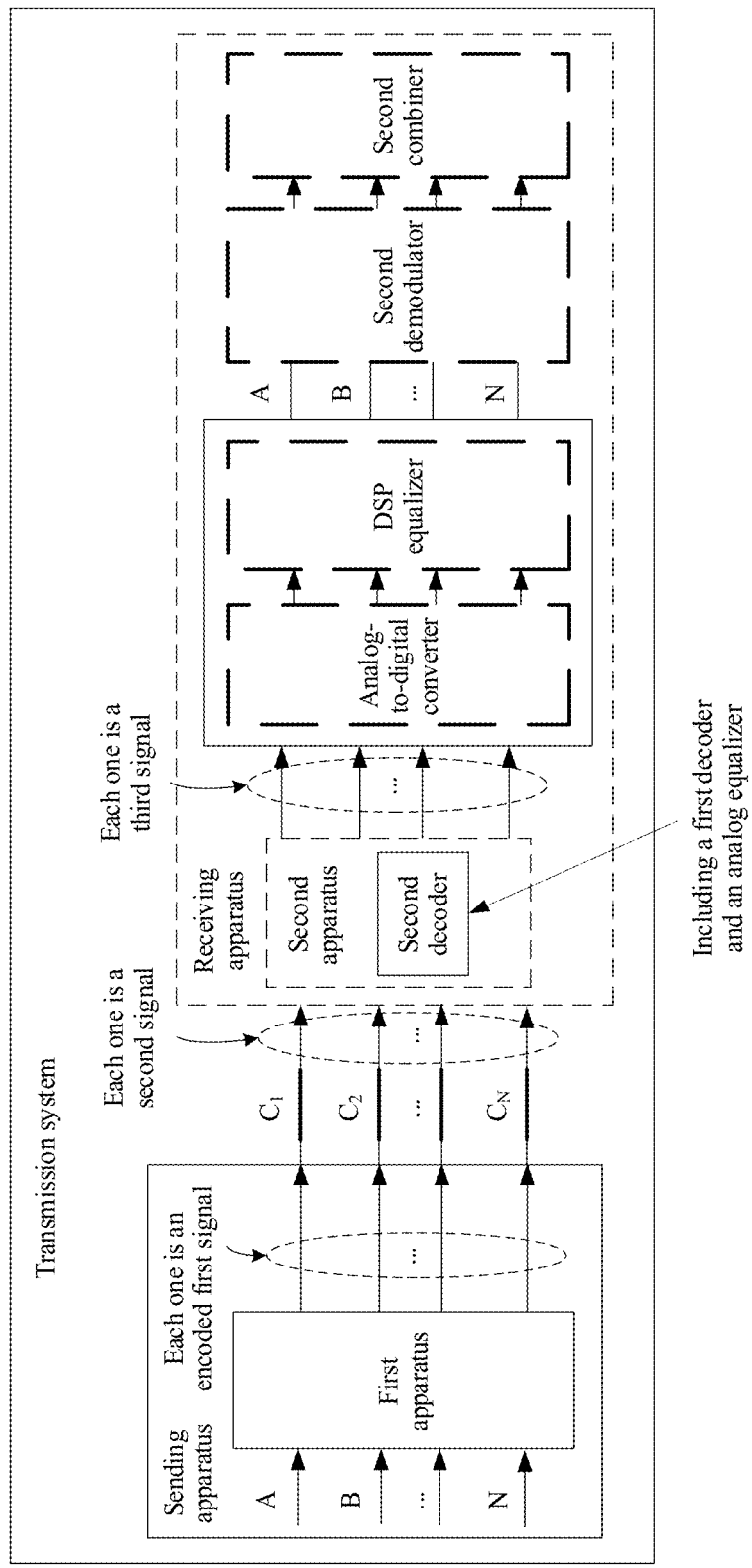

Optionally, based on the receiving apparatus shown in FIG. 13A, reference may further be made to FIG. 13B. FIG. 13B is a schematic diagram of a structure of another receiving apparatus according to an embodiment of this disclosure. As shown in FIG. 13B, the receiving apparatus may further include a second demodulator and a second combiner.

The second demodulator is configured to demodulate the N processed third signals to obtain N demodulated signals.

The second combiner is configured to combine at least two demodulated signals of the N demodulated signals to obtain one binary data stream.

It should be noted that the described second demodulator and second combiner may be understood with reference to the content in FIG. 12D. Details are not described herein again.

Figure 14A:
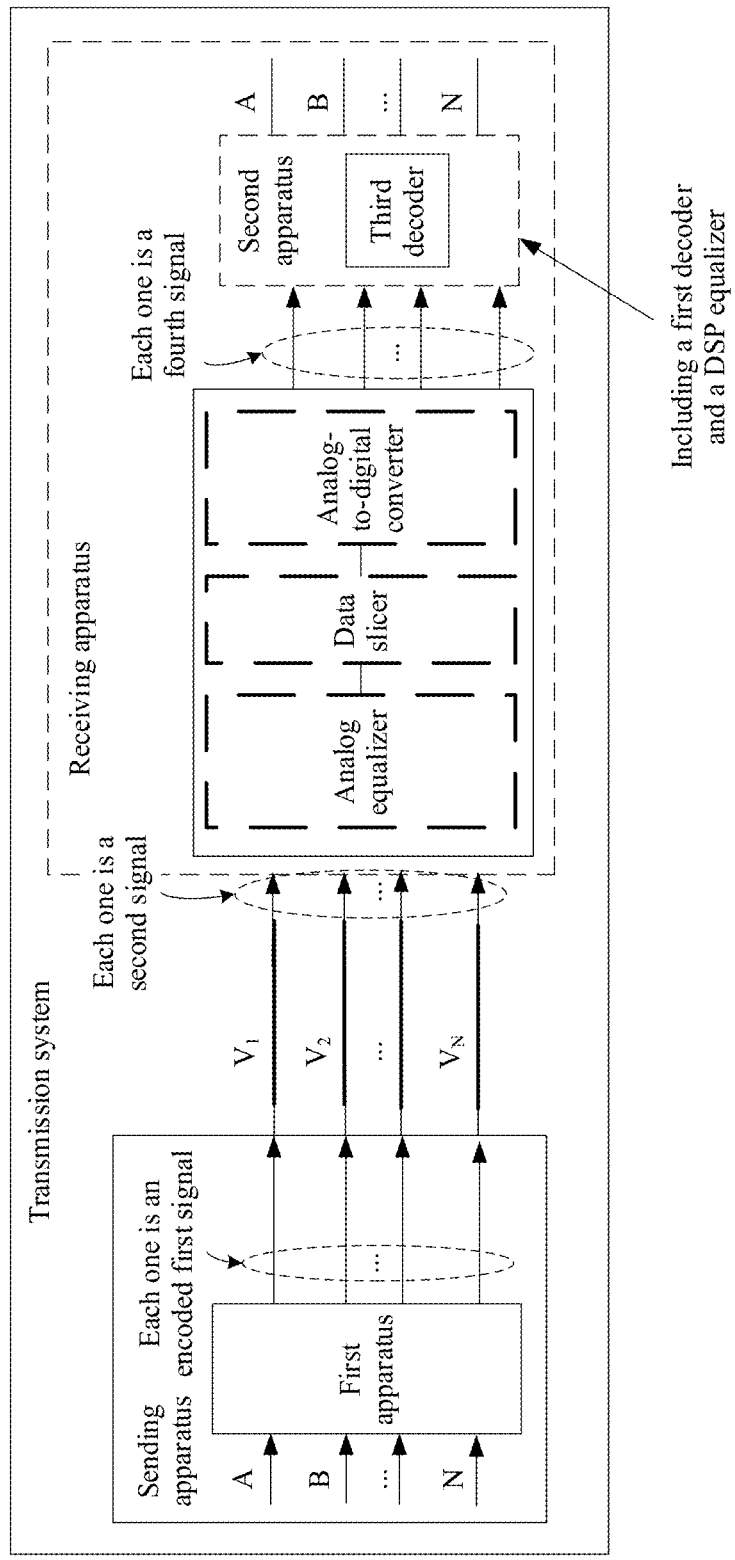
FIG. 14A, FIG. 14B, FIG. 14C, and FIG. 14D are schematic diagrams of structures of another transmission system according to an embodiment of this disclosure.

Optionally, based on the receiving apparatus shown in FIG. 11, reference may further be made to FIG. 14A. FIG. 14A is a schematic diagram of a structure of another receiving apparatus according to an embodiment of this disclosure. As shown in FIG. 14A, the receiving apparatus may further include one or more devices of an analog equalizer, a data slicer, and an analog-to-digital converter. The second apparatus may include a third decoder.

The N second signals are sequentially processed by one or more devices of the analog equalizer, the data slicer, and the analog-to-digital converter, to obtain N fourth signals.

The third decoder is configured to obtain the decoding coefficient group, and equalize and decode the N fourth signals based on the decoding coefficient group, to obtain the N third signals.

In this example, the described third decoder is a decoding device including a DSP equalizer and a first decoder. In other words, in addition to a decoding function, the third decoder further has a DSP equalization function. Therefore, before the signals are decoded, the received N second signals may first be processed by one or more devices of the analog equalizer, the data slicer, and the analog-to-digital converter, to obtain N fourth signals. Then, the third decoder performs equalization on and decodes the N fourth signals based on the decoding coefficient group, to obtain the N third signals.

It should be noted that, in this embodiment, the third decoder performs DSP equalization on and decodes the N fourth signals based on the decoding coefficient group, to obtain the N third signals. For details, reference may also be made to the content described in FIG. 11 for understanding. This is not limited herein.

In addition, because the third decoder has a DSP equalization function, a signal is converted into a digital signal before being decoded by the third decoder. In this case, that the N second signals are sequentially processed by one or more devices of the analog equalizer, the data slicer, and the analog-to-digital converter to obtain the N fourth signals may be understood in the following cases:

Case 1: When insertion loss of the link is small, the analog equalizer first processes the N second signals, and then the data slicer processes digital signals, to obtain the N fourth signals (for details, reference may be made to FIG. 14B).

Case 2: When insertion loss of the link is large, the analog equalizer first processes the N second signals, and then the analog-to-digital converter performs analog-to-digital conversion on signals after analog equalization, to obtain the N fourth signals (for details, reference may be made to FIG. 14C).

Figure 14B:
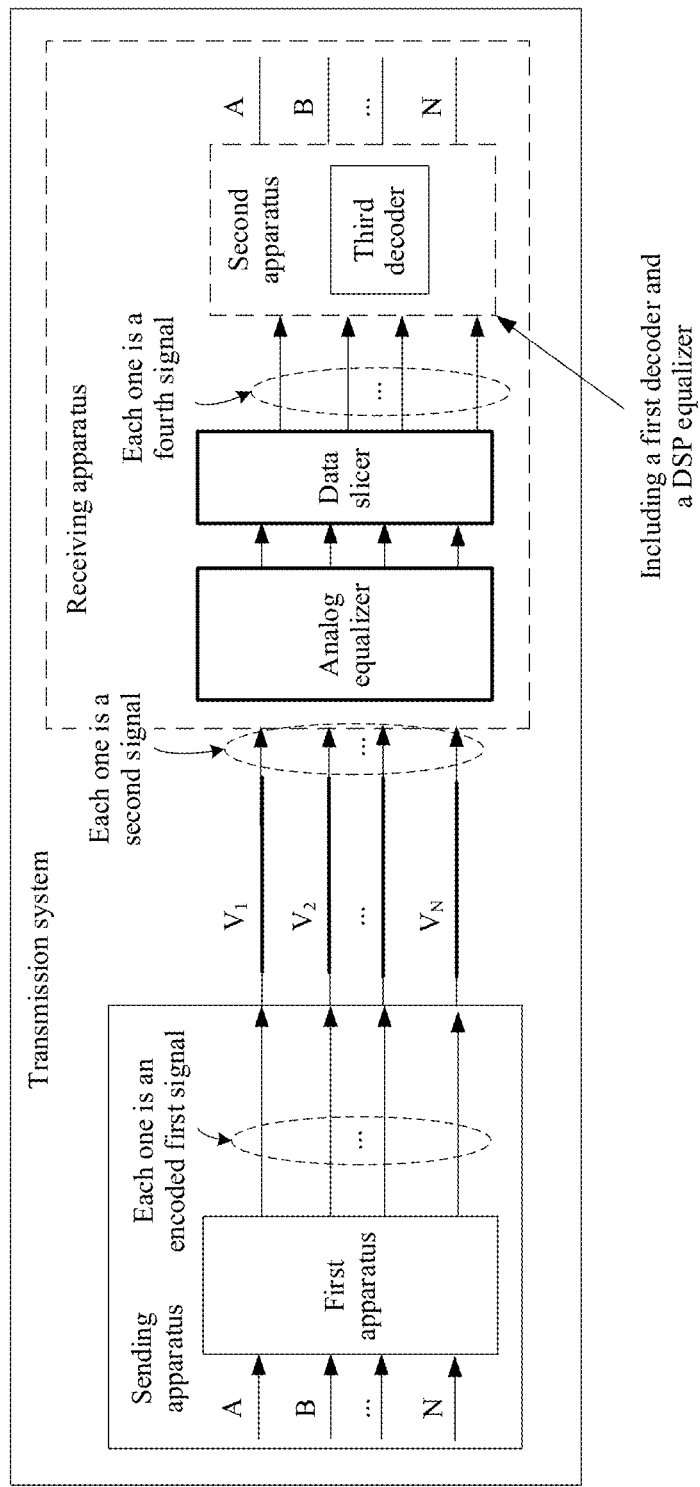
Figure 14C:
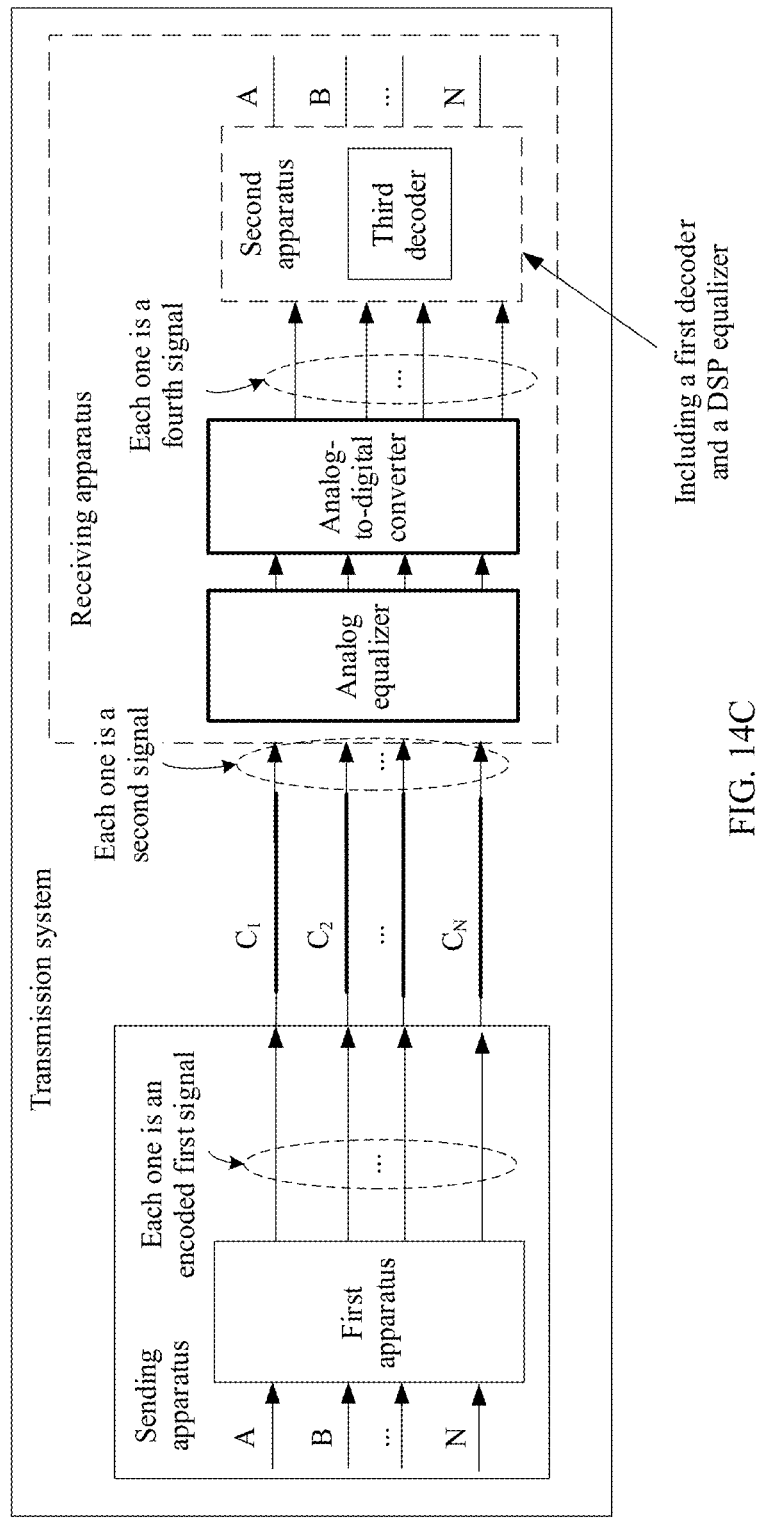

The analog equalizer, the analog-to-digital converter, the DSP equalizer, and the first decoder in FIG. 14A to FIG. 14C may be understood with reference to the content described in FIG. 12A to FIG. 12C. Details are not described herein again.

Figure 14D:
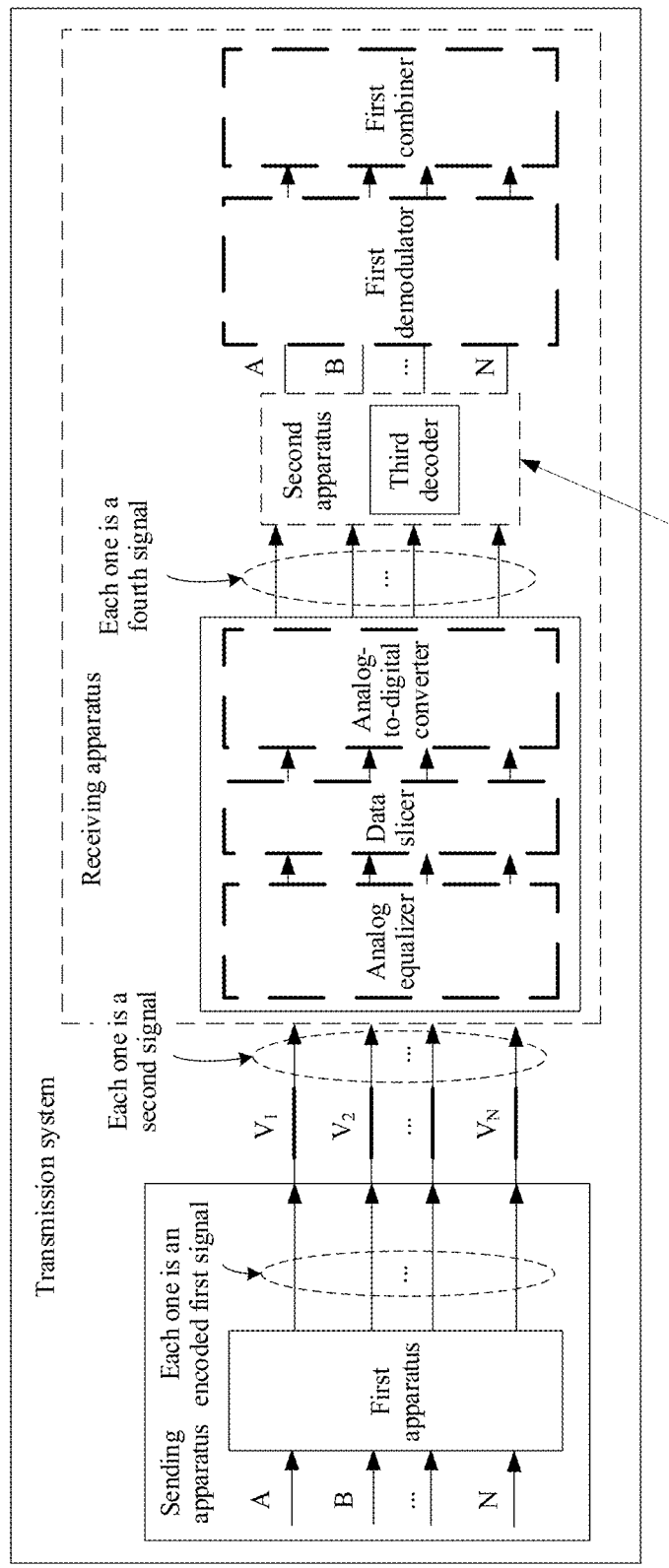

Optionally, based on the receiving apparatus shown in FIG. 14A to FIG. 14C, reference may further be made to FIG. 14D. FIG. 14D is a schematic diagram of a structure of another receiving apparatus according to an embodiment of this disclosure. As shown in FIG. 14D, the receiving apparatus may further include a first demodulator and a first combiner.

The first demodulator is configured to demodulate the N third signals to obtain N demodulated signals.

The first combiner is configured to combine at least two demodulated signals of the N demodulated signals to obtain one binary data stream.

It should be noted that the described first demodulator and first combiner may be understood with reference to the content in FIG. 12D. Details are not described herein again.

(2) Decoding is not performed.

Figure 15:
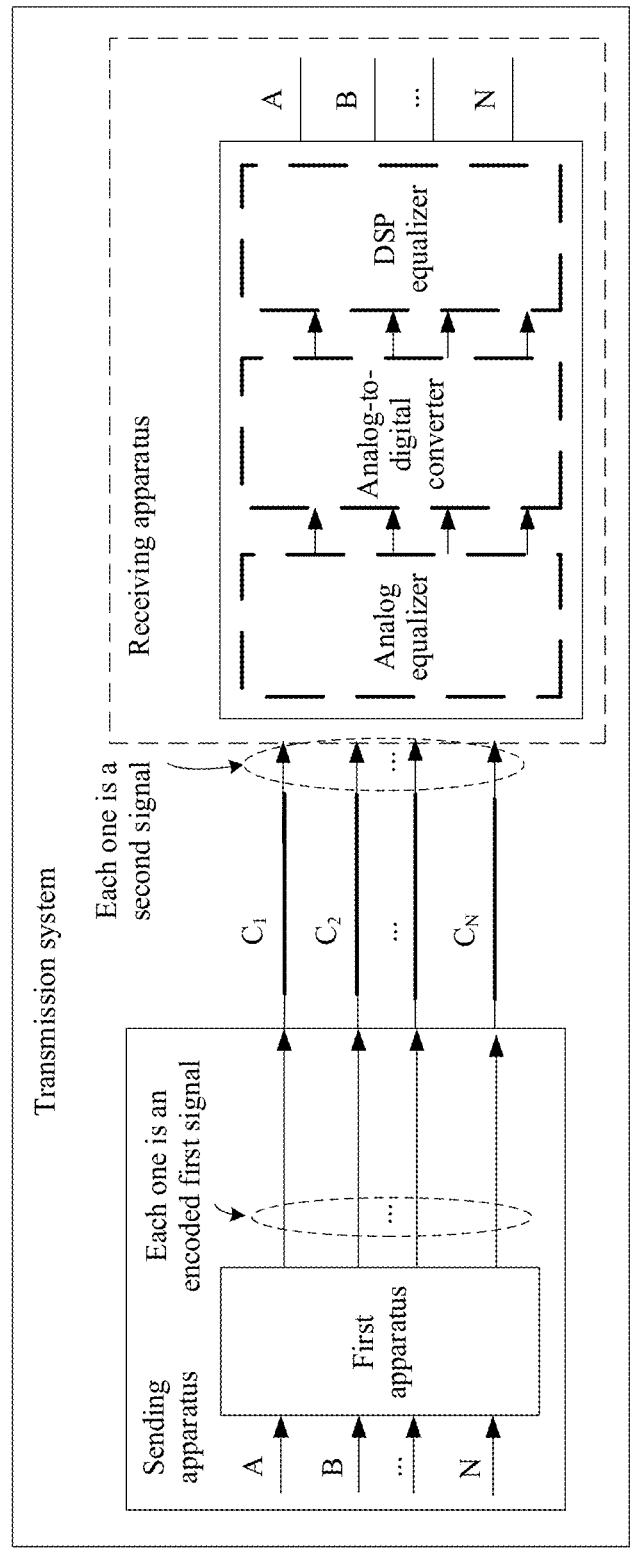
FIG. 15 is a schematic diagram of a structure of another transmission system according to an embodiment of this disclosure.

FIG. 11 to FIG. 14D mainly describe solutions of processing the N second signals from a perspective of a decoding process. The following describes a process of how to process the N second signals without decoding. FIG. 15 is a schematic diagram of a structure of another receiving apparatus according to an embodiment of this disclosure. As shown in FIG. 15, the receiving apparatus further includes one or more devices of an analog equalizer, an analog-to-digital converter, and a DSP equalizer.

One or more devices of the analog equalizer, the analog-to-digital converter, and the DSP equalizer are configured to sequentially process the N second signals to obtain N processed third signals.

In this example, although decoding does not need to be performed by the second apparatus described in FIG. 11 to FIG. 14D, after the N second signals are received, one or more devices of the analog equalizer, the analog-to-digital converter, and the DSP equalizer may be directly configured to sequentially process the N second signals, to obtain the N processed third signals. This is similar to in a manner such as de-interleaving or a butterfly operation.

Optionally, based on the receiving apparatus shown in FIG. 15, the receiving apparatus may further include a second demodulator and a second combiner.

The second demodulator is configured to demodulate the N processed third signals to obtain N demodulated signals.

The second combiner is configured to combine at least two demodulated signals of the N demodulated signals to obtain one binary data stream.

It should be noted that the described second demodulator and second combiner may be understood with reference to the content in FIG. 12D. Details are not described herein again.

The following separately verifies validity of solutions shown in embodiments of this disclosure in frequency domain and time domain.

Figure 16A:
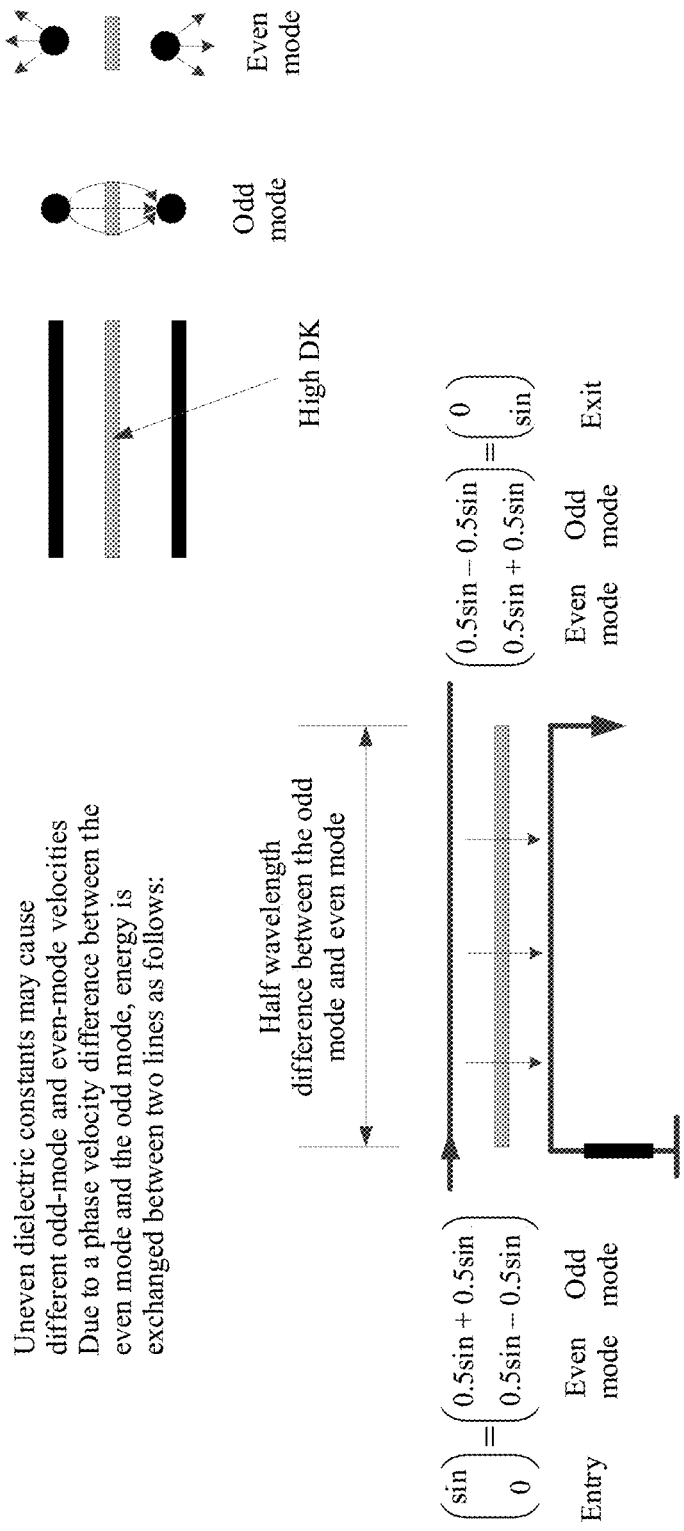
FIG. 16A is a schematic diagram of demonstrating a difference between an odd-mode velocity and an even-mode velocity according to an embodiment of this disclosure.

N=2 is used as an example. FIG. 16A is a schematic diagram of demonstrating a difference between an odd-mode velocity and an even-mode velocity according to an embodiment of this disclosure. As shown in FIG. 16A, in a link scenario in which equivalent dielectric constants of media of a microstrip line and differential cable to which an odd mode and an even mode pass through are different, the odd-mode velocity and the even-mode velocity are different. Energy exchange is performed between the two signals in frequency domain.

For every half wavelength of a transmission distance difference between the two signals, energy of the two signals is exchanged once. When the energy exchange is complete, input data is transferred from one port to another port. In frequency domain, two types of effect may be seen: (1) Energy is exchanged once at a specific frequency, and a deep notch appears in insertion loss of a single-ended channel (in a fixed length, frequency spacings of notches are the same). (2) A longer signal channel indicates more energy exchanges and denser notches in insertion loss of the single-ended channel.

Figure 16B:
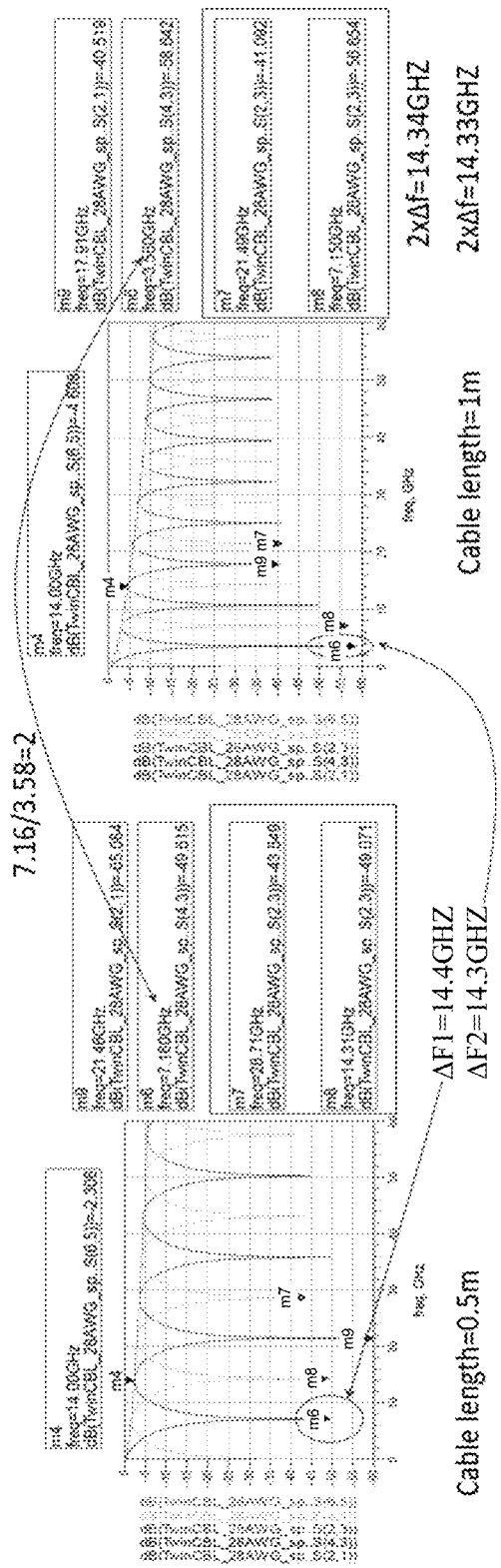
FIG. 16B is a schematic diagram of frequency responses under different differential cable lengths.

Reference may further be made to FIG. 16B. FIG. 16B is a schematic diagram of frequency responses under different differential cable lengths. As shown in FIG. 16B: (1) A frequency of completing one energy exchange (a deep notch appears) is in direct proportion to a cable length. (2) A longer length indicates more frequent exchanges and denser notches, that is, more energy exchanges between the two signals.

Figure 17:
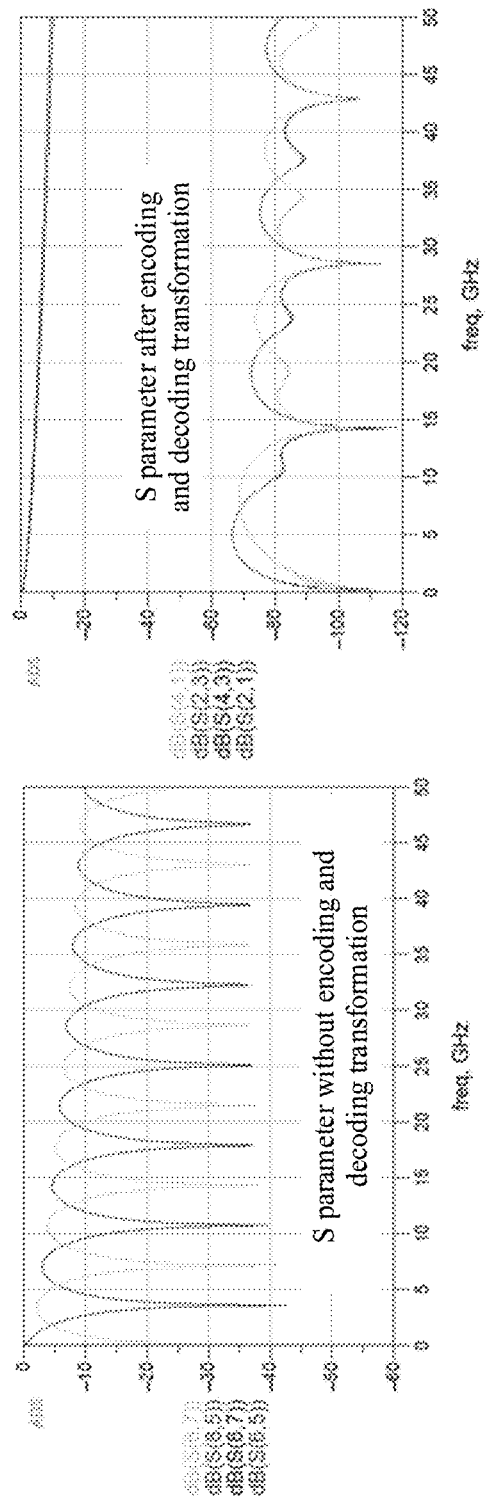
FIG. 17 is a schematic diagram of frequency responses of a differential cable before and after encoding and decoding according to an embodiment of this disclosure.
Figure 18A:
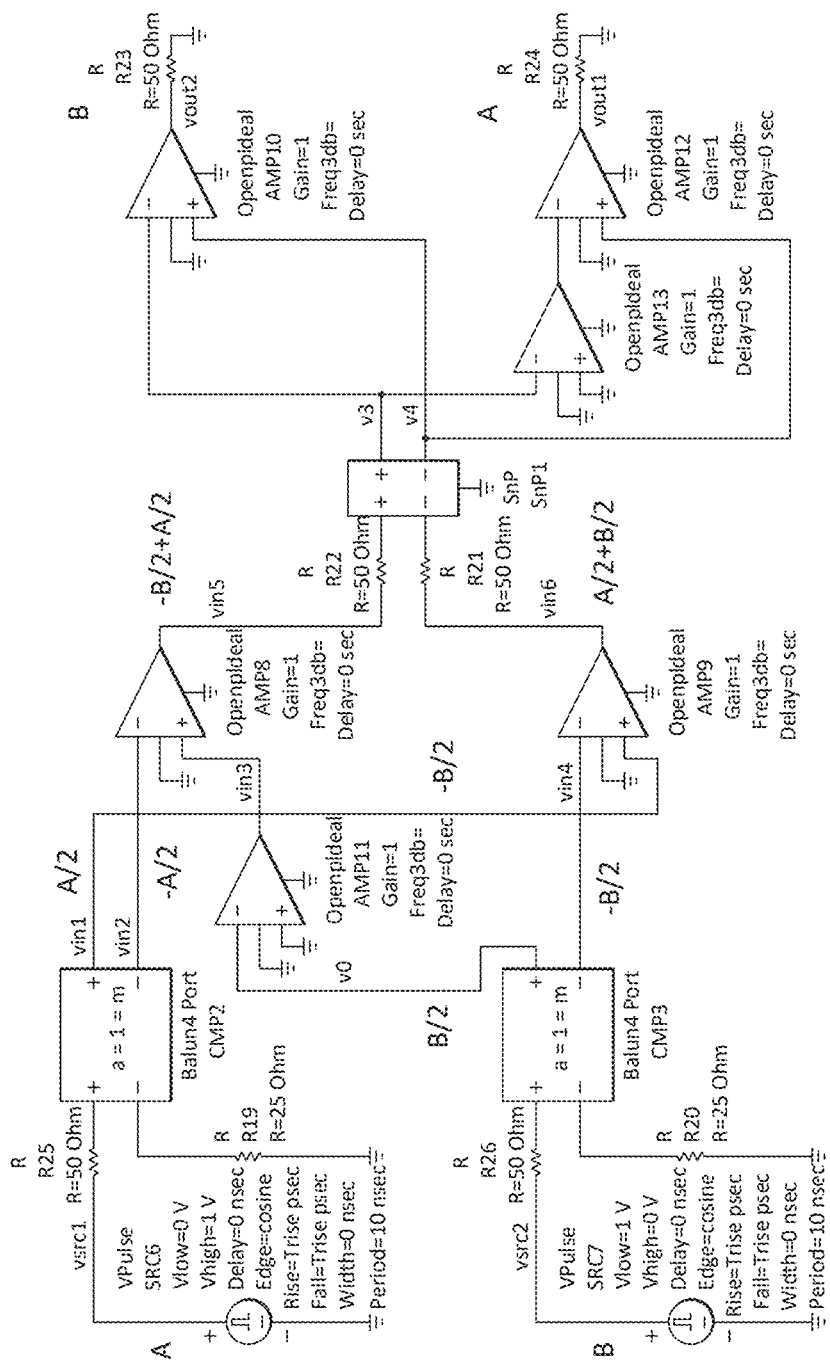
FIG. 18 is a schematic diagram of a circuit diagram and an impulse response verified in time domain according to an embodiment of this disclosure.
Figure 18B:
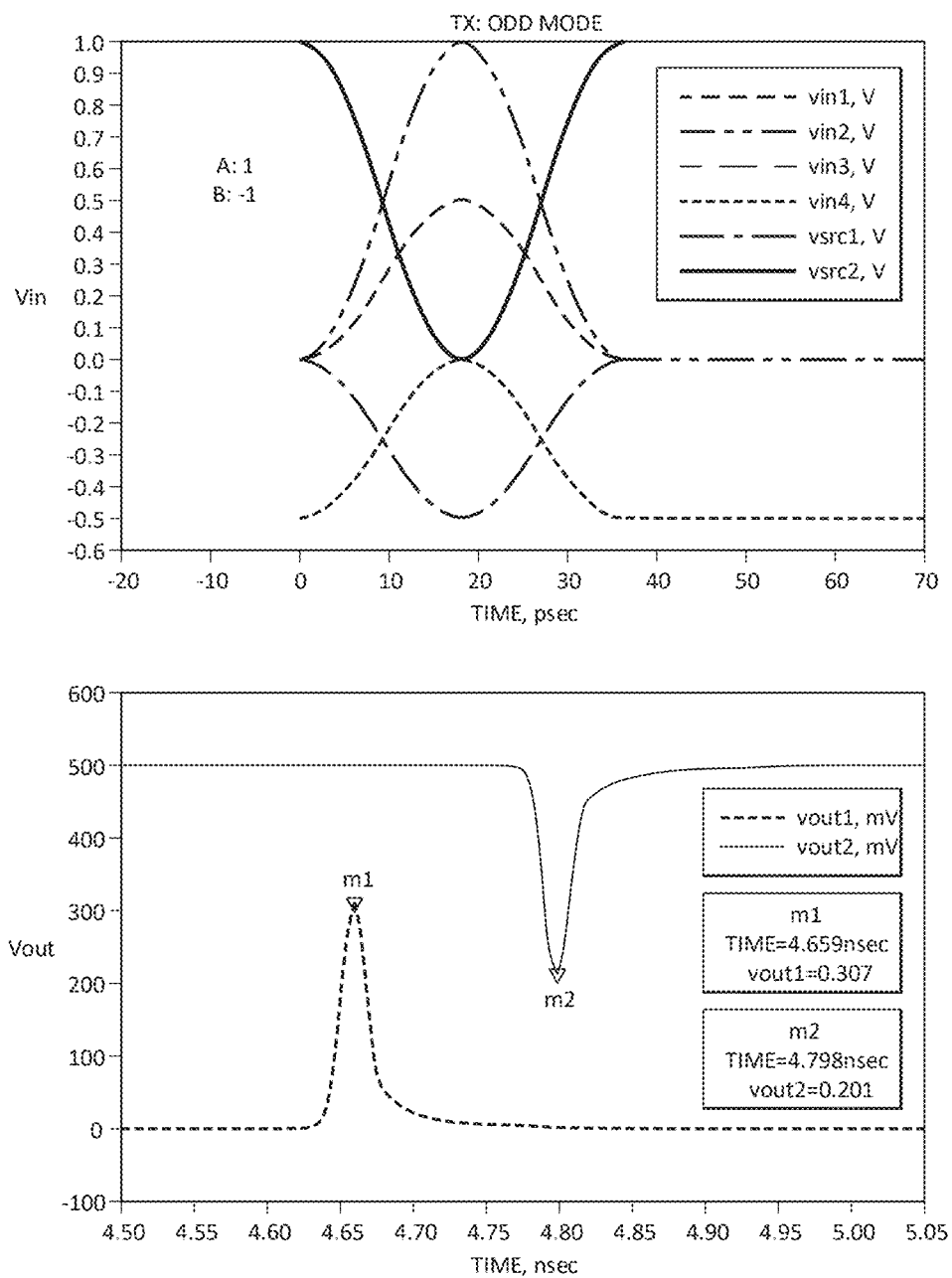
Figure 18C:
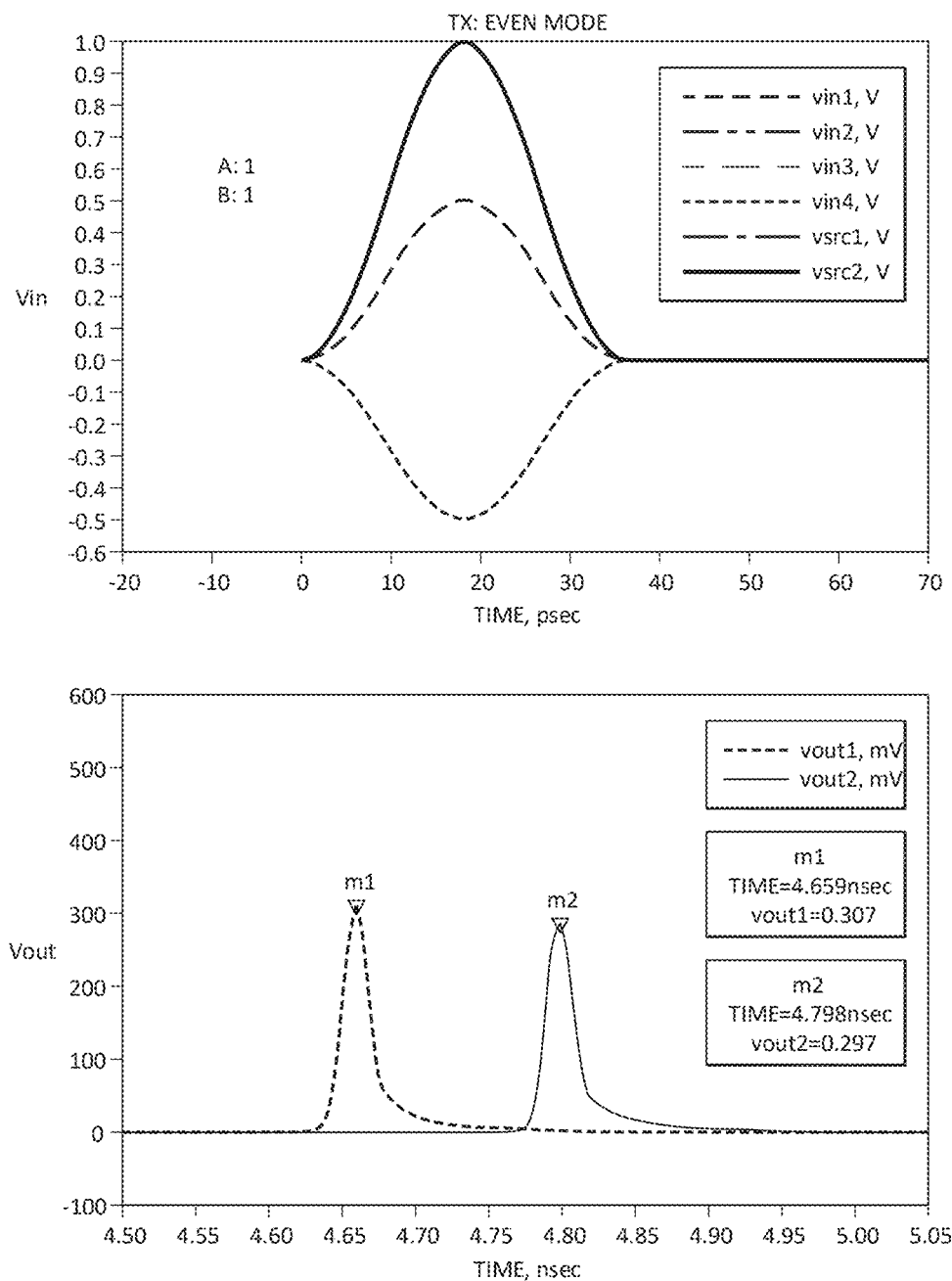
Figure 18D:
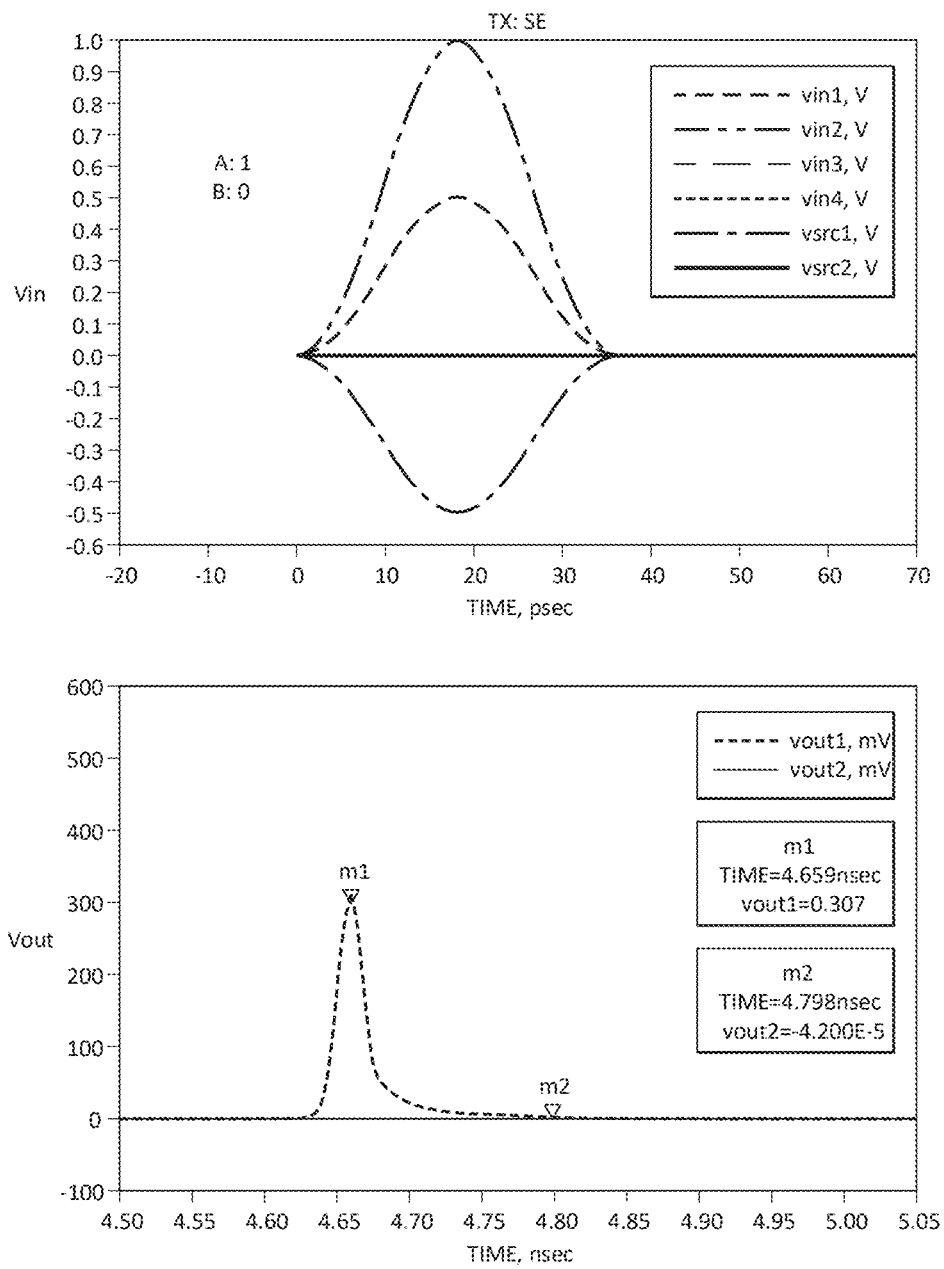
Figure 18E:
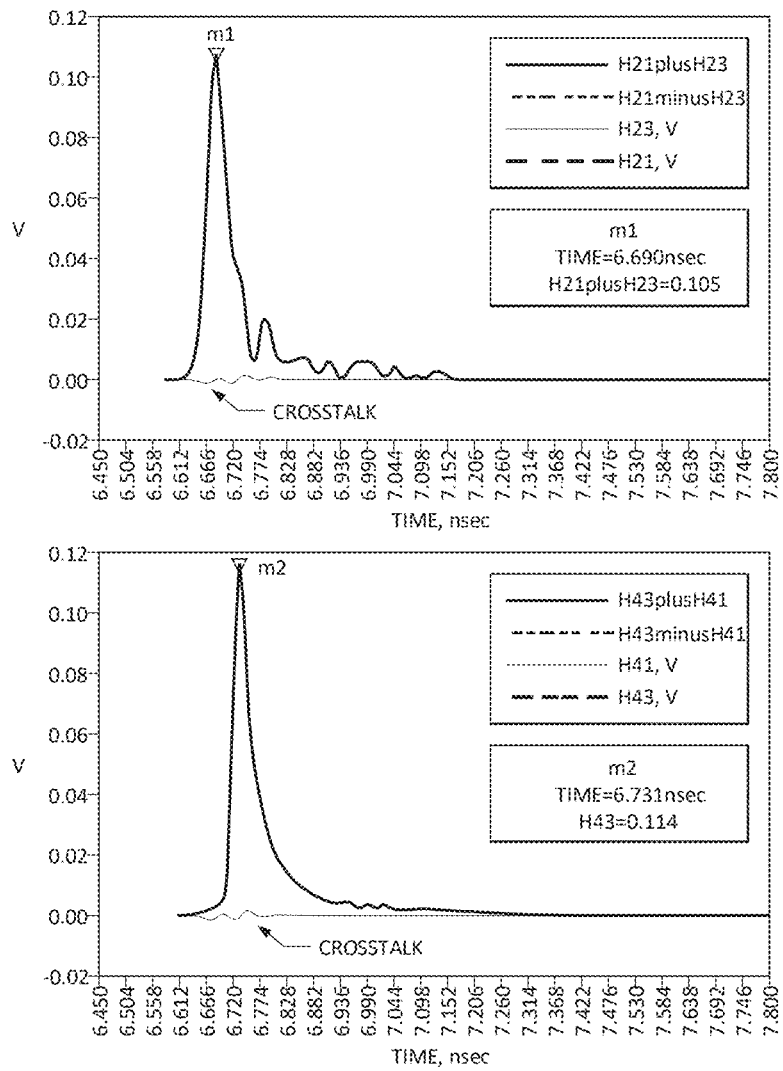

After encoding and decoding described in FIG. 3 to FIG. 14D are performed, for an equivalent S parameter, reference may be made to FIG. 17. FIG. 17 is a schematic diagram of frequency responses of a differential cable before and after encoding and decoding according to an embodiment of this disclosure. As shown in FIG. 17, parameters $S_{31}$ and $S_{42}$ that represent the pass-through characteristic are very smooth, and no notch appears, and parameters $S_{41}$ and $S_{32}$ that represent the crosstalk characteristic become smaller, and crosstalk cancellation does not need to be performed again.

The following describes verification in time domain by using a differential cable when N=2 as an example. FIG. 18 is a schematic diagram of a circuit diagram and an impulse response verified in time domain according to an embodiment of this disclosure. As shown in FIG. 18, a combination of amplifiers is used in a part (a) to implement the foregoing orthogonal encoding matrix T $$\frac{1}{2}\begin{bmatrix} 1 & 1 \\ 1 & -1 \end{bmatrix}$$

and the corresponding decoding matrix R $$\begin{bmatrix} 1 & 1 \\ 1 & -1 \end{bmatrix}.$$

It can be obviously seen that, regardless of whether the sending apparatus transmits signals in an odd mode (+1, −1), an even mode (+1, +1), or a single-ended mode (+1, 0), the receiving apparatus receives two signals A and B at a fixed time, and the time is not changed with a change of a code pattern. In addition, it can be learned from a part (b) that, after the encoding and decoding solutions described in FIG. 3 to FIG. 14D in this disclosure are performed, crosstalk between the two signals is very small and does not need to be eliminated.

Therefore, compared with the existing solutions shown in FIG. 1A and FIG. 1B, in this embodiment of this disclosure, an encoding device is configured in the sending apparatus, and a decoding device is configured in the receiving apparatus. In addition, the encoding coefficient group obtained by the encoding device is related to the N TEM modes that are orthogonal to each other and that are in the N signal channels, so that the N to-be-transmitted signals can be processed into the N encoded first signals corresponding to the TEM modes. In this way, after the N encoded first signals corresponding to the TEM modes are sent through the N signal channels, moments at which the receiving apparatus receives the N signals are no longer changed with the code pattern, and there is no or less energy crosstalk between the N coupled signal channels, thereby reducing equalization difficulty and complexity.

FIG. 3 to FIG. 18 mainly describe the transmission system provided in embodiments of this disclosure from a perspective of a function. The following describes the transmission method provided in embodiments of this disclosure from a perspective of a method. Further, FIG. 19 is a schematic diagram of a flowchart of a transmission method according to an embodiment of this disclosure. As shown in FIG. 19, the transmission method may include the following steps.

1901: A sending apparatus obtains N to-be-transmitted signals and an encoding coefficient group, where the N to-be-transmitted signals are represented as an N×1 signal matrix X, the encoding coefficient group is represented as an N×N orthogonal encoding matrix T, positive/negative signs of elements in any column of the orthogonal encoding matrix T are the same, and positive/negative signs of elements in remaining N−1 columns satisfy the following relationship: when N is an even number, a quantity of elements whose positive/negative signs are positive signs in any column of the N−1 columns is N/2, and a quantity of elements whose positive/negative signs are negative signs in any column of the N−1 columns is N/2, or when N is an odd number, a quantity of elements whose positive/negative signs are positive signs in any column of the N−1 columns is (N−1)/2, and a quantity of elements whose positive/negative signs are negative signs in any column of the N−1 columns is (N+1)/2, or a quantity of elements whose positive/negative signs are positive signs in any column of the N−1 columns is (N+1)/2, and a quantity of elements whose positive/negative signs are negative signs in any column of the N−1 columns is (N−1)/2, N≥2, and N is an integer.

1902: The sending apparatus processes the N to-be-transmitted signals based on the encoding coefficient group to generate N encoded first signals, where the N encoded first signals are represented as a signal matrix Y, and signal matrix Y=orthogonal encoding matrix T×signal matrix X.

1903: The sending apparatus sends the N encoded first signals to N signal channels, where a signal on each signal channel corresponds to an element in any row of the signal matrix Y.

1904: A receiving apparatus receives N second signals, where the N second signals are signals obtained after the N encoded first signals pass through the N signal channels.

1905: The receiving apparatus processes the N second signals.

In this example, the described orthogonal encoding matrix T, signal matrix X, and signal matrix Y may be understood with reference to the content described in FIG. 3 to FIG. 18. Details are not described herein again.

In this embodiment of this disclosure, the encoding coefficient group is related to N TEM modes that are orthogonal to each other and that are in the N signal channels. Therefore, the sending apparatus processes the N to-be-transmitted signals based on the encoding coefficient group, so that the N to-be-transmitted signals can be processed into encoded first signals corresponding to the N TEM modes. In this way, after the N encoded first signals corresponding to the TEM modes are sent through the N signal channels, a moment at which the receiving apparatus receives each second signal remains unchanged, and is irrelevant to a code pattern of a signal sent by the sending apparatus. There is no energy crosstalk between the N coupled signal channels, thereby reducing equalization difficulty and complexity.

A person skilled in the art may clearly understand that, for the purpose of convenient and brief description, for a detailed working process of the sending apparatus, receiving apparatus, unit, and module described above, reference may be made to a corresponding process in the foregoing method embodiments. Details are not described herein again.

The foregoing embodiments are merely intended to describe the technical solutions of this disclosure, but not to limit this disclosure. Although this disclosure is described in detail with reference to the foregoing embodiments, a person of ordinary skill in the art should understand that they can still modify the technical solutions described in the foregoing embodiments, or make equivalent replacements on some technical features thereof. These modifications or replacements do not make the essence of the corresponding technical solutions deviate from the scope of the technical solutions of embodiments of this disclosure.

What is claimed is:

1. A system comprising:
    N signal channels, wherein N≥2, and wherein N is an integer; and
    a sending apparatus coupled to the N signal channels and comprising a first apparatus, wherein the first apparatus is configured to:
        obtain N to-be-transmitted signals and an encoding coefficient group, wherein the N to-be-transmitted signals are represented as an N×1 signal matrix (X), wherein the encoding coefficient group is represented as an N×N encoding matrix (T), wherein first positive/negative signs of elements in a column of T are the same, wherein second positive/negative signs of elements in remaining N−1 columns of T satisfy a first relationship, and wherein the first relationship comprises:
            when N is an even number:
                a first quantity of elements with positive signs in a column of the remaining N−1 columns is N/2; and
                a second quantity of elements with negative signs in a column of the remaining N−1 columns is N/2; and
            when N is an odd number:
                the first quantity is (N−1)/2 and the second quantity is (N+1)/2; or
                the first quantity is (N+1)/2 and the second quantity is (N−1)/2;
        process, based on the encoding coefficient group, the N to-be-transmitted signals to generate N encoded first signals, wherein the N encoded first signals are represented as a signal matrix (Y), and wherein Y=T×X; and
        send, to the N signal channels, the N encoded first signals, wherein a signal on each of the N signal channels corresponds to an element in a row of Y.

2. The system of claim 1, wherein T is $$\begin{bmatrix} a & b \\ c & d \end{bmatrix}$$

when N=2, wherein a third positive/negative sign of one element of a, b, c, and d is opposite to fourth positive/negative signs of remaining elements of a, b, c, and d, and wherein the fourth positive/negative signs are the same.

3. The system of claim 2, wherein |a|=|b|=|c|=|d|≠0, wherein a and c correspond to a first transverse electromagnetic (TEM) mode of two TEM modes that are orthogonal to each other, wherein b and d correspond to a second TEM mode of the two TEM modes, and wherein the first TEM mode is different from the second TEM mode.

4. The system of claim 1, wherein elements in T satisfy a second relationship when N=4, and wherein the second relationship comprises:
    third positive/negative signs of elements in a first candidate column of T are the same;
    fourth positive/negative signs of elements that are in a first row and a second row and that are in a second candidate column are the same, fifth positive/negative signs of elements that are in a third row and a fourth row and that are in the second candidate column are the same, the fourth positive/negative signs are opposite to the fifth positive/negative signs, and the second candidate column is any column in T other than the first candidate column;
    sixth positive/negative signs of elements that are in the first row and the third row and that are in a third candidate column are the same, seventh positive/negative signs of elements that are in the second row and the fourth row and that are in the third candidate column are the same, the sixth positive/negative signs are opposite to the seventh positive/negative signs, and the third candidate column is any column in T other than the first candidate column and the second candidate column; and eighth positive/negative signs of elements that are in the first row and the fourth row and that are in a fourth candidate column are the same, ninth positive/negative signs of elements that are in the second row and the third row and that are in the fourth candidate column are the same, the eighth positive/negative signs are opposite to the ninth positive/negative signs, and the fourth candidate column is any column in T other than the first candidate column, the second candidate column, and the third candidate column.

5. The system of claim 4, wherein T is a 4×4 Hadamard matrix.

6. The system of claim 1, wherein the N signal channels comprise:
a first return reference ground; and
N conductors, wherein each of the N conductors has a matched first return reference ground or the N conductors match the first return reference ground,
wherein elements in each column of T correspond to any transverse electromagnetic (TEM) mode of N TEM modes that are orthogonal to each other and that are transmitted on the N signal channels, and wherein each of the first positive/negative signs is the same as or opposite to an electric field direction from each conductor in a corresponding TEM mode to the matched first return reference ground.

7. The system of claim 1, wherein the first apparatus is further configured to obtain a matrix (D) by multiplying T, an inverse matrix of T ($T^{-1}$), and an N× N signal channel matrix (C), wherein D satisfies a condition, and wherein the condition comprises:

$D = T^{-1} \times C \times T$, wherein elements on a diagonal in D are all non-zero values, wherein a value of an element not on the diagonal is less than a preset threshold, wherein the N signal channels are represented as C, wherein $S_{(N+i)(i)}$ is an element in an $i^{th}$ row and an $i^{th}$ column in C and represents a pass-through characteristic of an $i^{th}$ signal channel in the N signal channels, wherein i is an integer and $\in [1, N]$, wherein $S_{(N+i)(j)}$ is an element in the $i^{th}$ row and a $j^{th}$ column in C and represents a crosstalk characteristic of a $j^{th}$ channel in the N signal channels on the $i^{th}$ signal channel, wherein j is an integer and $\in [1, N]$, and wherein i≠j.

8. The system of claim 6, wherein the N signal channels further comprise a second return reference ground, that is at a same layer as the N conductors, and is a part of the first return reference ground, wherein the first apparatus is further configured to obtain an element in T according to a formula, and wherein the formula is:

$$T_{ij} = cons \times \sin\left(\frac{\sum_{u=1}^{j} S_u}{\sum_{u=1}^{N+1} S_u} \times i \times \pi\right),$$

wherein $T_{ij}$ represents an element in an $i^{th}$ row and a $j^{th}$ column in T, wherein cons is a constant not equal to zero, wherein u, i, and j are integers and $\in [1, N]$, wherein $S_1$ is a first distance from a first conductor of the N conductors to the second return reference ground, wherein $S_{N+1}$ is a second distance from an $N^{th}$ conductor of the N conductors to the second return reference ground, and wherein Sy is a third distance between centers of a $u^{th}$ conductor and a $(u-1)^{th}$ conductor in the N conductors.

9. The system of claim 6, wherein the first apparatus is further configured to obtain an element in T according to a formula, and wherein the formula is:

$$T_{ij} = cons \times \sin\left(\frac{\sum_{u=1}^{j} u}{N+1} \times i \times \pi\right),$$

wherein $T_{ij}$ represents an element in an $i^{th}$ row and a $j^{th}$ column in T, wherein cons is a constant not equal to 0, and wherein u, i, and j are integers and $\in [1, N]$.

10. The system of claim 4, wherein T is a feature matrix of a matrix (E) and wherein E is:

$$cons \times \begin{bmatrix} 1 & i/a & 0 & 0 \\ i/a & 1 & i/a & 0 \\ 0 & i/a & 1 & i/a \\ 0 & 0 & i/a & 1 \end{bmatrix},$$

wherein i is an imaginary unit, wherein a is a constant not equal to 0, and wherein cons is a constant not equal to 0.

11. The system of claim 4, wherein T is a feature matrix of a matrix (F), and wherein F is:

$$cons \times \begin{bmatrix} 1 & i/a & i/b & 0 \\ i/a & 1 & i/a & i/b \\ i/b & i/a & 1 & i/a \\ 0 & i/b & i/a & 1 \end{bmatrix},$$

wherein i is an imaginary unit, wherein a and b both are constants not equal to 0, and wherein cons is a constant not equal to 0.

12. The system of claim 4, wherein T is a feature matrix of a matrix (G), and wherein G is:

$$cons \times \begin{bmatrix} 1 & i/a & i/b & i/c \\ i/a & 1 & i/a & i/b \\ i/b & i/a & 1 & i/a \\ i/c & i/b & i/a & 1 \end{bmatrix},$$

wherein i is an imaginary unit, wherein a, b, and c all are constants not equal to 0, and wherein cons is a constant not equal to 0.

13. A method implemented by a sending apparatus, wherein the method comprises:
obtaining N to-be-transmitted signals and an encoding coefficient group, wherein the N to-be-transmitted signals are represented as an N×1 signal matrix (X), wherein the encoding coefficient group is represented as an N×N encoding matrix (T), wherein first positive/negative signs of elements in a column of T are the same, wherein second positive/negative signs of elements in remaining N−1 columns of T satisfy a first relationship, and wherein the first relationship comprises:
when N is an even number:
a first quantity of elements with positive signs in a column of the remaining N−1 columns is N/2; and a second quantity of elements with negative signs in a column of the remaining N−1 columns is N/2; and when N is an odd number, the first quantity is (N−1)/2 and the second quantity is (N+1)/2, and wherein N is an integer ≥2;

processing, based on the encoding coefficient group, the N to-be-transmitted signals to generate N encoded first signals, wherein the N encoded first signals are represented as a signal matrix (Y), and wherein Y=T×X; and sending, to N signal channels, the N encoded first signals, wherein a signal on each of the N signal channels corresponds to an element in a row of Y.

14. The method of claim 13, wherein T is $$\begin{bmatrix} a & b \\ c & d \end{bmatrix}$$

when N=2, wherein a third positive/negative sign of one element of a, b, c, and d is opposite to fourth positive/negative signs of remaining elements of a, b, c, and d, and wherein the fourth positive/negative signs are the same.

15. The method of claim 14, wherein |a|=|b|=|c|=|d|≠0, wherein a and c correspond to a first transverse electromagnetic (TEM) mode of two TEM modes that are orthogonal to each other, wherein b and d correspond to a second TEM mode of the two TEM modes, and wherein the first TEM mode is different from the second TEM mode.

16. The method of claim 13, wherein elements in T satisfy a second relationship when N=4, and wherein the second relationship comprises:

third positive/negative signs of elements in a first candidate column of T are the same;

fourth positive/negative signs of elements that are in a first row and a second row and that are in a second candidate column are the same, fifth positive/negative signs of elements that are in a third row and a fourth row and that are in the second candidate column are the same, the fourth positive/negative signs are opposite to the fifth positive/negative signs, and the second candidate column is any column in T other than the first candidate column;

sixth positive/negative signs of elements that are in the first row and the third row and that are in a third candidate column are the same, seventh positive/negative signs of elements that are in the second row and the fourth row and that are in the third candidate column are the same, the sixth positive/negative signs are opposite to the seventh positive/negative signs, and the third candidate column is any column in T other than the first candidate column and the second candidate column; and eighth positive/negative signs of elements that are in the first row and the fourth row and that are in a fourth candidate column are the same, ninth positive/negative signs of elements that are in the second row and the third row and that are in the fourth candidate column are the same, the eighth positive/negative signs are opposite to the ninth positive/negative signs, and the fourth candidate column is any column in T other than the first candidate column, the second candidate column, and the third candidate column.

17. The method of claim 16, wherein T is a 4×4 Hadamard matrix.

18. A method implemented by a receiving apparatus, wherein the method comprises:

receiving N second signals that are obtained after N encoded first signals pass through N signal channels, wherein the N encoded first signals are based on N to-be-transmitted signals and an encoding coefficient group, wherein the encoding coefficient group is represented as an N×N orthogonal encoding matrix (T), wherein first positive/negative signs of elements in a column of T are the same, wherein second positive/negative signs of elements in remaining N−1 columns in T satisfy a first relationship:

when N is an even number:
a first quantity of elements with positive signs in a column of the remaining N−1 columns is N/2; and
a second quantity of elements with negative signs in a column of the remaining N−1 columns is N/2; and when N is an odd number, the first quantity is (N+1)/2 and the second quantity is (N−1)/2; and processing the N second signals to obtain signals corresponding to the N to-be-transmitted signals.

19. The method of claim 18, wherein processing the N second signals comprises:

obtaining a decoding coefficient group, wherein the decoding coefficient group is represented as an N×N decoding matrix (R), wherein a product of R and T is a diagonal matrix, and wherein elements on a diagonal in the diagonal matrix are all non-zero values; and processing, based on the decoding coefficient group, the N second signals to obtain N third signals, wherein one of the N third signals corresponds to one of the N to-be-transmitted signals.

20. The method of claim 19, wherein the diagonal matrix is an M-fold unit matrix, wherein M is a constant, and wherein M≠0.

* * * * *